US012684114B2

(12) United States Patent
Sun et al.

(10) Patent No.: US 12,684,114 B2
(45) **Date of Patent: *Jul. 14, 2026**

(54) ENCODING AND DECODING METHOD, APPARATUS, AND DEVICE

(71) Applicant: HANGZHOU HIKVISION DIGITAL TECHNOLOGY CO., LTD., Hangzhou (CN)

(72) Inventors: Yucheng Sun, Hangzhou (CN); Xiaoqiang Cao, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,989

(22) Filed: Nov. 27, 2024

(65) Prior Publication Data

US 2025/0097405 A1 Mar. 20, 2025

Related U.S. Application Data

(63) Continuation of application No. 18/009,949, filed as application No. PCT/CN2021/102199 on Jun. 24, 2021, now Pat. No. 12,192,444.

(30) Foreign Application Priority Data

Jun. 30, 2020 (CN) .......................... 202010622752.7

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC ...................................................... H04N 19/00
See application file for complete search history.

(56) References Cited

U.S. PATENT DOCUMENTS 10,666,940 B2    5/2020 Park et al.
2010/0128803 A1*  5/2010 Divorra Escoda ... H04N 19/154
                                             375/E7.194
(Continued)

FOREIGN PATENT DOCUMENTS

CN       101502120       8/2009
CN       103533376       1/2014
(Continued)

OTHER PUBLICATIONS

Request for the Submission of an Opinion in Korean Patent Application No. 10-2022-7043009, issued on Aug. 18, 2025.
(Continued)

*Primary Examiner* — Maryam A Nasri
(74) *Attorney, Agent, or Firm* — Ladas & Parry, LLP

(57) ABSTRACT

Embodiments of the present disclosure provide an encoding and decoding method, apparatus and device. The method includes: obtaining a weight prediction angle and weight configuration parameters; configuring reference weight values for surrounding positions outside the current block; determining a surrounding matching position to which the pixel position points; determining a target weight value of the pixel position based on a reference weight value associated with the surrounding matching position, and determining an associated weight value of the pixel position based on the target weight value of the pixel position; determining a first prediction value of the pixel position and (Continued)

a second prediction value; determining a weighted prediction value of the pixel position based on the first prediction value, target weight value, second prediction value and associated weight value; determining weighted prediction values of the current block based on the weighted prediction value of each pixel position of the current block.

20 Claims, 8 Drawing Sheets

(51) Int. Cl.
H04N 19/137 (2014.01)
H04N 19/159 (2014.01)
H04N 19/176 (2014.01)

(56) References Cited

U.S. PATENT DOCUMENTS

| | | | |
|---|---|---|---|
| 2017/0347102 A1 | 11/2017 | Panusopone et al. | |
| 2018/0288410 A1 | 10/2018 | Park et al. | |
| 2018/0288425 A1 | 10/2018 | Panusopone et al. | |
| 2023/0267573 A1* | 8/2023 | Kettenis | G06T 5/70 |
| | | | 382/168 |

FOREIGN PATENT DOCUMENTS

| | | |
|---|---|---|
| CN | 103533376 B | 4/2017 |
| CN | 107113425 | 8/2017 |
| CN | 109819255 | 5/2019 |
| CN | 109819255 A | 5/2019 |
| CN | 109862369 | 6/2019 |
| CN | 110225346 | 9/2019 |
| CN | 110324637 | 10/2019 |
| CN | 109819255 B | 1/2020 |
| CN | 110933426 | 3/2020 |
| CN | 112543323 | 3/2021 |
| CN | 112584142 | 3/2021 |
| CN | 113873249 | 12/2021 |
| EP | 3644612 | 4/2020 |
| EP | 4109897 A1 | 12/2022 |
| RU | 2716230 C2 | 3/2020 |
| TW | 201904296 | 1/2019 |
| TW | 202015441 | 4/2020 |
| WO | 2016072775 A1 | 5/2016 |
| WO | 2020094052 A1 | 5/2020 |
| WO | 2020096388 A1 | 5/2020 |
| WO | 2021190515 A1 | 9/2021 |

OTHER PUBLICATIONS

"Versatile Video Coding (Draft 6)," ITU-T SG 16 WP 3 and ISO/IEC JTC 1/SC 29/WG 11, JVET-O2001vE, Benjamin Bross et al., Jul. 3-12, 2019.

International Search Report for PCT/CN2021/102199 mailed on Sep. 10, 2021and its English translation provided by WIPO.
Written Opinion of the International Searching Authority for PCT/CN2021/102199 mailed on Sep. 10, 2021 and its English translation provided by Google Translate.
Chinese Office Action and Search Report for Application No. 202010622752.7, issued on Oct. 18, 2022, with English translation provided by applicant's foreign counsel.
Chinese Office Action and Search Report for Application No. 202111155088.0, issued on Oct. 14, 2022, with English translation provided by applicant's foreign counsel.
Yucheng Sun et al. "Angular Weighted Prediction for Next-Generationvideo Coding Standard", 2021 IEEE International Conference on Multimedia and Expo (ICME), IEEE, DOI: 10.1109/ICME51207.2021.9428315, Jun. 9, 2021.
European Patent Office, Extended European Search Report Issued in Application No. 21834647.6, Sep. 20, 2023.
Australian Patent Office, Office Action Issued in Application No. 2021298606, Aug. 1, 2023, 2 pages.
Australian Patent Office, Office Action Issued in Application No. 2021298606, Oct. 11, 2023, 4 pages.
Japanese Patent Office, Office Action Issued in Application No. 2022-578722, Oct. 10, 2023, 8 pages.
Russian Patent Office, Office Action Issued in Application No. 2022135134, Jul. 14, 2023 with machine translation.
Chen, J. et al, "Algorithm description for Versatile Video Coding and Test Model 8 (VTM 8)", Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2002-v3, all pages.
Jianle Chen et al, "Algorithm description for Versatile Video Coding and Test Model 12 (VTM 12)", Joint Video Experts Team (JVET) of ITU-T SG 16 WP 3 and ISO/IEC JTC 1/SC 29, 21st Meeting, by teleconference, Jan. 6-15, 2021, JVET-U2002-v1, all pages.
Gao, H. et al.: "CE4: CE4-1.1, CE4-1.2 and CE4-1.14: Geometric Merge Mode (GEO)", JVET-P0068-v1, Joint Video Experts Team (JVET) of ITU-T SG 16 WP 3 and ISO/IEC JTC 1/SC 29/WVG 11, 16th Meeting: Geneva, CH, Oct. 1-11, 2019, all pages.
Gao, H. et al.: "CE4: CE4-1.1, CE4-1.2 and CE4-1.14: Geometric Merge Mode (GEO)", JVET-P0068-v2, Joint Video Experts Team (JVET) of ITU-T SG 16 WP 3 and ISO/IEC JTC 1/SC 29/WG 11, 16th Meeting: Geneva, CH, Oct. 1-11, 2019, all pages.
Benjamin Bross et al,"Versatile Video Coding (Draft 9)", Joint Video Experts Team (JVET) of ITU-T SG 16 WP 3 and ISO/IEC JTC 1/SC 29/WG 11 18th Meeting: by teleconference, Apr. 15-24, 2020, JVET-R2001-vB, version 11 issued on Jun. 20, 2020, pp. 77-78,171-172,229-235,238-239,251-253,282-284,299-302.
Yucheng Sun et al, "CE4-related: On simplification for GEO weight derivation", Joint Video Experts Team (JVET) of ITU-TSG 16 WP 3 and ISO/IEC JTC 1/SC 29/WG 11, JVET-P0250, 16th Meeting : Geneva,CH,Oct. 1-11, 2019, all pages.

* cited by examiner

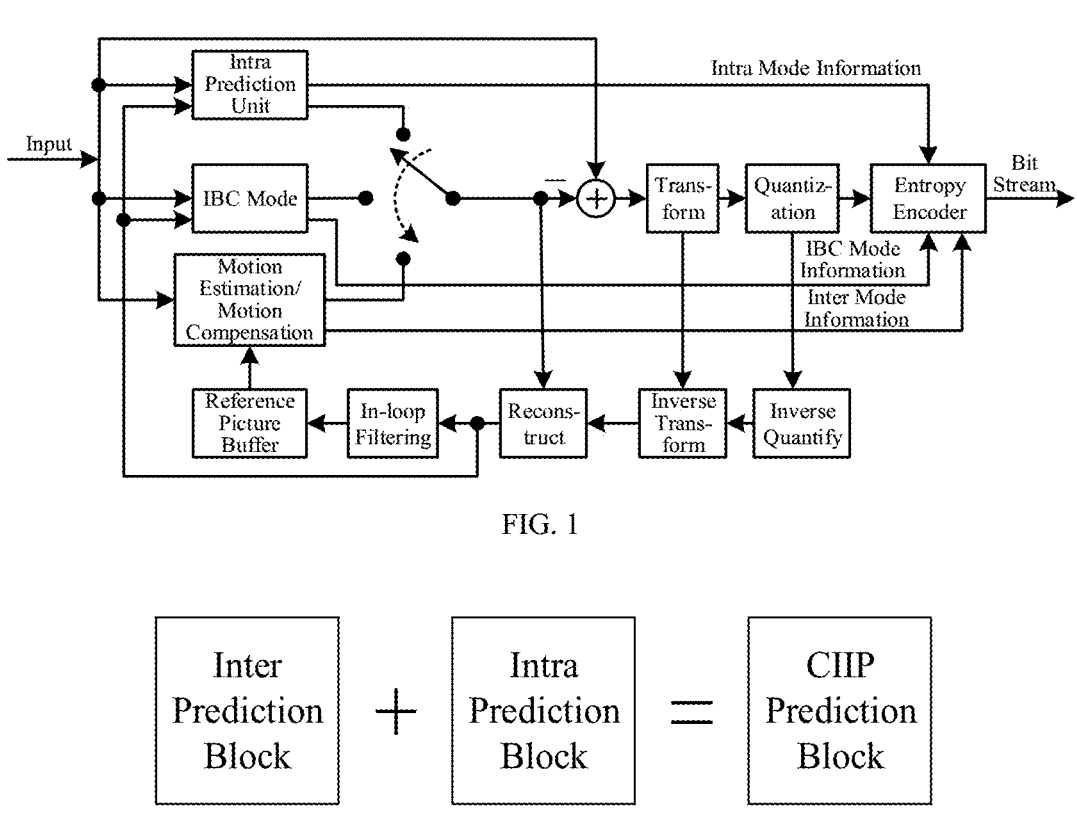
FIG. 1
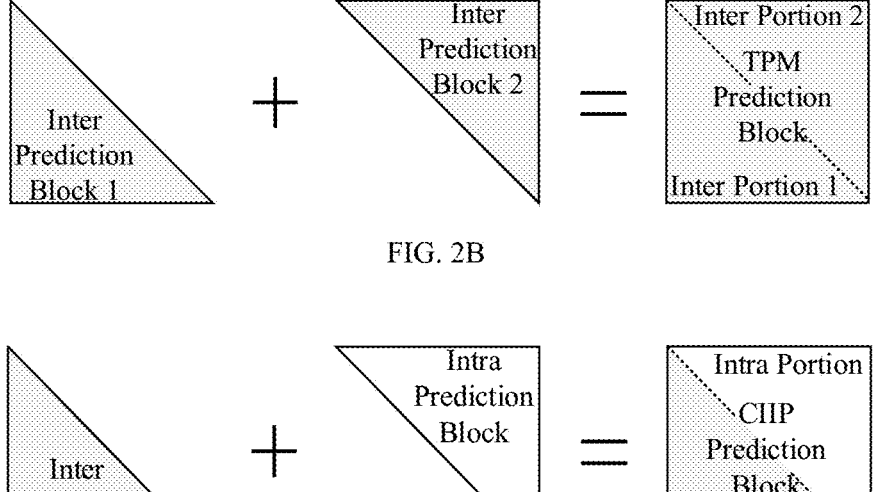
FIG. 2A
FIG. 2B
FIG. 2C

When it is determined that a weighted prediction is enabled for a current block, obtain a weight prediction angle and one or more weight configuration parameters of the current block ⌐~301

Configure reference weight values for surrounding positions outside the current block based on the weight configuration parameters of the current block ⌐~302

For each pixel position of the current block, determine a surrounding matching position to which the pixel position points from the surrounding positions outside the current block based on the weight prediction angle of the current block; determine a target weight value of the pixel position based on a reference weight value associated with the surrounding matching position, and determine an associated weight value of the pixel position based on the target weight value of the pixel position ⌐~303

Obtain a motion information candidate list including at least one piece of candidate motion information, and obtain first target motion information and second target motion information of the current block based on the motion information candidate list ⌐~304

For each pixel position of the current block, determine a first prediction value of the pixel position based on the first target motion information of the current block, and determine a second prediction value of the pixel position based on the second target motion information of the current block; determine a weighted prediction value of the pixel position based on the first prediction value, the target weight value, the second prediction value and the associated weight value ⌐~305

Determine weighted prediction values of the current block based on the weighted prediction value of each pixel position of the current block ⌐~306

FIG. 3

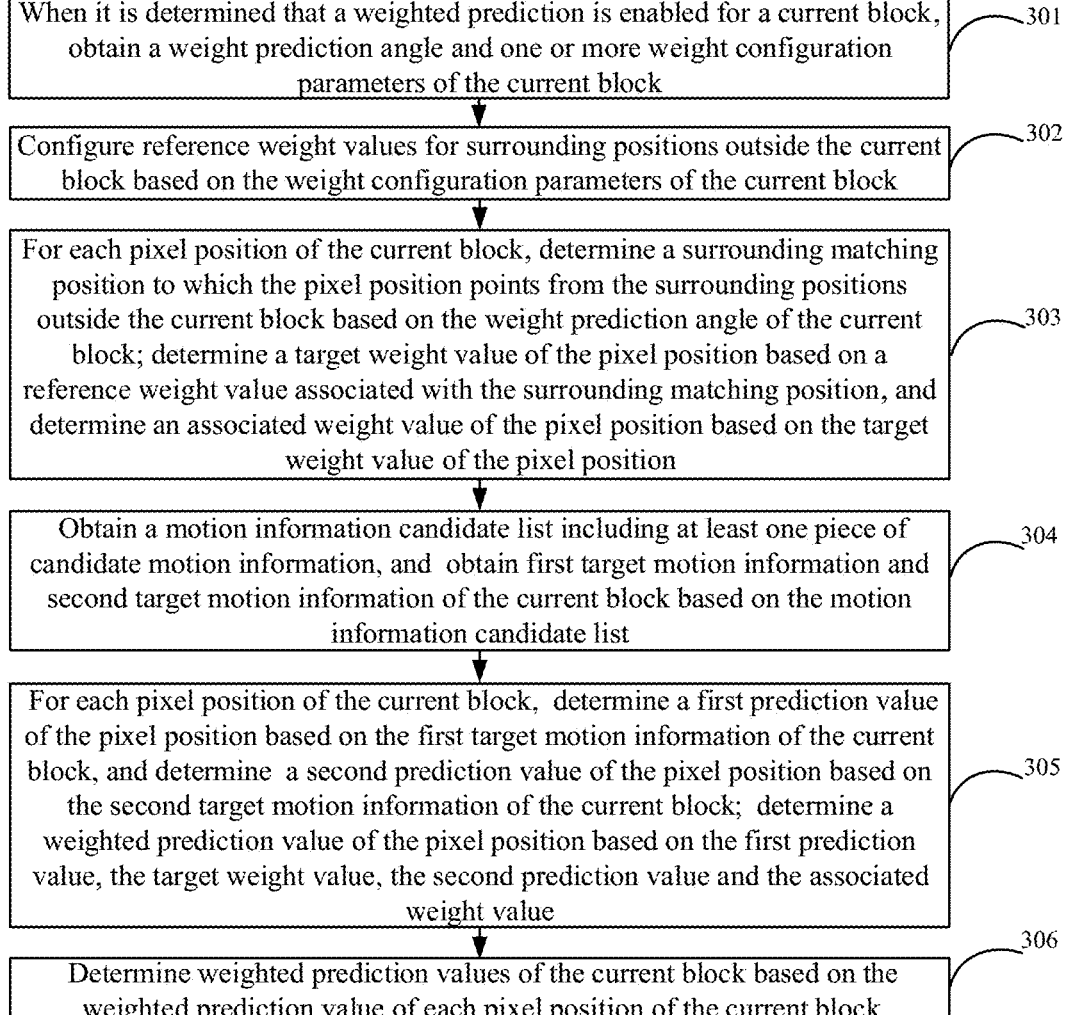

surrounding positions outside a current block weight prediction angle

FIG. 4A

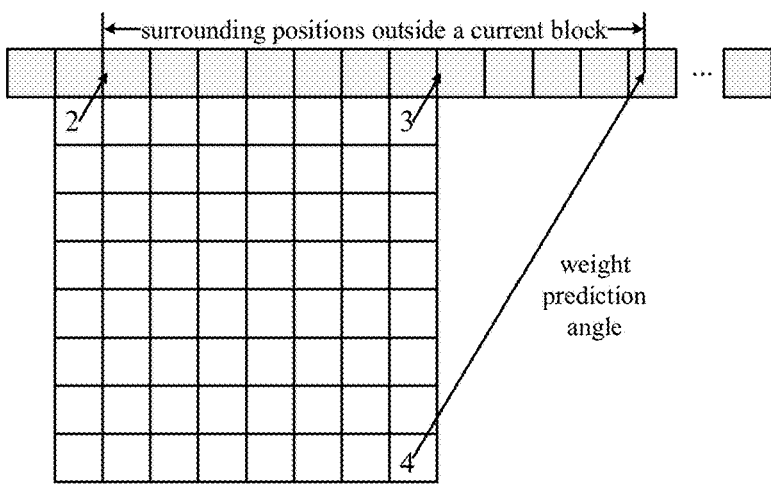
FIG. 4B
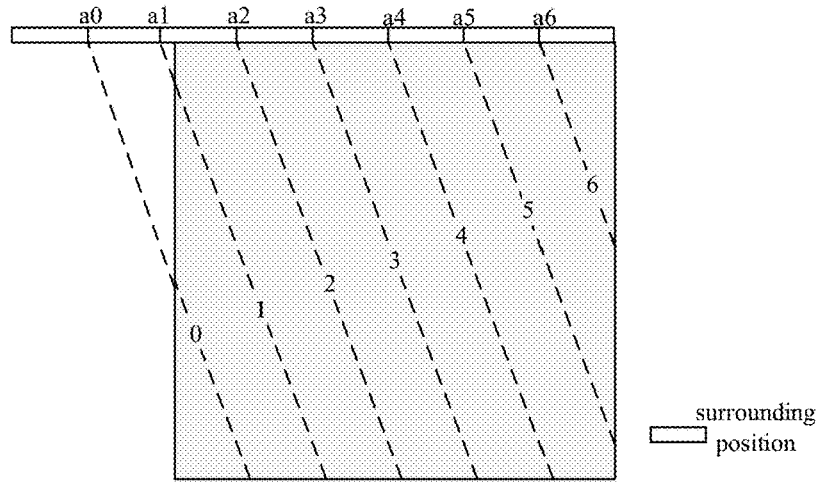
FIG. 4C
FIG. 4D

When it is determined that a weighted prediction is enabled for a current block, obtain a weight prediction angle and one or more weight configuration parameters of the current block ⟋— 501

Configure reference weight values for surrounding positions outside the current block based on the weight configuration parameters of the current block ⟋— 502

For each pixel position of the current block, determine a surrounding matching position to which the pixel position points from the surrounding positions outside the current block based on the weight prediction angle of the current block; determine a target weight value of the pixel position based on a reference weight value associated with the surrounding matching position, and determine an associated weight value of the pixel position based on the target weight value of the pixel position ⟋— 503

Obtain reference picture information and a motion vector candidate list corresponding to the reference picture information, where the motion vector candidate list includes at least one candidate motion vector, and the reference picture information includes first reference picture information and second reference picture information; obtain a first target motion vector and a second target motion vector of the current block based on the motion vector candidate list ⟋— 504

For each pixel position of the current block, determine a first prediction value of the pixel position based on the first target motion information of the current block, and determine a second prediction value of the pixel position based on the second target motion information of the current block; determine a weighted prediction value of the pixel position based on the first prediction value, the target weight value, the second prediction value and the associated weight value ⟋— 505

Determine weighted prediction values of the current block based on the weighted prediction value of each pixel position of the current block ⟋— 506

FIG. 5

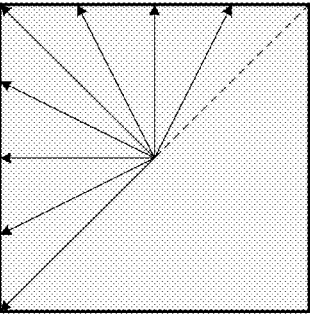

FIG. 6 weight prediction angle 5
angle region 2 weight prediction angle 7
angle region 3

ENCODING AND DECODING METHOD, APPARATUS, AND DEVICE

CROSS REFERENCE TO RELATED APPLICATIONS

This application is a continuation application of U.S. application Ser. No. 18/009,949, filed on Dec. 12, 2022, which is a national phase of International Application No. PCT/CN2021/102199 filed on Jun. 24, 2021, which claims priority to a Chinese Patent Application No. 202010622752.7 filed on Jun. 30, 2020 and titled "AN ENCODING AND DECODING METHOD, APPARATUS AND DEVICE", the entire contents of which are incorporated herein by reference.

TECHNICAL FIELD

The present disclosure relates to the technical field of encoding and decoding, in particular to encoding and decoding methods, apparatuses and devices.

BACKGROUND

In order to save space, video images are transmitted after being encoded. Video encoding can include prediction, transformation, quantization, entropy coding, filtering and other processes. Prediction may include intra prediction and inter prediction. Inter prediction refers to an operation of utilizing a temporal correlation of a video to predict current pixels by using pixels of neighbouring encoded picture(s), so as to effectively remove temporal redundancy of the video. Intra prediction refers to an operation of utilizing a spatial correlation of a video to predict current pixels by using pixels of one or more encoded blocks of the current picture, so as to remove spatial redundancy of the video.

In related art, a current block is rectangular. However, an edge of an object usually is not rectangular in practical situations. Therefore, for the edge of an object in an image, there are usually two different entities (for example, an object presented in a foreground and a background). Based on this, when motions of two entities are inconsistent, the two entities cannot be partitioned well by the rectangular partition. Even if the current block is partitioned into two non-rectangular sub-blocks and predicted through the two non-rectangular sub-blocks, at present, there are some problems such as poor prediction effect and poor coding performance.

SUMMARY

In view of this, the present disclosure provides encoding and decoding methods, apparatuses and devices, which improve prediction accuracy.

The present disclosure provides an encoding and decoding method, which includes:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which includes at least one piece of candidate motion information, and based on the motion information candidate list, obtaining first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and determining weighted prediction values of the current block based on the weighted prediction value of each pixel position of the current block.

The present disclosure provides an encoding and decoding apparatus, which includes: an obtaining module, configured to obtain, when it is determined that a weighted prediction is enabled for a current block, a weight prediction angle and one or more weight configuration parameters of the current block; a configuring module, configured to configure reference weight values for surrounding positions outside the current block based on the one or more weight configuration parameters; and a determining module, configured to, for each pixel position of the current block, determine a surrounding matching position to which the pixel position points from the surrounding positions outside the current block based on the weight prediction angle; determine a target weight value of the pixel position based on a reference weight value associated with the surrounding matching position, and determine an associated weight value of the pixel position based on the target weight value of the pixel position; where the obtaining module is further configured to, obtain a motion information candidate list which includes at least one piece of candidate motion information, and obtain first target motion information and second target motion information of the current block based on the motion information candidate list; the determining module is further configured to, for each pixel position of the current block, determine a first prediction value of the pixel position based on the first target motion information of the current block, determine a second prediction value of the pixel position based on the second target motion information of the current block, and determine a weighted prediction value of the pixel position based on the first prediction value, the target weight value, the second prediction value and the associated weight value; and determine weighted prediction values of the current block based on the weighted prediction value of each pixel position of the current block.

The present disclosure provides a decoding device, which includes a processor and a machine-readable storage medium, where the machine-readable storage medium stores machine executable instructions that can be executed by the processor;

the processor is configured to execute the machine executable instructions to perform the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which includes at least one piece of candidate motion information, and based on the motion information candidate list, obtaining first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and determining weighted prediction values of the current block based on the weighted prediction value of each pixel position of the current block.

The present disclosure provides an encoding device, which includes a processor and a machine-readable storage medium, where the machine-readable storage medium stores machine executable instructions that can be executed by the processor;

the processor is configured to execute the machine executable instructions to the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which includes at least one piece of candidate motion information, and based on the motion information candidate list, obtaining first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and determining weighted prediction values of the current block based on the weighted prediction value of each pixel position of the current block.

It can be seen from the above technical solution that an effective method of configuring weight values is provided in the examples of the present disclosure. The method can configure a reasonable target weight value for each pixel position of the current block, so that prediction accuracy, prediction performance, and coding performance can be improved, the prediction values of the current block can be more approximate to raw pixels, and coding performance can be improved.

BRIEF DESCRIPTION OF THE DRAWINGS

FIG. 1 is a schematic diagram of a video encoding framework;

FIGS. 2A to 2E are schematic diagrams of a weighted prediction;

FIG. 3 is a flowchart of an encoding and decoding method according to an example of the present disclosure;

FIGS. 4A to 4D is a schematic diagram of surrounding positions outside a current block;

FIG. 5 is a flowchart of an encoding and decoding method according to an example of the present disclosure;

FIG. 6 is a schematic diagram of weight prediction angles according to an example of the present disclosure;

DETAILED DESCRIPTION OF THE EMBODIMENTS

Figure 2D:
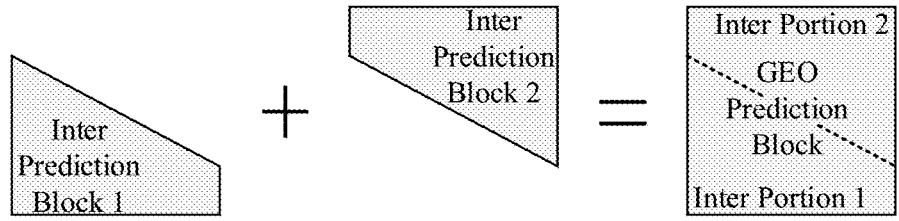

Terms used in examples of the present disclosure are only for the purpose of describing specific examples, rather than limiting the present disclosure. The singular forms "a", "said" and "the" used in the examples and claims of the present disclosure are also intended to include plural forms, unless the context clearly indicates other meanings. It should also be understood that the term "and/or" as used herein refers to any one or all possible combinations of one or more associated listed items. It should be understood that although the terms first, second, third, etc. may be used in the examples of the present disclosure to describe various information, these information should not be limited by these terms. These terms are only used to distinguish the same type of information from each other. For example, without departing from the scope of the present disclosure, first information can also be referred to as second information, and similarly, the second information can also be referred to as the first information. In addition, the word "if" used can be interpreted as "upon", "when" or "in response to".

There are provided encoding and decoding methods, apparatuses and devices in the examples of the present disclosure, which may involve the following concepts.

Intra prediction, inter prediction and Intra Block Copy (IBC) prediction:

Intra prediction refers to using one or more coded blocks for prediction based on a spatial correlation of a video, so as to remove spatial redundancy of the video. Intra prediction specifies a variety of prediction modes, each of which corresponds to a texture direction (except Direct Current (DC) mode). For example, if the texture of an image is horizontally arranged, a horizontal prediction mode can better predict image information.

Inter prediction refers to using pixels of neighbouring encoded picture(s) to predict pixels of a current picture based on a temporal correlation of a video due to a strong temporal correlation included in a video sequence, which can effectively remove temporal redundancy of the video.

IBC refers to allowing referencing a same picture, reference data of a current block comes from the same picture. IBC can also be called intra block copy. In intra block copy technology, a prediction value of the current block can be obtained by using a block vector of the current block. For example, based on the feature that there are a large number of repeated textures in the same picture of the screen content, when the prediction value of the current block is obtained by using the block vector, the compression efficiency of a screen content sequence can be improved.

Prediction Pixel (also referred to as Prediction Signal): the prediction pixel refers to a pixel value derived from a pixel which has been encoded and decoded, a residual is obtained through a difference between a raw pixel and a prediction pixel, and then residual transformation, quantization and coefficient encoding are performed. The inter prediction pixel refers to a pixel value derived from a reference picture for a current block. The final prediction pixel needs to be obtained through interpolation due to discrete pixel positions. The more approximate the prediction pixel is to the raw pixel, the smaller the residual energy obtained by subtracting the prediction pixel from the raw pixel is, and the higher the encoding compression performance is.

Motion Vector (MV): in inter prediction, the motion vector is used to indicate a relative displacement between a current block of a current picture and a reference block of a reference picture. Each block obtained by partition has a corresponding motion vector that is transmitted to a decoding side. If the motion vector of each block is independently encoded and transmitted, especially in the case of a large number of small blocks, a lot of bits will be consumed. In order to reduce the number of bits for encoding the motion vector, the spatial correlation between neighbouring blocks is used to predict the motion vector of the current block based on motion vectors of neighbouring encoded blocks, and then a prediction difference is encoded. Thus, the number of bits representing the motion vector can be effectively reduced. When the motion vector of the current block is encoded, the motion vector of the current block may be predicted by using the motion vectors of the neighbouring encoded blocks, and then a difference (Motion Vector Difference, (MVD)) between a Motion Vector Prediction (MVP) of the motion vector and a real estimated value of the motion vector may be encoded.

Motion Information: since the motion vector indicates a position offset between a current block and a reference block, in order to accurately obtain information pointing to a block, in addition to motion vector, index information of the reference picture is required to indicate which reference picture is used by the current block. In the video encoding technology, a reference picture list may be generally established for a current picture, and index information of the reference picture indicates which reference picture in the reference picture list is adopted by the current block.

In addition, many encoding technologies also support a plurality of reference picture lists, and therefore, an index value, which can be referred to as a reference direction, can also be used to indicate which reference picture list is used. To sum up, in video encoding technology, information related to motion, such as the motion vector, the reference picture index, and the reference direction, may be collectively referred to as motion information.

Rate-Distortion Optimized (RDO): two indicators for evaluating encoding efficiency include: bit rate and Peak Signal to Noise Ratio (PSNR). The smaller a bit stream is, the greater the compression rate is; the greater the PSNR is, the better the quality of a reconstructed image is. Selection of an encoding mode is usually based on a comprehensive evaluation of the two indicators. For example, the cost corresponding to a mode can be calculated according to the following formula: $J(mode)=D+\lambda*R$, where D represents a distortion, usually may be measured by a Sum of Square Error (SSE) between a reconstructed image block and a source image; X represents a Lagrangian multiplier; R represents an actual number of bits required for encoding an image block in this mode, including a total number of bits required for encoding mode information, motion information, and residuals, etc. When selecting a mode, if RDO principle is used to make a comparison decision on an encoding mode, a better coding performance can usually be guaranteed.

Video encoding framework: as shown in FIG. 1, a video encoding framework can be used to realize the processing flow at an encoding side in the examples of the present disclosure. The schematic diagram of a video decoding framework is similar to that in FIG. 1, which will not be repeated here. The video decoding framework can be used to realize the processing flow at a decoding side in the examples of the present disclosure. In an example, in the video encoding framework and the video decoding framework, there can be included, but not limited to, modules such as intra prediction/inter prediction, motion estimation/motion compensation, reference picture buffer, in-loop filtering, reconstruction, transformation, quantization, inverse transformation, inverse quantization, entropy encoder. At the encoding side, the processing flow at the encoding side can be realized through the cooperation between these modules, and at the decoding side, the processing flow at the decoding side can be realized through the cooperation between these modules.

In related art, a current block can be rectangular. However, an edge of an object usually is not rectangular in practical situations. Therefore, for the edge of an object in an image, there are usually two different entities (for example, an object presented in a foreground and a background). When motions of two objects are inconsistent, the two entities cannot be partitioned well by the rectangular partition. Therefore, the current block can be partitioned into two non-rectangular sub-blocks, and a weighted prediction can be performed on the two non-rectangular sub-blocks. In an example, the weighted prediction is to use a plurality of prediction values for weighting operation to obtain one or more final prediction values. The weighted prediction can include combined inter and intra prediction (CIIP), combined inter and inter prediction, combined intra and intra prediction, etc. For weight values of combined weighted prediction, a same weight value can be configured for different pixel positions of the current block, or different weight values can be configured for different pixel positions of the current block.

As shown in FIG. 2A, which is a schematic diagram of combined inter and intra weighted prediction.

A CIIP prediction block is weighted by an intra prediction block (that is, an intra prediction value of a pixel position is obtained by using the intra prediction mode) and an inter prediction block (that is, an inter prediction value of a pixel position is obtained by using the inter prediction mode), and a weight ratio of the intra prediction value and the inter prediction value used for each pixel position is 1:1. For example, for each pixel position, the intra prediction value of the pixel position and the inter prediction value of the pixel position are weighted to obtain a combined prediction value of the pixel position. Finally, combined prediction values of respective pixel positions are formed into a CIIP prediction block.

As shown in FIG. 2B, which is a schematic diagram of a Triangular Partition Mode (TPM).

A TPM prediction block is obtained by combining an inter prediction block 1 (that is, an inter prediction value of a pixel position is obtained by using an inter prediction mode 1) and an inter prediction block 2 (that is, an inter prediction value of a pixel position is obtained by using an inter prediction mode 2). The TPM prediction block can be partitioned into two areas, one of which can be an inter prediction area 1, and the other can be an inter prediction area 2. The two inter prediction areas of the TPM prediction block can be non-rectangular, and a boundary (which can be a dotted line) can be a first diagonal or a second diagonal of the TPM prediction block.

For each pixel position of the inter prediction area 1, the prediction value of the pixel position is determined mainly based on an inter prediction value of the inter prediction block 1. For example, when weighting of the inter prediction value of the inter prediction block 1 for the pixel position and the inter prediction value of the inter prediction block 2 for the pixel position is performed, a weight of the inter prediction value of the inter prediction block 1 is large, the weight of the inter prediction value of the inter prediction block 2 is small (even 0), and a combined prediction value of the pixel position is obtained. For each pixel position of the inter prediction area 2, the prediction value of the pixel position is determined mainly based on an inter prediction value of the inter prediction block 2. For example, when weighting of the inter prediction value of the inter prediction block 1 for the pixel position and the inter prediction value of the inter prediction block 2 for the pixel position is performed, a weight of the inter prediction value of the inter prediction block 2 is large, the weight of the inter prediction value of the inter prediction block 1 is small (even 0), and a combined prediction value of the pixel position is obtained.

As shown in FIG. 2C, which is a schematic diagram of combined inter and intra triangular weighted prediction. By modifying combined inter and intra weighted prediction, the inter prediction area and intra prediction area of the CIIP prediction block show a weight distribution of triangular weighted partition prediction.

A CIIP prediction block is obtained by combining an intra prediction block (that is, an intra prediction value of a pixel position is obtained by using the intra prediction mode) and an inter prediction block (that is, an inter prediction value of a pixel position is obtained by using the inter prediction mode). The CIIP prediction block can be partitioned into two areas, one of which can be an intra prediction area, and the other can be an inter prediction area. The inter prediction area and the intra prediction area of the CIIP prediction block can be non-rectangular. An area of a boundary (which can be a dotted line) can be partitioned by mixed weighting or directly. The boundary can be a first diagonal or a second diagonal of the CIIP prediction block. The positions of the intra prediction area and the inter prediction area are variable.

For each pixel position of the intra prediction area, the prediction value of the pixel position is determined mainly based on an intra prediction value. For example, when weighting of the intra prediction value of the pixel position and the inter prediction value of the pixel position is performed, a weight of the intra prediction value is large and a weight of the inter prediction value is small, and a combined prediction value of the pixel position is obtained. For each pixel position of the inter prediction area, the prediction value of the pixel position is determined mainly based on an inter prediction value. For example, when weighting of the intra prediction value of the pixel position and the inter prediction value of the pixel position is performed, a weight of the inter prediction value is large and a weight of the intra prediction value is small, and a combined prediction value of the pixel position is obtained.

As shown in FIG. 2D, which is a schematic diagram of a Geometric partitioning for inter blocks (GEO) mode. The GEO mode is to partition an inter prediction block into two sub-blocks by using a partition line. Unlike the TPM mode, the GEO mode can adopt more division directions. The weighted prediction process of the GEO mode is similar to that of the TPM mode.

A GEO prediction block is obtained by combining an inter prediction block 1 (that is, an inter prediction value of a pixel position is obtained by using an inter prediction mode 1) and an inter prediction block 2 (that is, an inter prediction value of a pixel position is obtained by using an inter prediction mode 2). The GEO prediction block can be partitioned into two areas, one of which can be an inter prediction area 1, and the other can be an inter prediction area 2.

For each pixel position of the inter prediction area 1, the prediction value of the pixel position is determined mainly based on an inter prediction value of the inter prediction block 1. For example, when weighting of the inter prediction value of the inter prediction block 1 for the pixel position and the inter prediction value of the inter prediction block 2 for the pixel position is performed, a weight of the inter prediction value of the inter prediction block 1 is large, and the weight of the inter prediction value of the inter prediction block 2 is small. For each pixel position of the inter prediction area 2, the prediction value of the pixel position is determined mainly based on an inter prediction value of the inter prediction block 2. For example, when weighting of the inter prediction value of the inter prediction block 1 for the pixel position and the inter prediction value of the inter prediction block 2 for the pixel position is performed, a weight of the inter prediction value of the inter prediction block 2 is large, and the weight of the inter prediction value of the inter prediction block 1 is small.

Figure 2E:
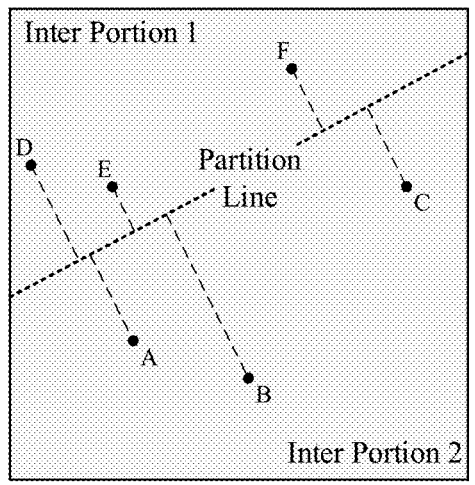

In an example, the weight configuration of the GEO prediction block is related to a distance between a pixel position and a partition line. As shown in FIG. 2E, a pixel position A, a pixel position B and a pixel position C are located at a lower right side of the partition line, and a pixel position D, a pixel position E and a pixel position F are located at an upper left side of the partition line. For the pixel position A, the pixel position B and the pixel position C, weights of the inter prediction area 2 are ranked as B≥A≥C, and weights of the inter prediction area 1 are ranked as C≥A≥B. For the pixel position D, the pixel position E and the pixel position F, weights of the inter prediction area 1 are ranked as D≥F≥E, and weights of the inter prediction area 2 are ranked as E≥F≥D. The above method needs to calculate the distance between the pixel position and the partition line, and then determine the weight value of the pixel position.

For each of the above situations, in order to achieve the weighted prediction, it is necessary to determine the weight value of each pixel position of the current block, and perform the weighted prediction on the pixel position based on the weight value of the pixel position. However, in the related art, there is no effective way to configure weight values, and it is impossible to configure reasonable weight values, which leads some problems such as poor prediction effect and poor coding performance.

In view of the above findings, there is provided a method of deriving weight values in an example of the present disclosure. The method can determine a target weight value of each pixel position of a current block based on reference weight values of surrounding positions outside the current block, and can configure a reasonable target weight value for each pixel position, so that prediction accuracy, prediction performance and coding performance can be improved, and prediction values of the current block can be more approximate to raw pixels.

The encoding and decoding methods in the examples of the present disclosure are described in detail below in combination with several specific examples.

Example 1: FIG. 3 is a flowchart of an encoding and decoding method. The method can be applied to a decoding side (also referred to as a video decoder) or an encoding side (also referred to as a video encoder). The method can include steps 301 to 306.

In step 301, when it is determined that a weighted prediction is enabled for a current block, a weight prediction angle and one or more weight configuration parameters of the current block are obtained, where the weight configuration parameters include a weight transform rate and a starting position of a weight transform. The starting position of the weight transform can be determined by at least one of the following parameters: the weight prediction angle of the current block, a weight prediction position of the current block, and a size of the current block.

In an example, when it is required to predict the current block, the decoding side or the encoding side can determine whether the weighted prediction is enabled for the current block. If the weighted prediction is enabled for the current block, the encoding and decoding method according to the example of the present disclosure is adopted, that is, step 301 and subsequent steps are performed. If the weighted prediction is not enabled for the current block, the implementation method is not limited in the examples of the present disclosure.

In an example, when it is determined that the weighted prediction is enabled for the current block, the weight prediction angle of the current block, the weight prediction position of the current block, and the weight transform rate of the current block can be obtained. Then, based on at least one of the weight prediction angle of the current block, the weight prediction position of the current block and the size of the current block, the starting position of the weight transform of the current block can be determined. So far, the weight prediction angle of the current block, the weight transform rate of the current block, and the starting position of the weight transform of the current block can be obtained.

In step 302, reference weight values are configured for surrounding positions outside the current block based on the weight configuration parameters of the current block.

In an example, the number of the surrounding positions outside the current block can be determined based on the size of the current block and/or the weight prediction angle of the current block. For example, the number M of the surrounding positions outside the current block is determined based on the size of the current block and/or the weight prediction angle of the current block, and the reference weight values are configured for M surrounding positions based on the weight configuration parameters of the current block.

In an example, the reference weight values of the surrounding positions outside the current block can monotonically increase. In another example, the reference weight values of the surrounding positions outside the current block can monotonically decrease. For example, the arrangement of the reference weight values of the surrounding positions outside the current block can be 00 . . . 0024688 . . . 88, or the arrangement of the reference weight values of the surrounding positions outside the current block can be 88 . . . 8864200 . . . 00.

In an example, the surrounding positions outside the current block may include one or more integer pixel positions, one or more sub-pixel positions, or one or more integer pixel positions and one or more sub-pixel positions. The surrounding positions outside the current block can include, but are not limited to, surrounding positions in an upper row outside the current block, or surrounding positions in a left column outside the current block, or surrounding positions in a lower row outside the current block, or surrounding positions in a right column outside the current block. The above is only examples of the surrounding positions, which is not limited herein.

In a possible implementation, the reference weight values of the surrounding positions outside the current block include one or more reference weight values of a target area, one or more reference weight values of a first neighbouring area of the target area, and one or more reference weight values of a second neighbouring area of the target area.

In an example, the reference weight values of the first neighbouring area are all a first reference weight value, and the reference weight values of the second neighbouring area monotonically increase. Or, the reference weight values of the first neighbouring area are all the first reference weight value, and the reference weight values of the second neighbouring area monotonically decrease. Or, the reference weight values of the first neighbouring area are all a second reference weight value, the reference weight values of the second neighbouring area are all a third reference weight value, and the second reference weight value is different from the third reference weight value. Or, the reference weight values of the first neighbouring area monotonically increase, and the reference weight values of the second neighbouring area monotonically increase. Or, the reference weight values of the first neighbouring area monotonically decrease, and the reference weight values of the second neighbouring area monotonically decrease.

In an example, the target area includes one reference weight value or at least two reference weight values. If the target area includes at least two reference weight values, the at least two reference weight values of the target area monotonically increase or decrease.

In step 303, for each pixel position of the current block, a surrounding matching position to which the pixel position points is determined from the surrounding positions outside the current block based on the weight prediction angle of the current block; a target weight value of the pixel position is determined based on a reference weight value associated with the surrounding matching position, and an associated weight value of the pixel position is determined based on the target weight value of the pixel position.

In an example, the weight prediction angle indicates an angular direction to which pixel positions inside the current block point. For example, for a pixel position of the current block, based on a certain weight prediction angle, the angular direction corresponding to the weight prediction angle points to a certain surrounding position outside the current block. Based on this, for each pixel position of the current block, the angular direction to which the pixel position points is determined based on the weight prediction angle, and based on the angular direction, a surrounding matching position to which the pixel position points is determined from the surrounding positions outside the current block.

For each pixel position of the current block, after determining the surrounding matching position to which the pixel position points, a target weight value of the pixel position is determined based on a reference weight value associated with the surrounding matching position. For example, the reference weight value associated with the surrounding matching position is determined as the target weight value of the pixel position. Then, an associated weight value of the pixel position is determined based on the target weight value of the pixel position. For example, a sum of the target weight value and the associated weight value of each pixel position can be a fixed preset value. Therefore, the associated weight value can be a difference between the preset value and the target weight value. It is assumed that the preset value is 8, if the target weight value of the pixel position is 0, then the associated weight value of the pixel position is 8; if the target weight value of the pixel position is 1, then the associated weight value of the pixel position is 7, and so on, as long as the sum of the target weight value and the associated weight value is 8.

In step 304, a motion information candidate list including at least one piece of candidate motion information is obtained, and first target motion information and second target motion information of the current block are obtained based on the motion information candidate list.

In step 305, for each pixel position of the current block, a first prediction value of the pixel position is determined based on the first target motion information of the current block, and a second prediction value of the pixel position is determined based on the second target motion information of the current block; a weighted prediction value of the pixel position is determined based on the first prediction value, the target weight value, the second prediction value and the associated weight value.

In an example, it is assumed that the target weight value is a weight value corresponding to the first target motion information and the associated weight value is a weight value corresponding to the second target motion information, the weighted prediction value of the pixel position can be: (the first prediction value of the pixel position*the target weight value of the pixel position+the second prediction value of the pixel position*the associated weight value of the pixel position)/a fixed preset value. In another example, it is assumed that the target weight value is a weight value corresponding to the second target motion information and the associated weight value is a weight value corresponding to the first target motion information, the weighted prediction value of the pixel position can be: (the second prediction value of the pixel position*the target weight value of the pixel position+the first prediction value of the pixel position*the associated weight value of the pixel position)/a fixed preset value.

In step 306, weighted prediction values of the current block are determined based on the weighted prediction value of each pixel position of the current block.

For example, the weighted prediction values of all pixel positions of the current block are formed into the weighted prediction values of the current block.

It can be seen from the above technical solution that an effective method of configuring weight values is provided in the examples of the present disclosure. The method can configure a reasonable target weight value for each pixel position of the current block, so that prediction accuracy, prediction performance, and coding performance can be improved, the prediction values of the current block can be more approximate to raw pixels, and coding performance can be improved.

Example 2: an example of the present disclosure provides another encoding and decoding method, which can be applied to an encoding side. The method includes steps a1 to a9.

In step a1, when it is determined that a weighted prediction is enabled for a current block, the encoding side obtains a weight prediction angle of the current block, a weight prediction position of the current block, and a weight transform rate of the current block. For example, the encoding side determines whether the weighted prediction is enabled for the current block. If yes, step a1 and subsequent steps will be performed. If not, the processing method is not limited in the present disclosure.

In a possible implementation, if the current block satisfies conditions for enabling the weighted prediction, it is determined that the weighted prediction is enabled for the current block. If the current block does not satisfy the conditions for enabling the weighted prediction, it is determined that the weighted prediction is not enabled for the current block. For example, whether feature information of the current block meets specific conditions is determined. If yes, it is determined that the weighted prediction is enabled for the current block; if not, it is determined that the weighted prediction is not enabled for the current block. The feature information includes, but is not limited to, one or any combination of the following: a picture (slice) type of a current picture (slice) where the current block is located, size information of the current block, and switching control information. The switching control information can include, but is not limited to, sequence level (e.g., Sequence Parameter Set (SPS) and Sequence Header (SH)) switching control information, or picture level (e.g., Picture Parameter Set (PPS) and Picture Header (PH)) switching control information, or slice level (e.g., Slice, Tile, Patch), or largest coding unit level (e.g., Largest Coding Unit (LCU) and Coding Tree Unit (CTU)) switching control information.

For example, if the feature information is the picture (slice) type of the current picture (slice) where the current block is located, the picture (slice) type of the current picture (slice) where the current block is located satisfying the specific conditions can include, but not limited to, if the picture (slice) type of the current picture (slice) where the current block is located is a B picture (slice), it is determined that the picture (slice) type satisfies the specific conditions; or, if the picture (slice) type of the current picture (slice) where the current block is located is an I picture (slice), it is determined that the picture (slice) type satisfies the specific conditions.

For example, if the feature information is the size information of the current block, such as a width and a height of the current block, the size information satisfying the specific conditions can include, but not limited to, if the width is greater than or equal to a first value, and the height is greater than or equal to a second value, it is determined that the size information of the current block satisfies the specific conditions; or, if the width is greater than or equal to a third value, the height is greater than or equal to a fourth value, the width is less than or equal to a fifth value, and the height is less than or equal to a sixth value, it is determined that the size information of the current block satisfies the specific conditions; or, if a product of the width and the height is greater than or equal to a seventh value, it is determined that the size information of the current block satisfies certain conditions. The above values can be configured based on experience, such as 8, 16, 32, 64, 128, etc. For example, the first value is 8, the second value is 8, the third value is 8, the fourth value is 8, the fifth value is 64, the sixth value is 64, and the seventh value is 64. To sum up, if the width is greater than or equal to 8 and the height is greater than or equal to 8, it is determined that the size information of the current block satisfies the specific conditions. Or, if the width is greater than or equal to 8, the height is greater than or equal to 8, the width is less than or equal to 64, and the height is less than or equal to 64, it is determined that the size information of the current block satisfies the specific conditions. Or, if the product of the width and the height is greater than or equal to 64, it is determined that the size information of the current block satisfies the specific conditions.

For example, if the feature information is the size information of the current block, such as the width and the height of the current block, the size information of the current block satisfying the specific conditions can include, but not limited to, the width is not less than a and not greater than b, and the height is not less than a and not greater than b. In an example, a may be less than or equal to 16, and b may be greater than or equal to 16. For example, a is equal to 8, and b is equal to 64 or 32.

For example, if the feature information is the switching control information, the switching control information satisfying the specific conditions can include, but not limited to, if the switching control information is that the weighted prediction is allowed to be enabled for the current block, it is determined that the switching control information satisfies the specific conditions.

For example, if the feature information is the picture (slice) type of the current picture (slice) where the current block is located and the size information of the current block, when the picture (slice) type satisfies specific conditions, and the size information satisfies specific conditions, it can be determined that the feature information of the current block satisfies the specific conditions. Or, if the feature information is the picture (slice) type of the current picture (slice) where the current block is located and the switching control information, when the picture (slice) type satisfies specific conditions, and the switching control information satisfies specific conditions, it can be determined that the feature information of the current block satisfies the specific conditions. Or, if the feature information is the size information of the current block and the switching control information, when the size information satisfies specific conditions, and the switching control information satisfies specific conditions, it can be determined that the feature information of the current block satisfies the specific conditions. Or, if the feature information is the picture (slice) type of the current picture (slice) where the current block is located, the size information of the current block, and the switching control information, when the picture (slice) type satisfies specific conditions, the size information satisfies specific conditions, and the switching control information satisfies specific conditions, it can be determined that the feature information of the current block satisfies the specific conditions.

In a possible implementation, when it is determined that the weighted prediction is enabled for the current block, the encoding side can obtain the weight prediction angle of the current block, the weight prediction position of the current block, and the weight transform rate of the current block.

In an example, the weight prediction angle indicates an angular direction to which pixel positions inside the current block point. As shown in FIG. 4A, based on a certain weight prediction angle, an angular direction to which pixel positions (such as pixel position 1, pixel position 2 and pixel position 3) inside the current block point is shown. For a pixel position inside the current block, the angular direction points to a certain surrounding position outside the current block. As shown in FIG. 4B, based on another weight prediction angle, an angular direction to which pixel positions (such as pixel position 2, pixel position 3 and pixel position 4) inside the current block point is shown. For a pixel position inside the current block, the angular direction points to a certain surrounding position outside the current block.

In an example, the weight prediction position (also referred to as a distance parameter) is used to configure reference weight values of surrounding positions outside the current block. For example, based on parameters such as the weight prediction angle of the current block and the size of the current block, the range of the surrounding positions outside the current block (that is, the number of the surrounding positions outside the current block) is determined, as shown in FIG. 4A or FIG. 4B.

Then, the range of the surrounding positions is divided into N equal parts. The value of N can be arbitrarily configured, such as 4, 6, 8, etc. Taking 8 as an example, the weight prediction position is used to indicate which surrounding position outside the current block is a starting position of the weight transform of the current block, so as to configure the reference weight values of the surrounding positions outside the current block based on the starting position of the weight transform.

Figure 7:
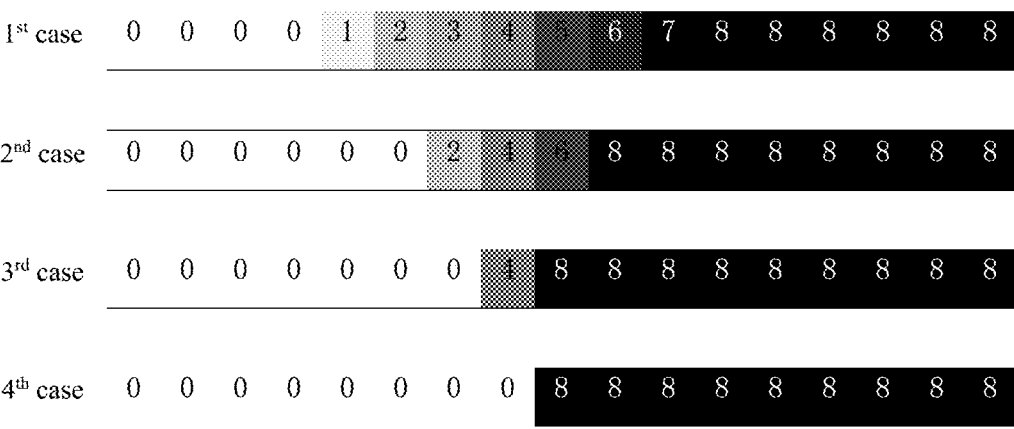
FIG. 7 is a schematic diagram of reference weight values of four weight transform rates according to an example of the present disclosure.

As shown in FIG. 4C, 7 weight prediction positions can be obtained after all surrounding positions are divided into 8 equal parts. On this basis, when a weight prediction position is 0, it can be indicated that a surrounding position a0 (that is, a surrounding position to which a dotted line 0 points, the dotted line 0 does not exist in practical applications and is only for the convenience of understanding given examples, and dotted lines 0 to 6 are used to divide all surrounding positions into 8 equal parts) is taken the starting position of the weight transform of the surrounding positions outside the current block. By analogy, when a weight prediction position is 6, it can be indicated that a surrounding position a6 is taken the starting position of the weight transform of the surrounding positions outside the current block.

The value of N can be different for different weight prediction angles. For example, for a weight prediction angle A, the value of N can be 6, which means that the range of surrounding positions determined based on the weight prediction angle A is divided into 6 equal parts, and for a weight prediction angle B, the value of N can be 8, which means that the range of surrounding positions determined based on the weight prediction angle B is divided into 8 equal parts.

For different weight prediction angles, the value of N can also be the same. If the value of N is the same, the number of weight prediction positions can be different. For example, for the weight prediction angle A, the value of N is 8, which means that the range of the surrounding positions determined based on the weight prediction angle A is divided into 8 equal parts; for the weight prediction angle B, the value of N is 8, which means that the range of the surrounding positions determined based on the weight prediction angle B is divided into 8 equal parts. However, five positions a1 to a5 are selected for the weight prediction positions corresponding to the weight prediction angle A, and seven positions a0 to a6 are selected for the weight prediction positions corresponding to the weight prediction angle B.

The above is to take the N equal division of the range of surrounding positions as an example. In practical applications, uneven division can also be used, for example, the range of surrounding positions is divided into N parts instead of N equal parts, which is not limited herein.

After all the surrounding positions are divided into 8 equal parts, 7 weight prediction positions can be obtained. In the step a1, for example, the encoding side can obtain a weight prediction position from the 7 weight prediction positions, or select some weight prediction positions (such as 5 weight prediction positions) from the 7 weight prediction positions and obtain a weight prediction position from the 5 weight prediction positions.

In an example, the weight transform rate indicates a transform rate of the reference weight values of the surrounding positions outside the current block, and is used to indicate a change speed of the reference weight values. The weight transform rate can be any number other than 0, for example, the weight transform rate can be $-4, -2, -1, 1, 2, 4, 0.5, 0.75, 1.5$, etc. When an absolute value of the weight transform rate is 1, that is, the weight transform rate is $-1$ or 1, the weight transform rate is used to indicate that the change speed of the reference weight values is 1. The reference weight values need to pass through values such as $0, 1, 2, 3, 4, 5, 6, 7, 8$ from 0 to 8, and the reference weight values need to pass through values such as $8, 7, 6, 5, 4, 3, 2, 1, 0$ from 8 to 0. When an absolute value of the weight transform rate is 2, that is, the weight transform rate is $-2$ or 2, the weight transform rate is used to indicate that the change speed of the reference weight values is 2. The reference weight values need to pass through values such as $0, 2, 4, 6, 8$ from 0 to 8, and the reference weight values need to pass through values such as $8, 6, 4, 2, 0$ from 8 to 0. When an absolute value of the weight transform rate is 4, that is, the weight transform rate is $-4$ or 4, the weight transform rate is used to indicate that the change speed of the reference weight values is 4. The reference weight values need to pass through values such as $0, 4, 8$ from 0 to 8, and the reference weight values need to pass through values such as $8, 4, 0$ from 8 to 0. When an absolute value of the weight transform rate is 0.5, that is, the weight transform rate is $-0.5$ or 0.5, the weight transform rate is used to indicate that the change speed of the reference weight values is 0.5. The reference weight values need to pass through values such as $0, 0, 1, 1, 2, 2, 3, 3, 4, 4, 5, 5, 6, 6, 7, 7, 8, 8$ from 0 to 8. The reference weight values need to pass through values such as $8, 8, 7, 7, 6, 6, 5, 5, 4, 4, 3, 3, 2, 2, 1, 1, 0, 0$ from 8 to 0. The above is to take values from 0 to 8 as examples, and 0 and 8 can be replaced with any values.

In step a2, the encoding side configures reference weight values for the surrounding positions outside the current block based on the weight transform rate and the starting position of the weight transform of the current block (the weight transform rate and the starting position of the weight transform can be referred to as weight configuration parameters).

In an example, the starting position of the weight transform can be determined by at least one of the following parameters: the weight prediction angle of the current block, the weight prediction position of the current block, and the size of the current block. Therefore, the starting position of the weight transform of the current block can be determined based on at least one of the weight prediction angle of the current block, the weight prediction position of the current block, and the size of the current block. Then, the reference weight values are configured for the surrounding positions outside the current block based on the weight transform rate and the starting position of the weight transform of the current block.

In step a3, for each pixel position of the current block, the encoding side determines a surrounding matching position to which the pixel position points from the surrounding positions outside the current block based on the weight prediction angle of the current block. For the convenience of distinction, in this example, a surrounding position outside the current block to which the pixel position points is referred to as the surrounding matching position of the pixel position.

In an example, since the weight prediction angle indicates an angular direction to which pixel positions inside the current block point, for each pixel position of the current block, the angular direction to which the pixel position points is determined based on the weight prediction angle, and based on the angular direction, a surrounding matching position to which the pixel position points is determined from the surrounding positions outside the current block.

The surrounding positions outside the current block can include: surrounding positions in an upper row outside the current block, such as surrounding positions in a n1-th row on the upper outside the current block, where n1 can be 1, 2, 3, etc., which is not limited herein; or, surrounding positions in a left column outside the current block, such as surrounding positions in a n2-th column on the left outside the current block, where n2 can be 1, 2, 3, etc., which is not limited herein; or, surrounding positions in a lower row outside the current block, such as surrounding positions in a n3-th row on the lower outside the current block, where n3 can be 1, 2, 3, etc., which is not limited herein; or, surrounding positions in a right column outside the current block, such as surrounding positions in a n4-th column on the right outside the current block, where n4 can be 1, 2, 3, etc., which is not limited herein.

The above are only a few examples of the surrounding positions, which is not limited herein. In practical applications, in addition to the surrounding positions outside the current block, positions inside the current block (internal positions) can also be used, that is, the positions inside the current block are used to replace the surrounding positions outside the current block. For example, the positions inside the current block can be positions in a n5-th row inside the current block, where n5 can be 1, 2, 3, etc. In another example, the positions inside the current block can be positions in the n6-th column inside the current block, where n6 can be 1, 2, 3, etc. The length of the internal positions (that is, a row where the positions inside the current block are located) can exceed the range of the current block. For example, positions in a n7-th row can exceed the range of the current block, that is, extend outwardly from two sides of the current block.

The positions inside the current block and the surrounding positions outside the current block can also be used at the same time.

For the case of using the positions inside the current block, or using the positions inside the current block and the surrounding positions outside the current block at the same time, the current block can be partitioned into upper and lower small blocks by a row where the internal positions are located, or can be partitioned into left and right small blocks by a column where the internal positions are located. At this time, the two small blocks have a same weight prediction angle and a same reference weight configuration.

In an example, a surrounding position outside the current block can be located between pixel positions, that is, the surrounding position outside the current block can be a sub-pixel position. At this time, the surrounding positions outside the current block cannot be simply described as a x-th row, but is a sub-pixel position row between a x-th row and a y-th row.

For the convenience of description, in subsequent examples, surrounding positions in a first row on the upper outside the current block or surrounding positions in a first column on the left outside the current block are taken as an example, and for other surrounding positions may be implemented in a similar way.

In an example, for the range of the surrounding positions outside the current block, a certain range can be pre-designated as the range of the surrounding positions outside the current block. Or, the range of the surrounding positions outside the current block can be determined based on the weight prediction angle. For example, a surrounding position to which each pixel position inside the current block points is determined based on the weight prediction angle, and the boundary of surrounding positions to which all pixel positions point can be the range of the surrounding positions outside the current block. The range of the surrounding positions outside the current block is not limited herein.

The surrounding positions outside the current block may include one or more integer pixel positions; or, the surrounding positions outside the current block can include one or more non-integer pixel positions. The non-integer pixel position can be a sub-pixel position, such as a ½ sub-pixel position, a ¼ sub-pixel position, or a ¾ sub-pixel position, which is not limited herein. In an example, the surrounding positions outside the current block may include one or more integer pixel positions and one or more sub-pixel positions.

In an example, two surrounding positions outside the current block can correspond to one integer pixel position; or, four surrounding positions outside the current block can correspond to one integer pixel position; or, one surrounding position outside the current block can correspond to one integer pixel position; or, one surrounding position outside the current block can correspond to two integer pixel positions. The above are only several examples and not limited herein. The relationship between the surrounding position and the integer pixel position can be configured arbitrarily.

As shown in FIGS. 4A and 4B, one surrounding position corresponds to one integer pixel position, and as shown in FIG. 4D, two surrounding positions correspond to one integer pixel position. Other examples will not be redundantly described in this embodiment.

In step a4, the encoding side determines a target weight value of the pixel position based on a reference weight value associated with the surrounding matching position.

For each pixel position of the current block, after determining the surrounding matching position to which the pixel position points, the encoding side determines the reference weight value associated with the surrounding matching position, and determines the target weight value of the pixel position based on the reference weight value associated with the surrounding matching position, for example, the reference weight value associated with the surrounding matching position may be determined as the target weight value of the pixel position.

In a possible implementation, the encoding side determines the target weight value of the pixel position based on the reference weight value associated with the surrounding matching position, which can include the following five cases. In case 1, if the surrounding matching position is an integer pixel position and the integer pixel position has been set with a reference weight value, the target weight value of the pixel position is determined based on the reference weight value of the integer pixel position.

In case 2, if the surrounding matching position is an integer pixel position and the integer pixel position is not set with a reference weight value, the target weight value of the pixel position can be determined based on the reference weight value(s) of the neighbouring position(s) of the integer pixel position. For example, an upward rounding operation is performed for a reference weight value of a neighbouring position to obtain the target weight value of the pixel position; or, a downward rounding operation is performed for a reference weight value of a neighbouring position to obtain the target weight value of the pixel position; or, the target weight value of the pixel position is determined based on an interpolation of reference weight values of the neighbouring positions of the integer pixel position. The determination manner is not limited herein.

In case 3, if the surrounding matching position is a sub-pixel position and the sub-pixel position is set with a reference weight value, the target weight value of the pixel position may be determined based on the reference weight value of the sub-pixel position.

In case 4, if the surrounding matching position is a sub-pixel position and the sub-pixel position is not set with a reference weight value, the target weight value of the pixel position is determined based on reference weight value(s) of neighbouring position(s) of the sub-pixel position. For example, an upward rounding operation is performed for a reference weight value of a neighbouring position to obtain the target weight value of the pixel position; or, a downward rounding operation is performed for a reference weight value of a neighbouring position to obtain the target weight value of the pixel position; or the target weight value of the pixel position is determined based on an interpolation of reference weight values of the neighbouring positions of the sub-pixel position. The determination manner is not limited herein.

In case 5, the target weight value of the pixel position is determined based on multiple reference weight values associated with the surrounding matching position. For example, regardless of whether the surrounding matching position is an integer pixel position or a sub-pixel position, reference weight values of multiple neighbouring positions of the surrounding matching position can be obtained. If the surrounding matching position is set with a reference weight value, a weighted operation is performed for the reference weight value of the surrounding matching position and the reference weight values of the multiple neighbouring positions to obtain the target weight value of the pixel position. If the surrounding matching position is not set with a reference weight value, a weighted operation is performed for the reference weight values of the multiple neighbouring positions to obtain the target weight value of the pixel position.

In step a5, the encoding side determines an associated weight value of the pixel position based on the target weight value of the pixel position.

In an example, for each pixel position, a sum of the target weight value of the pixel position and the associated weight value of the pixel position can be a fixed preset value, that is, the associated weight value can be a difference between the preset value and the target weight value. Based on this, it is assumed that the preset value is 8, and the target weight value of the pixel position is 2, the associated weight value of the pixel position is 6.

In step a6, the encoding side obtains a motion information candidate list, which includes at least one piece of candidate motion information; and obtains first target motion information and second target motion information of the current block based on the motion information candidate list.

In step a7, for each pixel position of the current block, the encoding side determines a first prediction value of the pixel position based on the first target motion information of the current block, and determines a second prediction value of the pixel position based on the second target motion information of the current block.

In step a8, the encoding side determines a weighted prediction value of the pixel position based on the first prediction value of the pixel position, the target weight value of the pixel position, the second prediction value of the pixel position and the associated weight value of the pixel position.

For example, the weighted prediction value of the pixel position can be: (the first prediction value of the pixel position*the target weight value of the pixel position+the second prediction value of the pixel position*the associated weight value of the pixel position)/a fixed preset value.

In step a9, the encoding side determines weighted prediction values of the current block based on the weighted prediction value of each pixel position of the current block.

Example 3: an example of the present disclosure provides another encoding and decoding method, which can be applied to a decoding side. The method includes b1 to b9.

In step b1, when it is determined that a weighted prediction is enabled for a current block, the decoding side obtains a weight prediction angle of the current block, a weight prediction position of the current block, and a weight transform rate of the current block. For example, the decoding side determines whether the weighted prediction is enabled for the current block. If yes, step b1 and subsequent steps will be performed. If not, the processing method is not limited in the present disclosure.

In a possible implementation, the encoding side determines whether feature information of the current block satisfies specific conditions, and if yes, the encoding side determines that the weighted prediction is enabled for the current block. The decoding side also determines whether the feature information of the current block satisfies the specific conditions. If yes, the encoding side determines that the weighted prediction is enabled for the current block; if not, the encoding side determines that weighted prediction is not enabled for the current block. A manner in which the decoding side determines whether the weighted prediction is enabled for the current block based on the feature information is similar to the determination method of the encoding side, which will not be repeated herein.

In another possible implementation, the decoding side determines whether the current block supports the weighted prediction based on the feature information of the current block. When the current block supports the weighted prediction, other strategies can also be adopted to determine whether the weighted prediction is enabled for the current block, for example, the RDO principle is adopted to determine whether the weighted prediction is enabled for the current block. After determining whether the weighted prediction is enabled for the current block, when the encoding side sends a coded bit stream of the current block, the coded bit stream can include syntax for whether the weighted prediction is enabled, where the syntax indicates whether the weighted prediction is enabled for the current block. The decoding side determines whether the current block supports weighted prediction based on the feature information of the current block, and the specific method is similar to the determination method of the encoding side, which will not be repeated herein. When determining that the current block supports weighted prediction, the decoding side can also parse the syntax for whether the weighted prediction is enabled from the coded bit stream, and determine whether the weighted prediction is enabled for the current block based on the syntax.

In an example, when determining that the weighted prediction is enabled for the current block, the decoding side can also obtain the weight prediction angle of the current block, the weight prediction position of the current block, and the weight transform rate of the current block. The relevant description of the weight prediction angle, the weight prediction position and the weight transform rate can be referred to step a1, which will not be repeated herein.

In step b2, the decoding side configures reference weight values for surrounding positions outside the current block based on the weight transform rate and a starting position of a weight transform (the weight transform rate and the starting position of the weight transform can be referred to as weight configuration parameters) of the current block.

In an example, the decoding side can determine the starting position of the weight transform of the current block based on at least one of the weight prediction angle of the current block, the weight prediction position of the current block and the size of the current block. Then, the decoding side configures reference weight values for the surrounding positions outside the current block based on the weight transform rate and the starting position of the weight transform of the current block.

In step b3, for each pixel position of the current block, the decoding side determines a surrounding matching position to which the pixel position points from the surrounding positions outside the current block based on the weight prediction angle of the current block.

In step b4, the decoding side determines a target weight value of the pixel position based on a reference weight value associated with the surrounding matching position.

In step b5, the decoding side determines an associated weight value of the pixel position based on the target weight value of the pixel position.

In step b6, the decoding side obtains a motion information candidate list, which includes at least one piece of candidate motion information; and obtains first target motion information and second target motion information of the current block based on the motion information candidate list.

In step b7, for each pixel position of the current block, the decoding side determines a first prediction value of the pixel position based on the first target motion information of the current block, and determines a second prediction value of the pixel position based on the second target motion information of the current block.

In step b8, the decoding side determines a weighted prediction value of the pixel position based on the first prediction value of the pixel position, the target weight value of the pixel position, the second prediction value of the pixel position and the associated weight value of the pixel position.

In step b9, the decoding side determines weighted prediction values of the current block based on the weighted prediction value of each pixel position of the current block.

In an example, the implementation process of steps b2 to b8 can be referred to steps a2 to a8. The difference is that steps b2 to b8 are the processing flow of the decoding side, not the processing flow of the encoding side, and will not be repeated herein.

Example 4: FIG. 5 is a flowchart of an encoding and decoding method. The method can be applied to a decoding side (also referred to as a video decoder) or an encoding side (also referred to as a video encoder). The method can include steps 501 to 506.

In step 501, when it is determined that a weighted prediction is enabled for a current block, a weight prediction angle and one or more weight configuration parameters of the current block are obtained, where the weight configuration parameters include a weight transform rate and a starting position of a weight transform. The starting position of the weight transform can be determined by at least one of the following parameters: the weight prediction angle of the current block, a weight prediction position of the current block, and a size of the current block.

In step 502, reference weight values are configured for surrounding positions outside the current block based on the weight configuration parameters of the current block.

In step 503, for each pixel position of the current block, a surrounding matching position to which the pixel position points is determined from the surrounding positions outside the current block based on the weight prediction angle of the current block; a target weight value of the pixel position is determined based on a reference weight value associated with the surrounding matching position, and an associated weight value of the pixel position is determined based on the target weight value of the pixel position.

As an example, steps 501 to 503 can be referred to steps 301 to 303, and will not be repeated herein.

In step 504, reference picture information is obtained, and a motion vector candidate list corresponding to the reference picture information is obtained, where the motion vector candidate list includes at least one candidate motion vector, and the reference picture information includes first reference picture information and second reference picture information; a first target motion vector and a second target motion vector of the current block are obtained based on the motion vector candidate list.

In step 505, for each pixel position of the current block, a first prediction value of the pixel position is determined based on first target motion information of the current block, and a second prediction value of the pixel position is determined based on second target motion information of the current block; a weighted prediction value of the pixel position is determined based on the first prediction value, the target weight value, the second prediction value and the associated weight value.

In a possible implementation, the first target motion information of the current block may include the first target motion vector of the current block and the first reference picture information corresponding to the first target motion vector, and the second target motion information of the current block may include the second target motion vector of the current block and the second reference picture information corresponding to the second target motion vector.

In an example, the first reference picture information may be the same as the second reference picture information, or the first reference picture information may be different from the second reference picture information. If the first reference picture information is the same as the second reference picture information, a reference picture to which the first target motion vector points and a reference picture to which the second target motion vector points are a same picture. If the first reference picture information is different from the second reference picture information, a reference picture to which the first target motion vector points and a reference picture to which the second target motion vector points are different pictures.

In step 506, weighted prediction values of the current block are determined based on the weighted prediction value of each pixel position of the current block.

In an example, when the encoding and decoding method is applied to the encoding side, the detailed flow of steps 501 to 506 can also be implemented through example 2. The difference is that in step a6, the encoding side obtains a motion vector candidate list, obtains a first target motion vector and a second target motion vector of the current block based on the motion vector candidate list, obtains first target motion information based on the first target motion vector and first reference picture information corresponding to the first target motion vector, and obtains second target motion information based on the second target motion vector and second reference picture information corresponding to the second target motion vector, which will not be repeated herein.

In an example, when the encoding and decoding method is applied to the decoding side, the detailed flow of steps 501 to 506 can also be implemented through Example 3. The difference is that in step b6, the decoding side obtains a motion vector candidate list, obtains a first target motion vector and a second target motion vector of the current block based on the motion vector candidate list, obtains first target motion information based on the first target motion vector and first reference picture information corresponding to the first target motion vector, and obtains second target motion information based on the second target motion vector and second reference picture information corresponding to the second target motion vector, which will not be repeated herein.

It can be seen from the above technical solution that, in the examples of the present disclosure, there is provided an effective method of configuring weight values, which can configure a reasonable target weight value for each pixel position of the current block, so that prediction accuracy, prediction performance and coding performance can be improved, and prediction values of the current block can be more approximate to raw pixels, and coding performance can be improved.

Example 5: in examples 1 to 4, it is required to perform weighting processing based on a weight prediction angle. This weighting processing method can be referred to as an inter Angular Weighted Prediction (AWP) mode. That is, when the current block supports the AWP mode, the current block is predicted by examples 1 to 4 to obtain prediction values of the current block.

Examples 1 to 4 involve the weight prediction angle. The weight prediction angle can be any angle, such as any angle within 180 degrees, or any angle within 360 degrees. The weight prediction angle is not limited herein, such as 10 degrees, 20 degrees, 30 degrees, etc.

In a possible implementation, the weight prediction angle may be a horizontal angle; or, the weight prediction angle can be a vertical angle; or, an absolute value of a slope of the weight prediction angle (the absolute value of the slope of the weight prediction angle is also a tangent value of the weight prediction angle) can be a n-th power of 2, where n is an integer, such as a positive integer, 0, a negative integer, etc.

For example, the absolute value of the slope of the weight prediction angle can be 1 (that is, a value of the 0-th power of 2), or 2 (that is, a value of the $1^{st}$ power of 2), or ½ (that is, a value of the $1^{st}$ power of 2), or 4 (that is, a value of the $2^{nd}$ power of 2), or ¼ (that is, a value of the $-2^{nd}$ power of 2), or 8 (that is, a value of the $3^{rd}$ power of 2), or ⅛ (that is, a value of the $-3^{rd}$ power of 2). For example, as shown in FIG. 6, eight weight prediction angles are shown, and the absolute values of the slopes of these weight prediction angles are values of the n-th power of 2.

In an example of the present disclosure, a shift operation may be performed on the weight prediction angle. The example of performing the shift operation on the weight prediction angle can be referred to subsequent examples. Therefore, when the absolute value of the slope of the weight prediction angle is the n-th power of 2, a division operation may be avoided during the shift operation on the weight prediction angle, thereby facilitating the shift implementation.

In an example, the numbers of weight prediction angles supported by different block sizes (i.e., the size of the current block) can be the same or different. For example, a block size A supports 8 weight prediction angles, and block sizes B and C support 6 weight prediction angles.

Example 6: in the above examples 1 to 4, the encoding side/the decoding side needs to configure reference weight values for surrounding positions outside the current block based on the weight transform rate of the current block and the starting position of the weight transform of the current block. In a possible implementation, for each surrounding position outside the current block, the reference weight value of the surrounding position can be configured based on a coordinate value of the surrounding position, a coordinate value of the starting position of the weight transform, and the weight transform rate.

In an example, for each surrounding position outside the current block, if the surrounding position is a surrounding position in an upper row or a lower row outside the current block, the coordinate value of the surrounding position can be an abscissa value, and the coordinate value of the starting position of the weight transform can be an abscissa value. Or, if the surrounding position is a surrounding position in a left column or a right column outside the current block, the coordinate value of the surrounding position can be an ordinate value, and the coordinate value of the starting position of the weight transform can be an ordinate value.

In an example, a pixel position in an upper left corner of the current block (such as a first pixel position in the upper left corner) can be taken as a coordinate origin. The coordinate values of the surrounding positions of the current block (such as abscissa values or ordinate values) and the coordinate value of the starting position of the weight transform (such as an abscissa value or an ordinate value) are all coordinate values relative to the coordinate origin. Other pixel positions of the current block can also be taken as the coordinate origin and the implementation manner is similar to that of taking the pixel position in the upper left corner as the coordinate origin.

In a possible implementation, a difference between the coordinate value of the surrounding position and the coordinate value of the starting position of the weight transform is first determined, and a product of the difference and the weight transform rate of the current block is determined. If the product is less than a first threshold (that is, a minimum value of the reference weight value, such as 0), the reference weight value associated with the surrounding position is determined to be the first threshold; if the product is greater than a second threshold (that is, a maximum value of the reference weight value, such as 8), the reference weight value associated with the surrounding position is determined to be the second threshold; if the product is not less than the first threshold and the product is not greater than the second threshold, the reference weight value associated with the surrounding position is determined to be the product. In another possible implementation, the reference weight value associated with the surrounding position can also be directly determined based on a size relationship between the coordinate value of the surrounding position and the coordinate value of the starting position of the weight transform of the current block. For example, if the coordinate value of the surrounding position is less than the coordinate value of the starting position of the weight transform, the reference weight value associated with the surrounding position is determined to be the first threshold; if the coordinate value of the surrounding position is not less than the coordinate value of the starting position of the weight transform, the reference weight value associated with the surrounding position is determined to be the second threshold. For another example, if the coordinate value of the surrounding position is less than the coordinate value of the starting position of the weight transform, the reference weight value associated with the surrounding position is determined to be the second threshold; if the coordinate value of the surrounding position is not less than the coordinate value of the starting position of the weight transform, the reference weight value associated with the surrounding position is determined to be the first threshold.

In an example, both the first threshold and the second threshold can be configured based on experience, the first threshold is less than the second threshold, and the first threshold and the second threshold are not limited herein. For example, the first threshold can be a minimum value of pre-agreed reference weight values, such as 0, and the second threshold can be a maximum value of the pre-agreed reference weight values, such as 8, where 0 and 8 are only examples.

For example, as shown in FIG. 4C, 7 weight prediction positions can be obtained after all surrounding positions are divided into 8 equal parts. When a weight prediction position is 0, it can be indicated that, a surrounding position a0 is the starting position of the weight transform, and the coordinate value of the starting position of the weight transform is the coordinate value of the surrounding position a0. When a weight prediction position is 1, it can be indicated that, a surrounding position a1 is the starting position of the weight transform, and the coordinate value of the starting position of the weight transform is the coordinate value of the surrounding position a1, and so on. The determination method of the coordinate value of the starting position of the weight transform will not be repeated herein.

Example 7: in examples 1 to 4, the encoding side/the decoding side needs to configure reference weight values for surrounding positions outside the current block based on the weight transform rate of the current block and the starting position of the weight transform of the current block. In a possible implementation, the following method can be adopted: the weight prediction angle of the current block, the weight transform rate of the current block, and the weight prediction position of the current block are obtained, the starting position of the weight transform of the current block is determined based on the weight prediction position of the current block, and weight configuration parameters are determined based on the starting position of the weight transform and the weight transform rate, that is, the weight configuration parameters include the starting position of the weight transform and the weight transform rate. Then, the reference weight values of the surrounding positions outside the current block are determined based on the weight configuration parameters.

The following describes the process of configuring the reference weight values for the surrounding positions outside the current block in combination with specific steps.

In step c1, a valid number of reference weight values are obtained.

In an example, the number of surrounding positions outside the current block is the valid number. In step c1, it is required to obtain the valid number of reference weight values, where the valid number can be determined based on the size of the current block and/or the weight prediction angle of the current block. For example, the valid number is determined as follows: ValidLength=(N+(M>>X))<<1, where N and M represents the height and width of the current block, respectively, and X represents a log 2 logarithmic value of an absolute value of a slope of the weight prediction angle of the current block, such as 0 or 1.

In a possible implementation, the valid number of reference weight values may monotonically increase or monotonically decrease. Or, the valid number of reference weight values may firstly include a plurality of first reference weight values and then include a plurality of second reference weight values, or firstly include the plurality of second reference weight values and then include the plurality of first reference weight values. Descriptions will be made below in combination with several cases.

In case 1, the valid number of reference weight values may monotonically increase or monotonically decrease. For example, the valid number of reference weight values may be [88 . . . 88765432100 . . . 00], that is, the valid number of reference weight values monotonically decrease. For another example, the valid number of reference weight values may be [00 . . . 00123456788 . . . 88], that is, the valid number of reference weight values monotonically increase. The above is only examples, which do not constitute a limitation herein.

In an example, the reference weight values can be configured based on the weight configuration parameters, which can include the weight transform rate and the starting position of the weight transform. The way to obtain the weight transform rate can be referred to subsequent examples. The starting position of the weight transform can be a value set based on experience, or the starting position of the weight transform can be determined by the weight prediction position, or the starting position of the weight transform can be determined by the weight prediction angle and weight prediction position, which is not limited.

The valid number of reference weight values can monotonically increase or decrease from a first one of the reference weight values to a last one of the reference weight values. For example, if a maximum value of the reference weight value is M1, and a minimum value of the reference weight value is M2, the valid number of reference weight values monotonically decrease from the maximum value M1 to the minimum value M2; or, monotonically increase from the minimum value M2 to the maximum value M1. It is assumed that M1 is 8 and M2 is 0, the plurality of reference weight values can monotonically decrease from 8 to 0, or monotonically increase from 0 to 8.

In an example, the weight transform rate and the starting position of the weight transform can be obtained firstly, and then the plurality of reference weight values can be determined based on the weight transform rate and the starting position of the weight transform. For example, the reference weight values can be determined in the following manner: y=Clip3 (minimum, maximum, a*(x−s)), where x represents an index of surrounding positions and ranges from 1 to the valid number, for example, x is 1, which indicates the first surrounding position, and y represents a reference weight value of the first surrounding position; for another example, x is 2, which indicates the second surrounding position, and y represents a reference weight value of the second surrounding position, "a" represents the weight transform rate, and "s" represents the starting position of the weight transform.

A Clip3 function is used to limit the reference weight values to be between a minimum value and a maximum value. The minimum value and the maximum value can be configured based on experience. For convenience of description, subsequent descriptions are given by taking the minimum value being 0 and the maximum value being 8 as an example.

"a" represents a weight transform rate and may be a non-zero integer, for example, "a" may be −4, −2, −1, 1, 2, 4 or the like. The value of "a" is not limited herein. If an absolute value of "a" is 1, the reference weight values need to pass through 0, 1, 2, 3, 4, 5, 6, 7, 8 from 0 to 8, or the reference weight values need to pass through 8, 7, 6, 5, 4, 3, 2, 1, 0 from 8 to 0.

"s" represent the starting position of the weight transform and can be determined based on the weight prediction position. For example, s=f (weight prediction position), that is, "s" is a function related to the weight prediction position. For example, after a range of the surrounding positions outside the current block is determined, the valid number of the surrounding positions can be determined and all the surrounding positions can be divided into N equal parts, where a value of N may be set arbitrarily, such as 4, 6 or 8. The weight prediction position is used to indicate which surrounding position outside the current block is used as a target surrounding position of the current block, and the surrounding position corresponding to the weight prediction position is the starting position of the weight transform. Or, "s" may be determined based on the weight prediction angle and the weight prediction position, for example, s=f (weight prediction angle, weight prediction position), that is, "s" is a function related to the weight prediction angle and the weight prediction position. For example, the range of the surrounding positions outside the current block may be determined based on the weight prediction angle. After the range of the surrounding positions outside the current block is determined, the valid number of the surrounding positions may be determined and all the surrounding positions are divided into N equal parts. The weight prediction position is used to indicate which surrounding position outside the current block is used as a target surrounding position of the current block, and the surrounding position corresponding to the weight prediction position is the starting position of the weight transform.

To sum up, in y=Clip3 (minimum, maximum, a*(x−s)), the weight transform rate "a" and the starting position of the weight transform "s" both are known values. For each of the surrounding positions outside the current block, the reference weight value of the surrounding position can be determined based on the functional relationship. For example, if the weight transform rate "a" is 2 and the starting position of the weight transform "s" is 2, the functional relationship can be y=2*(x−2). For each surrounding position x outside the current block, a reference weight value y can be obtained.

To sum up, a valid number of reference weight values of the current block can be obtained and these reference weight values may monotonically increase or monotonically decrease. In a possible implementation, the reference weight values of the surrounding positions outside the current block include one or more reference weight values of a target area, one or more reference weight values of a first neighbouring area of the target area, and one or more reference weight values of a second neighbouring area of the target area.

In an example, the target area includes one reference weight value or at least two reference weight values. For example, based on the starting position of the weight transform, one reference weight value is determined and taken as the reference weight value of the target area. For another example, at least two reference weight values are determined based on the starting position of the weight transform, and these at least two reference weight values are taken as the reference weight values of the target area.

If the target area includes at least two reference weight values, the at least two reference weight values of the target area monotonically increase or decrease. Monotonically increasing can be strictly monotonically increasing (that is, the at least two reference weight values of the target area strictly monotonically increase). Monotonically decreasing can be strictly monotonically decreasing (that is, the at least two reference weight values of the target area strictly monotonically decrease). For example, the reference weight values of the target area monotonically increase from 1 to 7, or the reference weight values of the target area monotonically decrease from 7 to 1.

In an example, the reference weight values of the first neighbouring area can all be a first reference weight value, and the reference weight values of the second neighbouring area can monotonically increase. For example, the reference weight values of the first neighbouring area can all be 0, the target area includes one reference weight value which is 1, and the reference weight values of the second neighbouring area monotonously increase from 2 to 8.

Or, the reference weight values of the first neighbouring area can all be the first reference weight value, and the reference weight values of the second neighbouring area can monotonically decrease. For example, the reference weight values of the first neighbouring area can all be 8, the target area includes one reference weight value which is 7, and the reference weight values of the second neighbouring area monotonously decrease from 6 to 0.

Or, the reference weight values of the first neighbouring area can all be a second reference weight value, the reference weight values of the second neighbouring area can all be a third reference weight value, and the second reference weight value is different from the third reference weight value. For example, the reference weight values of the first neighbouring area are all 0, the target area includes at least two reference weight values which monotonously increase from 1 to 7, and the reference weight values of the second neighbouring area are all 8. Obviously, the reference weight values of the first neighbouring area are different from those of the second neighbouring area.

Or, the reference weight values of the first neighbouring area can monotonically increase or decrease, and the reference weight values of the second neighbouring area can monotonically increase or decrease. For example, the reference weight values of the first neighbouring area monotonically increase, and the reference weight values of the second neighbouring area also monotonically increase. For another example, the reference weight values of the first neighbouring area monotonically decrease, and the reference weight values of the second neighbouring area also monotonically decrease. For example, the reference weight values of the first neighbouring area monotonically increase from 0 to 3, the target area includes one reference weight value which is 4, and the reference weight values of the second neighbouring area monotonically increase from 5 to 8.

In case 2, the valid number of reference weight values can firstly include a plurality of first values for the reference weight and then include a plurality of second values for the reference weight, or firstly include the plurality of second values for the reference weight and then include the plurality of first values for the reference weight. For example, the valid number of reference weight values can be [88 . . . 8800 . . . 00] or [00 . . . 0088 . . . 88]. In an example, a plurality of reference weight values can be determined based on the starting position of the weight transform. For example, the starting position of the weight transform represents an s-th reference weight value. Therefore, all reference weight values before the s-th reference weight value (excluding the s-th reference weight value) are a first reference weight value (e.g., 8), and all reference weight values after the s-th reference weight value (including the s-th reference weight value) are a second reference weight value (e.g., 0). Or, all reference weight values before the s-th reference weight value (excluding the s-th reference weight value) are the second reference weight value (e.g., 0), and all reference weight values after the s-th reference weight value (including the s-th reference weight value) are the first reference weight value (e.g, 8).

In step c2, reference weight values of the surrounding positions outside the current block are configured based on the valid number of reference weight values.

In an example, the number of surrounding positions outside the current block is a valid number, and the number of reference weight values is the valid number, therefore, the valid number of reference weight values can be configured as the reference weight values of the surrounding positions outside the current block.

For example, the first one of the reference weight values can be configured as the reference weight value of a first surrounding position outside the current block, the second one of the reference weight values can be configured as the reference weight value of a second surrounding position outside the current block, and so on.

To sum up, since reference weight values have been configured for the surrounding positions outside the current block, that is, each surrounding position has a reference weight value, after determining a surrounding matching position to which a pixel position points from the surrounding positions outside the current block, the reference weight value associated with the surrounding matching position, that is, the target weight value of the pixel position, can be determined.

The following describes the implementation of the above process in combination with several specific application scenarios. Exemplary, in the following application scenarios, it is assumed that the size of the current block is M*N, where M is the width of the current block, and N is the height of the current block. X is a log 2 logarithmic value of a tangent value of the weight prediction angle, such as 0 or 1. Y is an index value of the weight prediction position, and a, b, c, d are preset constant values. ValidLength represents a valid number, FirstPos represents a starting position of the weight transform, ReferenceWeights[i] represents the reference weight value of the i-th surrounding position, Clip3 is used to limit the reference weight value to be between the minimum value 0 and the maximum value 8, i represents an index of the surrounding positions outside the current block, and "a" represents an absolute value of the weight transform rate.

Application scenario 1: the valid number (also referred to as a valid length of reference weights, i.e., ValidLength) is determined based on the size of the current block and the weight prediction angle of the current block, and the starting position of the weight transform (i.e., FirstPos) is obtained. For example, ValidLength can be determined by the following formula: ValidLength=(N+(M>>X))<<1; FirstPos can be determined by the following formula: FirstPos=(ValidLength>>1)−a+Y*((ValidLength−1)>>3). On this basis, the reference weight value of each surrounding position of the current block can be derived by the following formula: ReferenceWeights[i]=Clip3 (0, 8, a*(i−FirstPos)). The value range of i can be from 0 to ValidLength−1 or from 1 to ValidLength. After obtaining the reference weight value ReferenceWeights[i] of the surrounding position of the current block, the target weight value of the pixel position (x, y) of the current block can be derived by the following formula: SampleWeight[x][y]=ReferenceWeights[(y<<1)+ ((x<<1)>>X)], "<<" represents left shift, ">>" represents right shift.

Application scenario 2: ValidLength can be determined by the following formula: ValidLength=(N+(M>>X))<<1; and FirstPos can be determined by the following formula: First-Pos=(ValidLength>>1)−b+Y*((ValidLength−1)>>3)− ((M<<1)>>X). On this basis, the reference weight value of each surrounding position of the current block can be derived by the following formula: ReferenceWeights[i]= Clip3 (0, 8, a*(i−FirstPos)). The target weight value of each pixel position (x, y) of the current block can be derived by the following formula: SampleWeight[x][y]=Reference-Weights[(y<<1)−((x<<1)>>X)].

Application scenario 3: ValidLength can be determined by the following formula: ValidLength=(M+(N>>X))<<1; and FirstPos can be determined by the following formula: First-Pos=(ValidLength>>1)−c+Y*((ValidLength−1)>>3)− ((N<<1)>>X). On this basis, the reference weight value of each surrounding position of the current block can be derived by the following formula: ReferenceWeights[i]= Clip3 (0, 8, a*(i−FirstPos)). The target weight value of each pixel position (x, y) of the current block can be derived by the following formula: SampleWeight[x][y]=Reference-Weights[(x<<1)−((y<<1)>>X)].

Application scenario 4: ValidLength can be determined by the following formula: ValidLength=(M+(N>>X))<<1; and FirstPos can be determined by the following formula: First-Pos=(ValidLength>>1)−d+Y*((ValidLength−1)>>3). On this basis, the reference weight value of each surrounding position of the current block can be derived by the following formula: ReferenceWeights[i]=Clip3 (0, 8, a*(i−FirstPos)). The target weight value of each pixel position (x, y) of the current block can be derived by the following formula: SampleWeight[x][y]=ReferenceWeights[(x<<1)+ ((y<<1)>>X)].

Application scenario 5: as shown in FIG. 7, FIG. 7 shows a schematic diagram of reference weight values of four weight transform rates.

When the absolute value of the weight transform rate is 1, that is, the weight transform rate is 1 or −1, the reference weight value of each surrounding position of the current block can be derived by the following formula: Reference-Weights[i]=Clip3 (0, 8, 1*(i−FirstPos)). The above formula can be equivalent to ReferenceWeight[i]=Clip3 (0, 8, i-First-Pos). In this case, referring to a first case shown in FIG. 7, FirstPos can be 4, that is, the reference weight values of the first to fourth surrounding positions are 0, the reference weight value of the fifth surrounding position is 1, the reference weight value of the sixth surrounding position is 2, and so on.

When the absolute value of the weight transform rate is 2, that is, the weight transform rate is 2 or −2, the reference weight value of each surrounding position of the current block can be derived by the following formula: Reference-Weights[i]=Clip3 (0, 8, 2*(i−FirstPos)). The above formula can be equivalent to ReferenceWeight [i]=Clip3 (0, 8, (i−FirstPos)<<1). In this case, referring to a second case shown in FIG. 7, FirstPos can be 6, that is, the reference weight values of the first to sixth surrounding positions are 0, the reference weight value of the seventh surrounding position is 2, the reference weight value of the eighth surrounding position is 4, and so on.

When the absolute value of the weight transform rate is 4, that is, the weight transform rate is 4 or −4, the reference weight value of each surrounding position of the current block can be derived by the following formula: Reference-Weights[i]=Clip3 (0, 8, 4*(i−FirstPos)). The above formula can be equivalent to ReferenceWeight[i]=Clip3 (0, 8, (i−FirstPos)<<2). In this case, referring to a third case shown in FIG. 7, FirstPos can be 7, that is, the reference weight values of the first to seventh surrounding positions are 0, the reference weight value of the eighth surrounding position is 4, the reference weight values of the ninth to seventeenth surrounding positions are 8, and so on.

When the absolute value of the weight transform rate is 8, that is, the weight transform rate is 8 or −8, the reference weight value of each surrounding position of the current block can be derived by the following formula: Reference-Weights[i]=Clip3 (0, 8, 8*(i−FirstPos)). The above formula can be equivalent to ReferenceWeight[i]=Clip3 (0, 8, (i−FirstPos)<<3). In this case, referring to a fourth case shown in FIG. 7, FirstPos can be 8, that is, the reference weight values of the first to eighth surrounding positions are 0, the reference weight value of the ninth surrounding position is 9, the reference weight values of the tenth to seventeenth surrounding positions are 8, and so on.

To sum up, when the absolute value of the weight transform rate is 1, FirstPos is 4, when the absolute value of the weight transform rate is 2, FirstPos is 6 (i.e., FirstPos when the weight transform rate is 1 plus 2), and when the absolute value of the weight transform rate is 4, FirstPos is 7 (i.e. FirstPos when the weight transform rate is 1 plus 3). Based on this, the positions with reference weight values of 4 can be aligned.

In an example, for the current block, when weight transform rate switching is supported and the weight transform rate switching is enabled, one of the four types of distribution examples of reference weight values of weight transform rates shown in FIG. 7 can be selected for switching, so as to reduce the jump highlight of image display in some image display scenes by switching the weight transform rate of images or local areas of images. For example, some image display scenes need to solve the problem of jump highlight, and the weight transform rate switching of the AWP mode can solve this problem. For example, the mixed image content includes some screen content, cartoons, images containing cartoons, etc., and the weight transform rate switching can be performed on an area containing the screen content to solve the problem of jump highlight.

In the above process, ValidLength is related to the weight prediction angle of the current block and the size of the current block. In order to simplify the solution, some parameters can be solidified to achieve the optimization purpose. For example, the weight prediction angle of the current block can be set as a fixed parameter value, and ValidLength is only related to the size of the current block. FirstPos is related to the weight prediction angle of the current block, the size of the current block, and the weight prediction position of the current block. In order to simplify the solution, some parameters can be solidified to achieve the optimization purpose. For example, the weight prediction angle of the current block can be set as a fixed parameter value, and FirstPos is only related to the size of the current block and the weight prediction position of the current block. Or, the weight prediction position of the current block can be set as a fixed parameter value, and FirstPos is only related to the size of the current block and the weight prediction angle of the current block. Or, the weight prediction angle of the current block and the weight prediction position of the current block can be set as fixed parameter values, which can be the same or different, and FirstPos is only related to the size of the current block.

Example 8: in examples 1 to 4, the encoding side/the decoding side needs to configure reference weight values for surrounding positions outside the current block based on the weight transform rate of the current block and the starting position of the weight transform of the current block. In a possible implementation, M and N are the width and height of the current block, and a method for deriving a weight array of the Angular Weighted Prediction (AWP) mode includes steps d1 to d4.

In step d1, parameters such as stepIdx, angleIdx, subAngleIdx are obtained based on AwpIdx.

In an example, AwpIdx represents an index value of the weight prediction position and the weight prediction angle. It is assumed that there are 7 weight prediction positions and 8 weight prediction angles, the value range of AwpIdx is 0 to 55. If the weight prediction positions are −3 to 3 (indicating that the fourth weight prediction position is the center and the fourth weight prediction position is 0) and the index of the weight prediction angle is 0-7, weight prediction positions and weight prediction angles corresponding to 56 index values of AwpIdx can be seen in Table 1.

TABLE 1

| AwpIdx | Weight Prediction Position | Weight Prediction Angle |
|---|---|---|
| 0 | −3 | 0 |
| 1 | −3 | 1 |
| . . . | . . . | . . . |

TABLE 1-continued

| AwpIdx | Weight Prediction Position | Weight Prediction Angle |
|---|---|---|
| 7 | −3 | 7 |
| 8 | −2 | 0 |
| 9 | −2 | 1 |
| . . . | . . . | . . . |
| 55 | 3 | 7 |

Figure 8A:
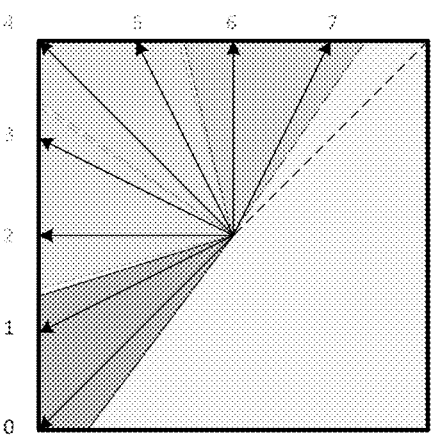
FIGS. 8A to 8C are schematic diagrams of weight prediction angles and angle regions according to an example of the present disclosure.

In an example, stepIdx represents the weight prediction position (i.e., an index value of the weight prediction position), and the range of the weight prediction position can be −3 to 3. For example, the first weight prediction position is −3, the second weight prediction position is −2, and so on, the seventh weight prediction position is 3.

angleIdx represents a log 2 logarithmic value of the absolute value of the slope of the weight prediction angle (such as 0, 1, or a larger constant), and subAngleIdx represents an angle region where a weight prediction angle is located. As shown in FIG. 8A, eight weight prediction angles are shown. The angleIdx of a weight prediction angle 0 is the log 2 logarithmic value of the absolute value of the slope of the weight prediction angle 0, and the angleIdx of a weight prediction angle 1 is the log 2 logarithmic value of the absolute value of the slope of the weight prediction angle 1. By analogy, the angleIdx of a weight prediction angle 7 is the log 2 logarithmic value of the absolute value of the slope of the weight prediction angle 7. The weight prediction angle 0 and the weight prediction angle 1 are located in an angle region 0, the weight prediction angle 2 and the weight prediction angle 3 are located in an angle region 1, the weight prediction angle 4 and the weight prediction angle 5 are located in an angle region 2, and the weight prediction angle 6 and the weight prediction angle 7 are located in an angle region 3.

In an example, the following formula can be used to determine stepIdx: stepIdx=(AwpIdx>>3)−3.

In an example, modAngNum (angle number) can be determined based on the following formula: modAngNum=AwpIdx % 8. Based on modAngNum, angleIdx can be determined as follows: if modAngNum is equal to 2, then angleIdx=7; if modAngNum is equal to 6, then angleIdx=8; otherwise, angleIdx=modAngNum % 2.

In an example, subAngleIdx can be determined in a following formula: subAngleIdx modAngNum>>1.

To sum up, after determining the weight prediction angle and the weight prediction position of the current block, the encoding side can determine the value of AwpIdx based on the weight prediction angle and the weight prediction position, as shown in Table 1. When the encoding side sends a coded bit stream to the decoding side, the value of AwpIdx can be carried in the coded bit stream. Based on this, the decoding side can obtain the value of AwpIdx, and obtain stepIdx, angleIdx and subAngleIdx based on AwpIdx.

In an example, angleIdx and subAngleIdx can uniquely determine a weight prediction angle, as shown in Table 2. Other methods can also be used to determine the weight prediction angle, such as changing the partition number.

TABLE 2

| Angle Number modAngNum | Angle region subAngleIdx | log2 logarithmic value of the absolute value of the slope of the weight prediction angle angleIdx |
|---|---|---|
| 0 | 0 | 0 |
| 1 | 0 | 1 |

TABLE 2-continued

| Angle Number modAngNum | Angle region subAngleIdx | log2 logarithmic value of the absolute value of the slope of the weight prediction angle angleIdx |
|---|---|---|
| 2 | 1 | horizontal, a large value is configured so that the value of ((x<<1)>>angleIdx) is 0 |
| 3 | 1 | 1 |
| 4 | 2 | 0 |
| 5 | 2 | 1 |
| 6 | 3 | vertical, a large value is configured so that the value of ((y<<1)>>angleIdx) is 0 |
| 7 | 3 | 1 |

In step d2, reference weight values are configured for surrounding positions outside the current block based on stepIdx, angleIdx and subAngleIdx.

In case 1, if subAngleIdx is 0, that is, the weight prediction angle is located in the angle region 0, for example, the weight prediction angle is the weight prediction angle 0 or the weight prediction angle 1, the starting position of the weight transform FirstPos can be determined in a following formula: FirstPos=(ValidLength_H>>1)−6+DeltaPos_H. Then, the reference weight values of the surrounding positions outside the current block can be determined in a following formula: ReferenceWeights[x]=Clip3(0, 8, x−FirstPos). In this formula, the minimum value of the reference weight value being 0, the maximum value of the reference weight value being 8, and the weight transform rate being 1 are taken as an example for illustration. That is, the above formula can be equivalent to ReferenceWeights [x]=Clip3 (minimum, maximum, a*(x−FirstPos)), where x represents an index of the surrounding positions outside the current block, x ranges from 0 to ValidLength_H−1, and "a" represents the weight transform rate.

In the above formula, ValidLength_H can represent the number of surrounding positions outside the current block (i.e., valid number, which can also be referred to as valid length). When subAngleIdx is 0, surrounding positions outside the current block to which the weight prediction angle points can be surrounding positions in a left column. Therefore, the valid number can be denoted as Valid-Length_H. For example, the valid number ValidLength_H can be determined in a following formula: ValidLength_H= (N+(M>>angleIdx))<<1. The shift left by one bit is because the formula adopts ½-pel precision. If 1-pel precision is adopted, the formula is: ValidLength_H=(N+ (M>>angleIdx)). If ¼-pel precision is adopted, the formula is: ValidLength_H=(N+(M>>angleIdx))<<2. If 2-pel precision is adopted, the formula is: ValidLength_H=(N+ (M>>angleIdx))>>1. Other pixel precision are made in the same way, and no redundant descriptions are made herein. In subsequent formulas, the operations involved>>1 may change for different pixel precision.

In the above formula, DeltaPos_H represents a position variation parameter (e.g., an intermediate parameter). When subAngleIdx is 0, surrounding positions outside the current block to which the weight prediction angle points can be surrounding positions in a left column outside the current block. Therefore, the position variation parameter is denoted as DeltaPos_H. In an example, DeltaPos_H can be determined in a following formula: DeltaPos_H=stepIdx*((ValidLength_H>>3)−1).

In case 2, if subAngleIdx is 1, that is, the weight prediction angle is located in the angle region 1, for example, the weight prediction angle is the weight prediction angle 2 or the weight prediction angle 3, the starting position of the weight transform FirstPos can be determined in a following formula: FirstPos=(ValidLength_H>>1)−4+DeltaPos_H− ((M<<1)>>angleIdx). Then, the reference weight values of the surrounding positions outside the current block can be determined in a following formula: ReferenceWeights[x] =Clip3 (0, 8, a*(x−FirstPos)). In this formula, the minimum value of the reference weight value being 0, the maximum value of the reference weight value being 8, and the weight transform rate being a are taken as an example for illustration, where x represents an index of the surrounding positions outside the current block, and x ranges from 0 to ValidLength_H−1.

In the above formula, ValidLength_H and DeltaPos_H can be referred to Case 1 and will not be repeated herein.

In case 3, if subAngleIdx is 2, that is, the weight prediction angle is located in the angle region 2, for example, the weight prediction angle is the weight prediction angle 4 or the weight prediction angle 5, the starting position of the weight transform FirstPos can be determined in a following formula: FirstPos=(ValidLength_W>>1)−4+DeltaPos_W− ((N<<1)>>angleIdx). Then, the reference weight values of the surrounding positions outside the current block can be determined in a following formula: ReferenceWeights[x] =Clip3 (0, 8, a*(x−FirstPos)). In this formula, the minimum value of the reference weight value being 0, the maximum value of the reference weight value being 8, and the weight transform rate being a are taken as an example for illustration, where x represents an index of the surrounding positions outside the current block, and x ranges from 0 to ValidLength_W−1.

In the above formula, ValidLength_W represents the number of surrounding positions outside the current block (i.e., valid number, which can also be referred to as valid length). When subAngleIdx is 2, surrounding positions outside the current block to which the weight prediction angle points can be surrounding positions in an upper row. Therefore, the valid number can be denoted as Valid-Length_W. For example, the valid number ValidLength_W can be determined in a following formula: ValidLength_W= (M+(N>>angleIdx))<<1.

In the above formula, DeltaPos_W represents a position variation parameter (i.e., an intermediate parameter). When subAngleIdx is 2, surrounding positions outside the current block to which the weight prediction angle points can be surrounding positions in an upper row outside the current block. Therefore, the position variation parameter can be denoted as DeltaPos_W. In an example, DeltaPos_W can be determined in a following formula: DeltaPos_W=stepIdx* ((ValidLength_W>>3)−1).

In case 4, if subAngleIdx is 3, that is, the weight prediction angle is located in the angle region 3, for example, the weight prediction angle is the weight prediction angle 6 or the weight prediction angle 7, the starting position of the weight transform FirstPos can be determined in a following formula: FirstPos=(ValidLength_W>>1)−6+DeltaPos_W. Then, the reference weight values of the surrounding positions outside the current block can be determined in a following formula: ReferenceWeights[x]=Clip3 (0, 8, a*(x− FirstPos)). In this formula, the minimum value of the reference weight value being 0, the maximum value of the reference weight value being 8, and the weight transform rate being a are taken as an example for illustration, where x represents an index of the surrounding positions outside the current block, and x ranges from 0 to ValidLength_W−1.

In the above formula, ValidLength_W and DeltaPos_W can be referred to Case 3 and will not be repeated herein.

To sum up, which case is to be used may be determined based on subAngleIdx. For example, in the cases 1 and 2, ValidLength_H and DeltaPos_H can be determined based on angleIdx and stepIdx, and FirstPos can be determined based on ValidLength_H and DeltaPos_H, and then, the reference weight values are set based on FirstPos. In the cases 3 and 4, ValidLength_W and DeltaPos_W can be determined based on angleIdx and stepIdx, and FirstPos can be determined based on ValidLength_W and DeltaPos_W, and then, the reference weight values are set based on FirstPos.

Figure 8B:
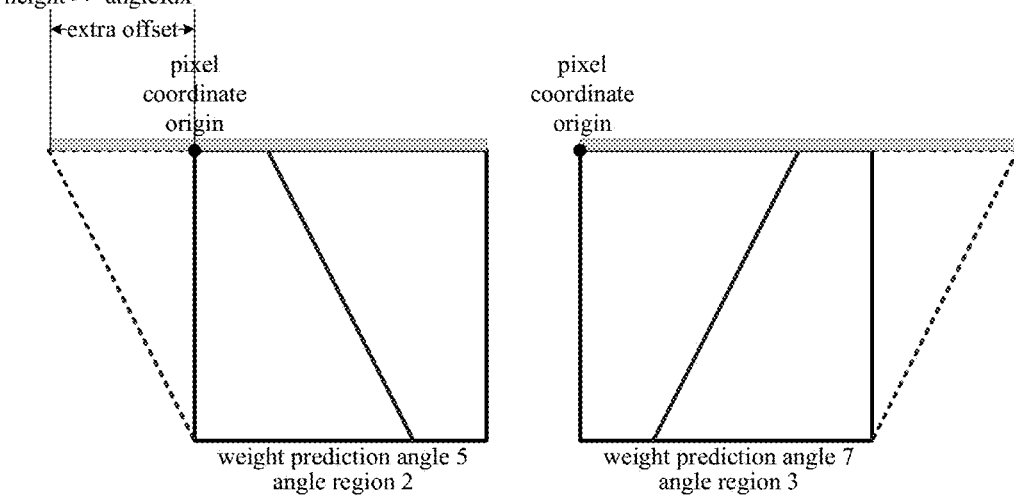

The formulas in the above cases differ in that: when an upper left corner of the current block is used as a coordinate origin, a starting position of the reference weight value ReferenceWeights[x] changes. For example, as shown in FIG. 8B, examples of the angle region 2 and the angle region 3 are shown. When ½-pel precision is adopted, the starting position of the reference weight value ReferenceWeights[x] is (height<<1) angleIdx, i.e., the offset in the formula is "−((N<<1)>>angleIdx)". The angle region 0 and the angle region 1 are implemented in a similar way except that the offset in the formula is "−((M<<1) angleIdx)", i.e., the height is changed to the width.

In step d3, a luma weight value of a pixel position is obtained based on angleIdx and the reference weight value ReferenceWeights[x].

In case 1, if subAngleIdx is 0, a luma weight value of a pixel position (x, y) can be determined in a following formula: AwpWeightArrayY[x][y]=ReferenceWeights[(y<<1)+((x<<1)>>angleIdx)], where (y<<1)+((x<<1)angleIdx) represents a surrounding position to which the pixel position (x, y) points, and ReferenceWeights [(y<<1)+((x<<1)>angleIdx)] represents a reference weight value of the surrounding position. The value range of x is from 0 to M−1, and the value range of y is from 0 to N−1.

In case 2, if subAngleIdx is 1, a luma weight value of a pixel position (x, y) can be determined in a following formula: AwpWeightArrayY[x][y]=ReferenceWeights[(y<<1)−((x<<1)>>angleIdx)], where (y<<1)−((x<<1)angleIdx) represents a surrounding position to which the pixel position (x, y) points, and ReferenceWeights[(y<<1)−((x<<1)angleIdx)] represents a reference weight value of the surrounding position. The value range of x is from 0 to M−1, and the value range of y is from 0 to N−1.

In case 3, if subAngleIdx is 2, a luma weight value of a pixel position (x, y) can be determined in a following formula: AwpWeightArrayY[x][y]=ReferenceWeights[(x<<1)−(y<<1)>>angleIdx)], where (x<<1)−((y<<1)an-gleIdx) represents a surrounding position to which the pixel position (x, y) points, and ReferenceWeights[(x<<<1)−(y<<1)angleIdx]represents a reference weight value of the surrounding position. The value range of x is from 0 to M−1, and the value range of y is from 0 to N−1.

In case 4, if subAngleIdx is 3, a luma weight value of a pixel position (x, y) can be determined in a following formula: AwpWeightArrayY[x][y]=ReferenceWeights[(x<<1)+((y<<1)angleIdx)], where (x<<1)+((y<<1)an-gleIdx) represents a surrounding position to which the pixel position (x, y) points, and ReferenceWeights[(x<<<1)−(y<<1)angleIdx]represents a reference weight value of the surrounding position. The value range of x is from 0 to M−1, and the value range of y is from 0 to N−1.

The above steps d2 and d3 may be combined into one step, that is, the step d2 (reference weight values are configured for surrounding positions outside the current block based on stepIdx, angleIdx and subAngleIdx) and the step d3 (a luma weight value of a pixel position is obtained based on angleIdx and the reference weight value Refer-enceWeights[x]) may be combined into a step of obtaining a luma weight value of a pixel position based on stepIdx, angleIdx and subAngleIdx, that is, determining the luma weight value of the pixel position based on a coordinate value of a surrounding matching position and a coordinate value of a starting position of the weight transform.

With case 1 as an example, if subAngleIdx is 0, that is, the weight prediction angle is in the angle region 0, for example, the weight prediction angle is the weight prediction angle 0 or the weight prediction angle 1, the starting position of the weight transform FirstPos can be determined in a following formula: FirstPos=(ValidLength_H>>1)−6+DeltaPos_H. Then, a luma weight value of a pixel position (x, y) can be determined in a following formula: AwpWeightArrayY[x][y]=Clip3(0, 8, (y<<1)+((x<<1)>>angleIdx)−FirstPos), where (y<<1)+((x<<1)angleIdx) represents a surrounding position to which the pixel position (x, y) points.

In step d4, a chroma weight value of the pixel position is obtained based on the luma weight value of the pixel position, and the luma weight value of the pixel position and the chroma weight value of the pixel position can form a target weight value of the pixel position.

For example, if a format of a chroma resolution is 4:2:0, the chroma weight value of the pixel position (x, y) is determined in a following formula: AwpWeightArrayUV[x][y]=AwpWeightArrayY[x<<1][y<<1]. For another example, if the format of the chroma resolution is 4:4:4, the chroma weight value of the pixel position (x, y) is determined in a following formula: AwpWeightArrayUV[x][y]=AwpWeigh-tArrayY[x][y]. A value range of x is from 0 to M/2−1 and a value range of y is from 0 to N/2−1.

The step d4 can be implemented in another manner: instead of obtaining the chroma weight value based on the luma weight value, the chroma weight value of the pixel position is obtained based on angleIdx and the reference weight value ReferenceWeights[x]. For example, if the format of the chroma resolution is 4:2:0, the chroma weight value of the pixel position may be obtained based on angleIdx and the reference weight value ReferenceWeights [x].

For example, if subAngleIdx is 0, the chroma weight value of the pixel position (x, y) can be determined in a following formula: AwpWeightArrayUV[x][y]=Reference-Weights[(y<<2)+((x<<2)>>angleIdx)].

For example, if subAngleIdx is 1, the chroma weight value of the pixel position (x, y) can be determined in a following formula: AwpWeightArrayUV[x][y]=Reference-Weights[(y<<2)−((x<<2)>>angleIdx)].

For example, if subAngleIdx is 2, the chroma weight value of the pixel position (x, y) can be determined in a following formula: AwpWeightArrayUV[x][y]=Reference-Weights[(x<<2)−((y<<2)>>angleIdx)].

For example, if subAngleIdx is 3, the chroma weight value of the pixel position (x, y) can be determined in a following formula: AwpWeightArrayUV[x][y]=Reference-Weights[(x<<2)+((y<<2)>>angleIdx)].

In the above formulas, the value range of x is from 0 to M−1, and the value range of y is from 0 to N−1.

Figure 8C:
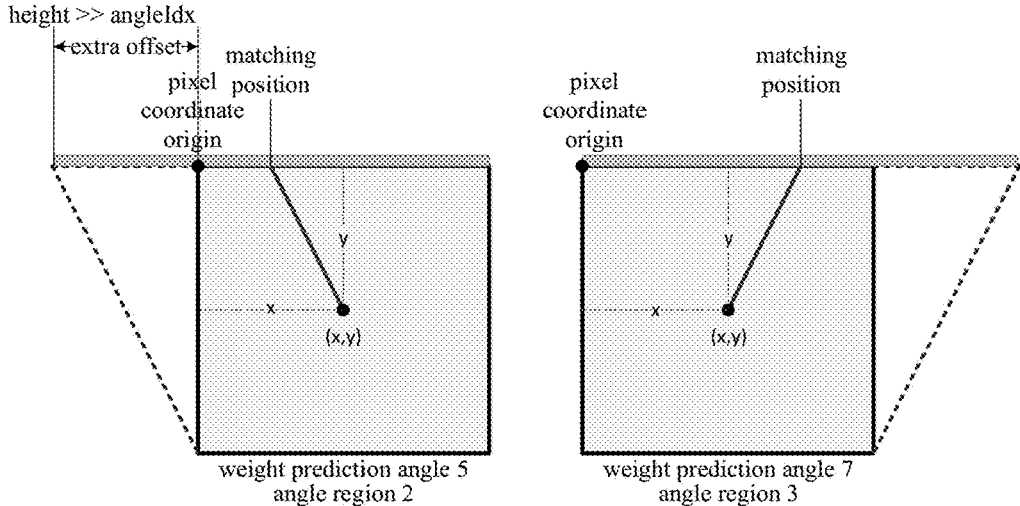

In the steps d3 and d4, the formulas in the cases differ in the following. As shown in FIG. 8C, examples of the angle region 2 and the angle region 3 are shown. When the upper left corner of the current block is taken as the coordinate origin, a calculation formula of a surrounding matching position of (x, y) in the angle region 2 may be x−y>>angleIdx, and the calculation formula of the surrounding matching position of (x, y) in the angle region 3 may be x+y>>angleIdx. When the ½-pel precision is adopted, the calculation formula of the surrounding matching position of (x, y) in the angle region 2 may be (x<<1)−((y<<1)>>angleIdx), and the calculation formula of the surrounding matching position of (x, y) in the angle region 3 may be (x<<1)+((y<<1) angleIdx). The angle region 0 and the angle region 1 can be implemented in a similar way except that the positions of x, y are exchanged.

Example 9: in examples 1 to 4, the encoding side/the decoding side needs to obtain the weight transform rate of the current block. If the current block supports the weight transform rate switching mode, the weight transform rate of the current block is obtained in the following way: weight transform rate indication information of the current block is obtained, and the weight transform rate of the current block is determined based on the weight transform rate indication information. In an example, if the weight transform rate indication information is first indication information, the weight transform rate of the current block is a first weight transform rate; if the weight transform rate indication information is second indication information, the weight transform rate of the current block is a second weight transform rate. If the current block does not support the weight transform rate switching mode, a preset weight transform rate is determined as the weight transform rate of the current block.

To sum up, if the current block supports the weight transform rate switching mode, the weight transform rate of the current block can be the first weight transform rate or the second weight transform rate, and the first weight transform rate is different from the second weight transform rate, that is, the weight transform rate of the current block is variable, so that the weight transform rate can be switched adaptively instead of adopting a unified weight transform rate.

In an example, if switching control information allows the current block to enable the weight transform rate switching mode, the current block supports the weight transform rate switching mode. If the switching control information does not allow the current block to enable the weight transform rate switching mode, the current block does not support the weight transform rate switching mode. The switching control information can include, but is not limited to, sequence level switching control information, picture level switching control information, Slice level switching control information, Tile level switching control information, Patch level switching control information, Coding Tee Unit (CTU) level switching control information, Largest Coding Unit (LCU) level switching control information, block level switching control information, Coding Unit (CU) level switching control information and Prediction Unit (PU) level switching control information, etc., which are not limited herein.

For the encoding side, the switching control information can be obtained, and whether the switching control information allows the current block to enable the weight transform rate switching mode can be obtained, and then whether the current block supports the weight transform rate switching mode can be determined. The encoding side can encode the switching control information into a bit stream, so that the decoding side can parse the switching control information from the bit stream, learn whether the switching control information allows the current block to enable the weight transform rate switching mode, and then determine whether the current block supports the weight transform rate switching mode. The encoding side may also not encode the switching control information to the bit stream, but the decoding side may implicitly derive the switching control information to learn whether the switching control information allows the current block to enable the weight transform rate switching mode, and then determine whether the current block supports the weight transform rate switching mode.

Taking sequence level switching control information as an example, the sequence level switching control information can be awp_adptive_flag (inter angular weighted prediction adaptive flag bit). If awp_adptive_flag is a first value, it is indicated that the sequence level switching control information allows a current sequence to enable the weight transform rate switching mode, thus allowing the current block to enable the weight transform rate switching mode. If awp_adptive_flag is a second value, it is indicated that the sequence level switching control information does not allow the current sequence to enable the weight transform rate switching mode, and thus does not allow the current block to enable the weight transform rate switching mode. For example, the first value is 1, the second value is 0; or the first value is 0, and the second value is 1. The above is only examples of the first value and the second value, which are not limited herein. For other types of switching control information, the implementation process is similar to that of the sequence level switching control information, and will not be repeated herein.

In a possible implementation, the weight transform rate indication information of the current block can be a Screen Content Coding (SCC) flag corresponding to the current block, the first indication information is used to indicate that screen content coding is adopted for the current block, and the second indication information is used to indicate that non-screen content coding is adopted for the current block. On this basis, the SCC flag corresponding to the current block can be obtained, and the weight transform rate of the current block can be determined based on the SCC flag. For example, if the SCC flag is used to indicate that screen content coding is adopted for the current block, the weight transform rate of the current block is the first weight transform rate; if the SCC flag is used to indicate that non-screen content encoding is adopted for the current block, the weight transform rate of the current block is the second weight transform rate.

In an example, an absolute value of the first weight transform rate can be greater than an absolute value of the second weight transform rate. For example, the absolute value of the first weight transform rate can be 4, and the absolute value of the second weight transform rate can be 1 or 2. For another example, the absolute value of the first weight transform rate can be 2, and the absolute value of the second weight transform rate can be 1. For another example, the absolute value of the first weight transform rate can be 8, and the absolute value of the second weight transform rate can be 1 or 2 or 4. For another example, the absolute value of the first weight transform rate can be 8 or 4, and the absolute value of the second weight transform rate can be 1 or 2. The above is only examples, which do not constitute a limitation herein, as long as the absolute value of the first weight transform rate is greater than the absolute value of the second weight transform rate.

In an example, the SCC flag can include, but are not limited to, a sequence level SCC flag, a picture level SCC flag, a Slice level SCC flag, a Tile level SCC flag, a Patch level SCC flag, a CTU level SCC flag, a LCU level SCC flag, a block level SCC flag s, a CU level SCC flag, a PU level SCC flag, etc., which is not limited herein. For example, the sequence level SCC flag corresponding to the current block can be determined as the SCC flag corresponding to the current block, or the picture level SCC flag corresponding to the current block can be determined as the SCC flag corresponding to the current block, and so on, as long as the SCC flag corresponding to the current block can be obtained.

In an example, the encoding side can decide whether screen content encoding is adopted for the current block or non-screen content encoding is adopted for the current block. If screen content encoding is adopted for the current block, the encoding side determines that the weight transform rate of the current block is the first weight transform rate. If non-screen content encoding is adopted for the current block, the encoding side determines that the weight transform rate of the current block is the second weight transform rate. Or, the encoding side can obtain the SCC flag corresponding to the current block. If the SCC flag is used to indicate that screen content encoding is adopted for the current block, the encoding side determines that the weight transform rate of the current block is the first weight transform rate. If the SCC flag is used to indicate that non-screen content encoding is adopted for the current block, the encoding side determines that the weight transform rate of the current block is the second weight transform rate.

The encoding side can encode the SCC flag (such as the sequence level SCC flag, the picture level SCC flag, the Slice level SCC flag, etc.) to a bit stream, so that the decoding side can parse the SCC flag from the bit stream, and determine the SCC flag as the SCC flag corresponding to the current block. For example, the sequence level SCC flag corresponding to the current block can be determined as the SCC flag corresponding to the current block. To sum up, the decoding side can obtain the SCC flag corresponding to the current block. If the SCC flag is used to indicate that screen content coding is adopted for the current block, the decoding side determines that the weight transform rate of the current block is the first weight transform rate. If the SCC flag is used to indicate that non-screen content encoding is adopted for the current block, the decoding side determines that the weight transform rate of the current block is the second weight transform rate. For example, if the SCC flag is a first value, it indicates that screen content coding is adopted for the current block; if the SCC flag is a second value, it indicates that non-screen content coding is adopted for the current block. The first value can be 1, and the second value can be 0; or the first value can be 0, and the second value can be 1. The above is only examples of the first value and the second value, which are not limited herein.

The encoding side can also implicitly derive the SCC flag by using the information consistent with that of the decoding side instead of encoding the SCC flag to the bit stream. At this time, the decoding side can also implicitly derive the SCC flag and determine the SCC flag as the SCC flag corresponding to the current block. For example, if successive pictures are screen content encoding, it is derived that the current picture is screen content encoding. Therefore, the decoding side implicitly derives the picture level SCC flag, and determines the SCC flag as the SCC flag corresponding to the current block which is used to indicate that screen content encoding is adopted for the current block. For example, if successive pictures are non-screen content encoding, it is derived that the current picture is non-screen content encoding. Therefore, the decoding side implicitly derives a picture level SCC flag which is used to indicate that non-screen content encoding is adopted for the current block. For example, if a proportion of the IBC mode is less than a certain percentage, the next picture will be determined to be non-screen content encoding, otherwise it is determined that the next picture continues to adopt screen content encoding. The above method is only an example of implicit derivation of the SCC flag, which is not limited herein. To sum up, the decoding side can obtain the SCC flag corresponding to the current block. If the SCC flag is used to indicate that screen content encoding is adopted for the current block, the decoding side determines that the weight transform rate of the current block is the first weight transform rate. If the SCC flag is used to indicate that non-screen content encoding is adopted for the current block, the decoding side determines that the weight transform rate of the current block is the second weight transform rate. For example, if the SCC flag is the first value, it indicates that screen content coding is adopted for the current block; if the SCC flag is the second value, it indicates that non-screen content coding is adopted for the current block.

To sum up, the weight transform rate of the current block can be the first weight transform rate or the second weight transform rate, that is, the weight transform rate of the current block can be switched, and the switching of the weight transform rate depends on a certain level SCC explicit flag or SCC implicit flag. The SCC explicit flag means that sec_flag (SCC flag) is encoded into a bit stream, so that the decoding side can parse the SCC flag from the bit stream. The SCC implicit flag means that the decoding side can adaptively derive the SCC flag according to available information.

A certain level SCC flag includes: a sequence level SCC flag, which is a SCC flag indicating a current sequence, the sequence level SCC flag serving as a SCC flag of all blocks belonging to the current sequence; a picture level SCC flag, which is a SCC flag indicating a current picture, the picture level SCC flag serving as a SCC flag of all blocks belonging to the current picture; a Slice level SCC flag, which is a SCC flag indicating a current slice, the Slice level SCC flag serving as a SCC flag of all blocks belonging to the current slice; a Tile level SCC flag, which is a SCC flag indicating a current tile, the Tile level SCC flag serving as a SCC flag of all blocks belonging to the current tile; a Patch level SCC flag, which is a SCC flag indicating a current patch, the Patch level SCC flag serving as a SCC flag of all blocks belonging to the current patch; a CTU level SCC flag, which is a SCC flag indicating a current CTU, the CTU level SCC flag serving as a SCC flag of all blocks belonging to the current CTU; a LCU level SCC flag, which is a SCC flag indicating a current LCU, the LCU level SCC flag serving as a SCC flag of all blocks belonging to the current LCU; a block level SCC flag, which is a SCC flag indicating a current block, the block level SCC flag serving as a SCC flag of all sub-blocks belonging to the current block; a CU level SCC flag, which is a SCC flag indicating a current CU, the CU level SCC flag serving as a SCC flag of the current CU; a PU level SCC flag, which is a SCC flag indicating a current PU, the PU level SCC flag serving as a SCC flag of the current PU.

In an example, the second weight transform rate can be used as a default weight transform rate. When the SCC flag is used to indicate that non-screen content coding is adopted for the current block, there is no need to switch the weight transform rate, that is, it is determined that the weight transform rate of the current block is the second weight transform rate. When the SCC flag is used to indicate that screen content coding is adopted for the current block, the weight transform rate needs to be switched, that is, it is determined that the weight transform rate of the current block is the first weight transform rate. Or, the first weight transform rate can be used as the default weight transform rate. When the SCC flag is used to indicate that non-screen content coding is adopted for the current block, the weight transform rate needs to be switched, that is, it is determined that the weight transform rate of the current block is the second weight transform rate. When the SCC flag is used to indicate that screen content coding is adopted for the current block, there is no need to switch the weight transform rate, that is, it is determined that the weight transform rate of the current block is the first weight transform rate.

To sum up, when screen content coding is adopted for the current block, the weight transform rate of the current block is the first weight transform rate; when non-screen content coding is adopted for the current block, the weight transform rate of the current block is the second weight transform rate, and the absolute value of the first weight transform rate is greater than the absolute value of the second weight transform rate. For example, the absolute value of the first weight transform rate is 4, and the absolute value of the second weight transform rate is 1, so that the absolute value of the weight transform rate of the current block belonging to a SCC sequence increases, that is, the transform speed increases.

In another possible implementation, the weight transform rate indication information of the current block can be a weight transform rate refining flag corresponding to the current block. The first indication information is used to indicate that the weight transform rate of the current block does not need to be switched, and the second indication information is used to indicate that the weight transform rate of the current block needs to be switched. On this basis, the weight transform rate refining flag corresponding to the current block can be obtained, and the weight transform rate of the current block can be determined based on the weight transform rate refining flag. For example, if the weight transform rate refining flag is used to indicate that the weight transform rate of the current block does not need to be switched, the weight transform rate of the current block can be the first weight transform rate; if the weight transform rate refining flag is used to indicate that the weight transform rate of the current block needs to be switched, the weight transform rate of the current block can be the second weight transform rate. The absolute value of the first weight transform rate is not equal to the absolute value of the second weight transform rate.

For example, the absolute value of the first weight transform rate can be greater than the absolute value of the second weight transform rate. For example, the absolute value of the first weight transform rate can be 4, and the absolute value of the second weight transform rate can be 1 or 2. Or, the absolute value of the first weight transform rate can be 2, and the absolute value of the second weight transform rate can be 1. Or, the absolute value of the first weight transform rate can be 8, and the absolute value of the second weight transform rate can be 1, 2 or 4. For another example, the absolute value of the first weight transform rate can be less than the absolute value of the second weight transform rate. For example, the absolute value of the first weight transform rate can be 1, and the absolute value of the second weight transform rate can be 2, 4, or 8. Or, the absolute value of the first weight transform rate can be 2, and the absolute value of the second weight transform rate can be 4 or 8. Or, the absolute value of the first weight transform rate can be 4, and the absolute value of the second weight transform rate can be 8. The above is only examples, which do not constitute a limitation herein, as long as the absolute value of the first weight transform rate is not equal to the absolute value of the second weight transform rate.

In an example, the weight transform rate refining flag can include, but is not limited to: a sequence level weight transform rate refining flag, a picture level weight transform rate refining flag, a Slice level weight transform rate refining flag, a Tile level weight transform rate refining flag, a Patch level weight transform rate refining flag, a CTU level weight transform rate refining flag, a LCU level weight transform rate refining flag, a block level weight transform rate refining flag, a CU level weight transform rate refining flag, a PU level weight transform rate refining flag, etc., which is not limited herein.

For example, a sequence level weight transform rate refining flag corresponding to the current block can be determined as the weight transform rate refining flag corresponding to the current block, or a picture level weight transform rate refining flag corresponding to the current block can be determined as the weight transform rate refining flag corresponding to the current block, and so on, as long as the weight transform rate refining flag corresponding to the current block can be obtained.

In an example, the first weight transform rate can be used as a default weight transform rate. The encoding side can obtain whether the weight transform rate of the current block needs to be switched. If the weight transform rate of the current block does not need to be switched, the encoding side determines that the weight transform rate of the current block is the first weight transform rate. If the weight transform rate of the current block needs to be switched, the encoding side determines that the weight transform rate of the current block is the second weight transform rate. Or, the encoding side can obtain the weight transform rate refining flag corresponding to the current block. If the weight transform rate refining flag is used to indicate that the weight transform rate of the current block does not need to be switched, the encoding side can determine that the weight transform rate of the current block is the first weight transform rate. If the weight transform rate refining flag is used to indicate that the weight transform rate of the current block needs to be switched, the encoding side determines that the weight transform rate of the current block is the second weight transform rate.

For example, the encoding side determines a RDO cost value 1 corresponding to the first weight transform rate and a RDO cost value 2 corresponding to the second weight transform rate. If the RDO cost value 1 is less than the RDO cost value 2, it is determined that the weight transform rate of the current block does not need to be switched. If the RDO cost value 2 is less than the RDO cost value 1, it is determined that the weight transform rate of the current block needs to be switched.

The encoding side can encode the weight transform rate refining flag (for example, the sequence level weight transform rate refining flag, etc.) to a bit stream, so that the decoding side can parse the weight transform rate refining flag from the bit stream, and determine the weight transform rate refining flag as the weight transform rate refining flag corresponding to the current block. To sum up, the decoding side can obtain the weight transform rate refining flag corresponding to the current block. If the weight transform rate refining flag is used to indicate that the weight transform rate of the current block does not need to be switched, the decoding side determines that the weight transform rate of the current block is the first weight transform rate. If the weight transform rate refining flag is used to indicate that the weight transform rate of the current block needs to be switched, the decoding side determines that the weight transform rate of the current block is the second weight transform rate. For example, if the weight transform rate refining flag is a first value, it indicates that the weight transform rate of the current block does not need to be switched. If the weight transform rate refining flag is a second value, it indicates that the weight transform rate of the current block needs to be switched. The first value is 1, and the second value is 0; or the first value is 0, and the second value is 1. The above is only examples of the first value and the second value, which do not constitute a limitation herein.

The encoding side may also not encode the weight transform rate refining flag to the bit stream, but the decoding side may implicitly derive the weight transform rate refining flag, and determine the weight transform rate refining flag as the weight transform rate refining flag corresponding to the current block. For example, if successive blocks need to switch the weight transform rate, the current block also needs to switch the weight transform rate. The decoding side implicitly derives the weight transform rate refining flag, and determines the weight transform rate refining flag as the weight transform rate refining flag corresponding to the current block which indicates that the weight transform rate of the current block needs to be switched. If successive blocks do not need to switch the weight transform rate, the current block does not need to switch the weight transform rate, either. The decoding side implicitly derives the weight transform rate refining flag, and the weight transform rate refining flag indicates that the weight transform rate of the current block does not need to be switched. The above method is only an example of implicitly deriving the weight transform rate refining flag, which is not limited herein. To sum up, the decoding side can obtain the weight transform rate refining flag corresponding to the current block. If the weight transform rate refining flag indicates that the weight transform rate of the current block does not need to be switched, it is determined that the weight transform rate of the current block is the first weight transform rate. If the weight transform rate refining flag indicates that the weight transform rate of the current block needs to be switched, it is determined that the weight transform rate of the current block is the second weight transform rate.

To sum up, the weight transform rate of the current block can be the first weight transform rate or the second weight transform rate, that is, the weight transform rate of the current block can be switched, and the switching of the weight transform rate depends on a certain level weight transform rate refining flag (refine_flag), which is an explicit flag or an implicit flag. The explicit flag means that the refining flag refine_flag is encoded into the bit stream, so that the decoding side can parse the refining flag refine_flag from the bit stream. The implicit flag means that the encoding side and the decoding side adaptively derive the refining flag refine_flag based on available information.

In an example, a certain level refining flag refine_flag includes: a sequence level refining flag refine_flag, which is a refining flag refine_flag indicating a current sequence, the sequence level refining flag refine_flag serving as a refining flag refine_flag of all blocks belonging to the current sequence; a picture level refining flag refine_flag, which is a refining flag refine_flag indicating a current picture, the picture level refining flag refine_flag serving as a refining flag refine_flag of all blocks belonging to the current picture; a Slice level refining flag refine_flag, which is a refining flag refine_flag indicating a current slice, the Slice level refining flag refine_flag serving as a refining flag refine_flag of all blocks belonging to the current slice; a Tile level refining flag refine_flag, which is a refining flag refine_flag indicating a current tile, the Tile level refining flag refine_flag serving as a refining flag refine_flag of all blocks belonging to the current tile; a Patch level refining flag refine_flag, which is a refining flag refine_flag indicating a current patch, the Patch level refining flag refine_flag serving as a refining flag refine_flag of all blocks belonging to the current patch; a CTU level refining flag refine_flag, which is a refining flag refine_flag indicating a current CTU, the CTU level refining flag refine_flag serving as a refining flag refine_flag of all blocks belonging to the current CTU; a LCU level refining flag refine_flag, which is a refining flag refine_flag indicating a current LCU, the LCU level refining flag refine_flag serving as a refining flag refine_flag of all blocks belonging to the current LCU; a block level refining flag refining flag refine_flag, which is a refining flag refine_flag indicating a current block, the block level refining flag refine_flag serving as a refining flag refine_flag of the current block; a CU level refining flag refine_flag, which is a refining flag refine_flag indicating a current CU, the CU level refining flag refine_flag serving as a refining flag refine_flag of the current CU; a PU level refining flag refine_flag, which is a refining flag refine_flag indicating a current PU, the PU level refining flag refine_flag serving as a refining flag refine_flag of the current PU. The above is only examples, which do not constitute a limitation herein.

In an example, the first weight transform rate can be used as a default weight transform rate. When the weight transform rate refining flag is used to indicate that the weight transform rate of the current block does not need to be switched, the weight transform rate will not be switched, that is, it is determined that the weight transform rate of the current block is the first weight transform rate. When the weight transform rate refining flag is used to indicate that the weight transform rate of the current block needs to be switched, the weight transform rate will be switched, that is, it is determined that the weight transform rate of the current block is the second weight transform rate.

Example 10: in examples 1 to 4, the encoding side/the decoding side needs to obtain the weight prediction angle and the weight prediction position of the current block. In example 9, the weight transform rate of the current block can be obtained, such as the first weight transform rate or the second weight transform rate. On this basis, the weight prediction angle and the weight prediction position of the current block can be obtained in the following manners.

In a first manner, the encoding side and the decoding side agree to take the same weight prediction angle as the weight prediction angle of the current block, and agree to take the same weight prediction position as the weight prediction position of the current block. For example, the encoding side and the decoding side take the weight prediction angle A as the weight prediction angle of the current block, and the encoding side and the decoding side take the weight prediction position 4 as the weight prediction position of the current block.

In a second manner, the encoding side establishes a weight prediction angle list, which includes at least one weight prediction angle, such as the weight prediction angle A and the weight prediction angle B. The encoding side establishes a weight prediction position list, which includes at least one weight prediction position, such as the weight prediction positions 0 to 6. Each weight prediction angle in the weight prediction angle list is traversed in turn, and each weight prediction position in the weight prediction position list is traversed, that is, combinations of each weight prediction angle and each weight prediction position are traversed. Each combination is taken as the weight prediction angle and weight prediction position obtained in the step a1.

Based on the weight prediction angle, the weight prediction position and weight transform rate, weighted prediction values of the current block are obtained.

For example, when the encoding side traverses the weight prediction angle A and the weight prediction position 0, the weighted prediction values of the current block are obtained based on the weight prediction angle A and the weight prediction position 0; when the encoding side traverses the weight prediction angle A and the weight prediction position 1, the weighted prediction values of the current block are obtained based on the weight prediction angle A and the weight prediction position 1; when the encoding side traverses the weight prediction angle B and the weight prediction position 0, the weighted prediction values of the current block are obtained based on the weight prediction angle B and the weight prediction position 0, and so on. The coding side can obtain the weighted prediction values of the current block based on each combination of the weight prediction angle and the weight prediction position.

After obtaining the weighted prediction values of the current block based on the combination of the weight prediction angle and the weight prediction position, the encoding side can determine a RDO cost value based on the weighted prediction values of the current block. The way to determine the RDO cost value is not limited herein. The encoding side can obtain the RDO cost value of each combination, and select a minimum RDO cost value from all RDO cost values.

Then, the encoding side takes the combination of the weight prediction angle and the weight prediction position corresponding to the minimum RDO cost value as a target weight prediction angle and a target weight prediction position. Finally, an index value of the target weight prediction angle in the weight prediction angle list and an index value of the target weight prediction position in the weight prediction position list are encoded into the bit stream.

For the decoding side, the decoding side establishes a weight prediction angle list, which is the same as the weight prediction angle list at the encoding side. The weight prediction angle list includes at least one weight prediction angle. The decoding side establishes a weight prediction position list, which is the same as the weight prediction position list at the encoding side. The weight prediction position list includes at least one weight prediction position. After receiving the coded bit stream of the current block, the decoding side parses indication information from the coded bit stream, selects a weight prediction angle from the weight prediction angle list as the weight prediction angle of the current block based on the indication information, and selects a weight prediction position from the weight prediction position list as the weight prediction position of the current block based on the indication information.

Application scenario 1: when the encoding side sends a coded bit stream to the decoding side, the coded bit stream can include indication information 1 which is used to indicate the weight prediction angle (i.e., target weight prediction angle) of the current block and the weight prediction position (i.e., target weight prediction position) of the current block. For example, when the indication information 1 is 0, it is used to indicate a first weight prediction angle in the weight prediction angle list and a first weight prediction position in the weight prediction position list. When the indication information 1 is 1, it is used to indicate the first weight prediction angle in the weight prediction angle list and a second weight prediction position in the weight prediction position list, and so on. The value of the indication information 1 is used to indicate which weight prediction angle and which weight prediction position, as long as the encoding side and the decoding side agree, which is not limited in this example.

After receiving the coded bit stream, the decoding side parses the indication information 1 from the coded bit stream. Based on the indication information 1, the decoding side can select a weight prediction angle corresponding to the indication information 1 from the weight prediction angle list, and the weight prediction angle is used as the weight prediction angle of the current block. Based on the indication information 1, the decoding side can select a weight prediction position corresponding to the indication information 1 from the weight prediction position list, and the weight prediction position is used as the weight prediction position of the current block.

Application scenario 2: when the encoding side sends a coded bit stream to the decoding side, the coded bit stream may include indication information 2 and indication information 3. The indication information 2 is used to indicate the target weight prediction angle of the current block, such as an index value 1 of the target weight prediction angle in the weight prediction angle list, where the index value 1 indicates a number of the target weight prediction angle in the weight prediction angle list. The indication information 3 is used to indicate the target weight prediction position of the current block, such as an index value 2 of the target weight prediction position in the weight prediction position list, where the index value 2 indicates a number of the target weight prediction position in the weight prediction position list. After receiving the coded bit stream, the decoding side parses the indication information 2 and the indication information 3 from the coded bit stream. Based on the indication information 2, the decoding side selects the weight prediction angle corresponding to the index value 1 from the weight prediction angle list, and the weight prediction angle is used as the weight prediction angle of the current block. Based on the indication information 3, the decoding side selects the weight prediction position corresponding to the index value 2 from the weight prediction position list, and the weight prediction position is used as the weight prediction position of the current block.

Application scenario 3: the encoding side and the decoding side can agree on one or more preferred configuration combinations, which are not limited and can be configured based on actual experience. For example, the encoding side and the decoding side agree on a preferred configuration combination 1 that includes the weight prediction angle A and the weight prediction position 4, and a preferred configuration combination 2 that includes the weight prediction angle B and the weight prediction position 4.

After determining the target weight prediction angle and the target weight prediction position of the current block, the encoding side determines whether the target weight prediction angle and the target weight prediction position are a preferred configuration combination. If yes, when the encoding side sends a coded bit stream to the decoding side, the coded bit stream can include indication information 4 and indication information 5. The indication information 4 is used to indicate whether a preferred configuration combination is adopted for the current block. If the indication information 4 is a first value (such as 0), it indicates that the preferred configuration combination is adopted for the current block. The indication information 5 is used to indicate which preferred configuration combination is adopted for the current block. For example, when the indication information 5 is 0, it is used to indicate that a preferred configuration combination 1 is adopted for the current block; when the indication information 5 is 1, it is used to indicate that a preferred configuration combination 2 is adopted for the current block.

After receiving the coded bit stream, the decoding side parses the indication information 4 and indication information 5 from the coded bit stream. Based on the indication information 4, the decoding side determines whether a preferred configuration combination is adopted for the current block. If the indication information 4 is the first value, the decoding side determines that a preferred configuration combination is adopted for the current block. When a preferred configuration combination is adopted for the current block, the decoding side determines which preferred configuration combination is adopted for the current block based on the indication information 5. For example, when the indication information 5 is 0, the decoding side determines the preferred configuration combination 1 is adopted for the current block, that is, the weight prediction angle of the current block is the weight prediction angle A, and the weight prediction position of the current block is the weight prediction position 4. For another example, when the indication information 5 is 1, the decoding side determines that the preferred configuration combination 2 is adopted for the current block, that is, the weight prediction angle of the current block is the weight prediction angle B, and the weight prediction position of the current block is the weight prediction position 4.

In an example, if the encoding side and the decoding side only agree on one preferred configuration combination, such as the preferred configuration combination including the weight prediction angle A and the weight prediction position 4, the coded bit stream can include the indication information 4, but not indication information 5, where the indication information 4 is used to indicate that whether the preferred configuration combination is adopted for the current block. After parsing the indication information 4 from the coded bit stream, if the indication information 4 is the first value, the decoding side determines that the preferred configuration combination is adopted for the current block. Based on the preferred configuration combination, the decoding side determines that the weight prediction angle of the current block is the weight prediction angle A, and the weight prediction position of the current block is the weight prediction position 4.

Application scenario 4: the encoding side and the decoding side can agree on one or more preferred configuration combinations. After determining the target weight prediction angle and target weight prediction position of the current block, the encoding side determines whether the target weight prediction angle and target weight prediction position are a preferred configuration combination. If not, when the encoding side sends a coded bit stream to the decoding side, the coded bit stream includes the indication information 4 and indication information 6. The indication information 4 is used to indicate whether a preferred configuration combination is adopted for the current block. If the indication information 4 is a second value (such as 1), it indicates that a preferred configuration combination is not adopted for the current block. The indication information 6 is used to indicate the target weight prediction angle of the current block and the target weight prediction position of the current block. For example, when the indication information 6 is 0, it is used to indicate the first weight prediction angle in the weight prediction angle list and to indicate the first weight prediction position in the weight prediction position list, and so on.

After receiving the coded bit stream, the decoding side parses the indication information 4 and the indication information 6 from the coded bit stream. Based on the indication information 4, the decoding side determines whether a preferred configuration combination is adopted for the current block. If the indication information 4 is the second value, the decoding side determines that a preferred configuration combination is not adopted for the current block. When a preferred configuration combination is not adopted for the current block, the decoding side can select the weight prediction angle corresponding to the indication information 6 from the weight prediction angle list based on the indication information 6, and the weight prediction angle is used as the weight prediction angle of the current block. Based on the indication information 6, the decoding side can select the weight prediction position corresponding to the indication information 6 from the weight prediction position list, and the weight prediction position is used as the weight prediction position of the current block.

Application scenario 5: the encoding side and the decoding side can agree on one or more preferred configuration combinations. After determining the target weight prediction angle and target weight prediction position of the current block, the encoding side determines whether the target weight prediction angle and target weight prediction position are a preferred configuration combination. If not, when the encoding side sends a coded bit stream to the decoding side, the coded bit stream includes the indication information 4, indication information 7 and indication information 8. In an example, the indication information 4 is used to indicate whether a preferred configuration combination is adopted for the current block. If the indication information 4 is the second value, it indicates that a preferred configuration combination is not adopted for the current block. The indication information 7 is used to indicate the target weight prediction angle of the current block, such as an index value 1 of the target weight prediction angle in the weight prediction angle list, where the index value 1 indicates a number of the target weight prediction angle in the weight prediction angle list. The indication information 8 is used to indicate the target weight prediction position of the current block, such as an index value 2 of the target weight prediction position in the weight prediction position list, where the index value 2 indicates a number of the target weight prediction position in the weight prediction position list.

After receiving the coded bit stream, the decoding side parses the indication information 4, the indication information 7 and the indication information 8 from the coded bit stream. Based on the indication information 4, the decoding side determines whether a preferred configuration combination is adopted for the current block. If the indication information 4 is the second value, the decoding side determines that a preferred configuration combination is not adopted for the current block. When a preferred configuration combination is not adopted for the current block, the decoding side selects the weight prediction angle corresponding to the index value 1 from the weight prediction angle list based on the indication information 7, and the weight prediction angle is taken as the weight prediction angle of the current block. The decoding side selects the weight prediction position corresponding to the index value 2 from the weight prediction position list based on the indication information 8, and the weight prediction position is used as the weight prediction position of the current block.

Example 11: in example is to 4, the encoding side/the decoding side needs to obtain the weight transform rate of the current block. If the current block supports the weight transform rate switching mode, the weight transform rate of the current block is obtained in the following way: weight transform rate indication information of the current block is obtained; a weight transform rate corresponding to the weight transform rate indication information is selected from a preset look-up table, which includes at least two weight transform rates. The selected weight transform rate is determined as the weight transform rate of the current block.

Since the preset look-up table includes at least two weight transform rates, if the current block supports the weight transform rate switching mode, the weight transform rate of the current block can be selected from the at least two weight transform rates, that is, the weight transform rate of the current block is variable, so that the weight transform rate can be switched adaptively instead of adopting a unified weight transform rate.

In an example, if the switching control information allows the current block to enable the weight transform rate switching mode, the current block supports the weight transform rate switching mode. If the switching control information does not allow the current block to enable the weight transform rate switching mode, the current block does not support the weight transform rate switching mode. For the content of whether the current block supports the weight transform rate switching mode, please refer to example 9.

In a possible implementation, the preset look-up table may include at least two weight transform rates, and the weight transform rate indication information may include weight transform rate index information (used to indicate a certain weight transform rate among all weight transform rates in the look-up table). Based on this, the weight transform rate corresponding to the weight transform rate index information can be selected from the look-up table.

For the encoding side, if there is only one look-up table, the encoding side can determine a RDO cost value corresponding to the weight transform rate for each weight transform rate in the look-up table, take a weight transform rate corresponding to a minimum RDO cost value as the target weight transform rate of the current block, and determine index information of the target weight transform rate in the look-up table, that is, the weight transform rate index information which indicates which weight transform rate in the look-up table.

For the decoding side, if there is only one look-up table, when the encoding side sends a coded bit stream of the current block to the decoding side, the coded bit stream can carry the weight transform rate index information which is used to indicate index information of the target weight transform rate in the look-up table. The decoding side selects the weight transform rate corresponding to the weight transform rate index information from the look-up table, and the weight transform rate is used as the target weight transform rate of the current block.

Example 12: in examples 1-4, the encoding side/the decoding side needs to obtain the weight prediction angle, the weight prediction position and the weight transform rate of the current block. In example 11, the weight transform rate of the current block can be obtained. On this basis, the weight prediction angle and the weight prediction position of the current block can be obtained in the following manners.

In a first manner, the encoding side and the decoding side agree that a same weight prediction angle is used as the weight prediction angle of the current block, and agree that a same weight prediction position is used as the weight prediction position of the current block. For example, the encoding side and the decoding side take the weight prediction angle A as the weight prediction angle of the current block, and the encoding side and the decoding side take the weight prediction position 4 as the weight prediction position of the current block.

In a second manner, the encoding side establishes a weight prediction angle list which includes at least one weight prediction angle. The encoding side establishes a weight prediction position list which includes at least one weight prediction position. The encoding side establishes at least two look-up tables. Taking a first look-up table and a second look-up table as an example, the first look-up table includes at least one weight transform rate, and the second look-up table includes at least one weight transform rate. A target look-up table is determined by the encoding side, and the determination method can be referred to example 11. The target look-up table being the first look-up table is taken as an example herein. The encoding side sequentially traverses each weight prediction angle in the weight prediction angle list, traverses each weight prediction position in the weight prediction position list, and traverses each weight transform rate in the target look-up table, that is, combinations of each weight prediction angle, each weight prediction position and each weight transform rate are traversed. Each combination of the weight prediction angle, the weight prediction position and the weight transform rate can be taken as the weight prediction angle, the weight prediction position and the weight transform rate obtained in step a1. Based on the weight prediction angle, the weight prediction position and the weight transform rate, the weighted prediction values of the current block are obtained.

To sum up, the encoding side can obtain the weighted prediction values of the current block based on each combination. After obtaining the weighted prediction values of the current block, the encoding side can determine the RDO cost value based on the weighted prediction values of the current block, that is, the encoding side can obtain the RDO cost value of each combination, and select a minimum RDO cost value from all RDO cost values.

Then, the encoding side takes the weight prediction angle, the weight prediction position and the weight transform rate corresponding to the minimum RDO cost value as the target weight prediction angle, the target weight prediction position and the target weight transform rate, respectively. Finally, the encoding side uses an index value of the target weight prediction angle in the weight prediction angle list, and an index value of the target weight prediction position in the weight prediction position list, and an index value of the target weight transform rate in the target look-up table are encoded into a bit stream of the current block.

For the decoding side, the decoding side establishes a weight prediction angle list which is the same as the weight prediction angle list at the encoding side. The decoding side establishes a weight prediction position list which is the same as the weight prediction position list at the encoding side. The decoding side establishes a first look-up table which is the same as the first look-up table at the encoding and a second look-up table which is the same as the second look-up table at the encoding side. After receiving the coded bit stream of the current block, the decoding side parses indication information from the coded bit stream, selects a weight prediction angle from the weight prediction angle list as the weight prediction angle of the current block based on the indication information, and selects a weight prediction position from the weight prediction position list as the weight prediction position of the current block. For the method for obtaining the weight prediction angle and the weight prediction position based on the indication information, please refer to example 10, which will not be repeated herein. After receiving the coded bit stream of the current block, the decoding side can determine the target look-up table (such as the first look-up table or the second look-up table), and based on the weight transform rate index information, the decoding side can select a weight transform rate from the target look-up table as the weight transform rate of the current block. For the method for obtaining the weight transform rate, please refer to example 11, which will not be repeated herein.

Example 13: in examples 1 to 3, the encoding side/the decoding side needs to obtain a motion information candidate list, for example, the motion information candidate list can be obtained in the following way: at least one piece of available motion information to be added to a motion information candidate list is obtained; and the motion information candidate list is obtained based on the at least one piece of available motion information. In an example, the at least one piece of available motion information includes, but is not limited to, at least one of the following motion information: spatial motion information; temporal motion information; History-based Motion Vector Prediction (HMVP) motion information; preset motion information.

In an example, for the spatial motion information, the at least one piece of available motion information to be added to the motion information candidate list can be obtained in the following way: for a spatial neighbouring block of the current block, if the spatial neighbouring block exists and an inter prediction mode is adopted for the spatial neighbouring block, motion information of the spatial neighbouring block is determined as the available motion information.

In an example, for the temporal motion information, the at least one piece of available motion information to be added to the motion information candidate list can be obtained in the following way: based on a preset position of the current block (for example, a pixel position in an upper left corner of the current block), a temporal neighbouring block corresponding to the preset position is selected from a reference picture of the current block, and motion information of the temporal neighbouring block is determined as the available motion information.

In an example, for the preset motion information, the at least one piece of available motion information to be added to the motion information candidate list can be obtained in the following way: the preset motion information is determined as the available motion information, and the preset motion information may include, but is not limited to, default motion information derived based on candidate motion information existing in the motion information candidate list.

In a possible implementation, based on the at least one piece of available motion information, the motion information candidate list can be obtained in the following manner: for the available motion information currently to be added to the motion information candidate list, if the available motion information is unidirectional motion information, and the unidirectional motion information does not duplicate with candidate motion information existing in the motion information candidate list, the unidirectional motion information is added to the motion information candidate list; if the available motion information is bidirectional motion information, the bidirectional motion information is clipped into first unidirectional motion information and second unidirectional motion information; if the first unidirectional motion information does not duplicate with candidate motion information existing in the motion information candidate list, the first unidirectional motion information is added to the motion information candidate list.

In the above example, the first unidirectional motion information may be unidirectional motion information pointing to a reference picture in a first reference picture list; the second unidirectional motion information may be unidirectional motion information pointing to a reference picture in a second reference picture list.

In a possible implementation, reference picture List0 may be a forward reference picture list, and reference picture List1 may be a backward reference picture list.

In the above examples, the duplicate checking operation for the unidirectional motion information and the candidate motion information existing in the motion information candidate list, may include, but is not limited to: if a display order index (also referred to as Picture Order Count, (POC)) of a reference picture to which the unidirectional motion information points to is the same as a POC of a reference picture to which the candidate motion information points, and a motion vector of the unidirectional motion information is the same as a motion vector of the candidate motion information, it is determined that the unidirectional motion information duplicates with the candidate motion information; otherwise, it is determined that the unidirectional motion information does not duplicate with the candidate motion information.

The duplicate checking operation for the first unidirectional motion information and the candidate motion information existing in the motion information candidate list, may include, but is not limited to: if a reference picture list to which the first unidirectional motion information points to is the same as a reference picture list to which the candidate motion information points, a refIdx of the first unidirectional motion information is the same as a refIdx of the candidate motion information, and a motion vector of the first unidirectional motion information is the same as a motion vector of the candidate motion information, it is determined that the first unidirectional motion information duplicates with the candidate motion information; otherwise, it is determined that the first unidirectional motion information does not duplicate with the candidate motion information. Or, if a POC of a reference picture to which the first unidirectional motion information points to is the same as a POC of a reference picture to which the candidate motion information points, and a motion vector of the first unidirectional motion information is the same as a motion vector of the candidate motion information, it is determined that the first unidirectional motion information duplicates with the candidate motion information; otherwise, it is determined that the first unidirectional motion information does not duplicate with the candidate motion information.

The duplicate checking operation for the second unidirectional motion information and the candidate motion information existing in the motion information candidate list, may include, but is not limited to: if a reference picture list to which the second unidirectional motion information points to is the same as a reference picture list to which the candidate motion information points, a refIdx of the second unidirectional motion information is the same as a refIdx of the candidate motion information, and a motion vector of the second unidirectional motion information is the same as a motion vector of the candidate motion information, it is determined that the second unidirectional motion information duplicates with the candidate motion information; otherwise, it is determined that the second unidirectional motion information does not duplicate with the candidate motion information. Or, if a POC of a reference picture to which the second unidirectional motion information points to is the same as a POC of a reference picture to which the candidate motion information points, and a motion vector of the second unidirectional motion information is the same as a motion vector of the candidate motion information, it is determined that the second unidirectional motion information duplicates with the candidate motion information; otherwise, it is determined that the second unidirectional motion information does not duplicate with the candidate motion information.

In an example, the above process needs to compare whether the POC of the reference picture to which the unidirectional motion information points is the same as that of the reference picture to which the candidate motion information points. It should be noted that the POC of the reference picture is only an example of determining whether reference pictures are the same. In addition to the POC, other attributes that can determine whether the reference pictures are the same, such as a Decoding Order Count (DOC) of the reference picture, can be adopted, which is not limited. To sum up, whether the DOC of the reference picture to which unidirectional motion information points is the same as the DOC of the reference picture to which candidate motion information points can also be compared, and the implementation principle is similar to that of POC.

Figure 9A:
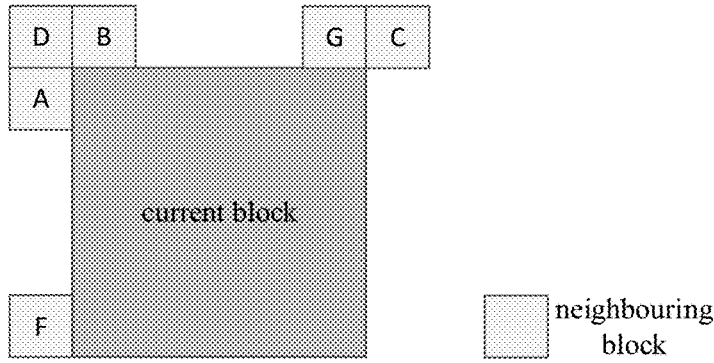
FIG. 9A is a schematic diagram of neighbouring blocks of a current block according to an example of the present disclosure.

Example 14: for example 13, the motion information candidate list can be obtained by using the spatial motion information (motion information of one or more spatial neighbouring blocks of the current block is referred to as spatial motion information herein) and/or the temporal motion information (motion information of one or more temporal neighbouring blocks of the current block is referred to as temporal motion information herein). Therefore, the available motion information needs to be selected from the spatial motion information and/or temporal motion information first. As shown in FIG. 9A, which is a schematic diagram of spatial neighbouring blocks of a current block. The spatial motion information can be motion information of spatial neighbouring blocks such as F, G, C, A, B, D, and the temporal motion information can be motion information of at least one temporal neighbouring block.

For the spatial motion information, the available motion information to be added to the motion information candidate list can be obtained in the following manner.

In manner 11, as shown in FIG. 9A, F, G, C, A, B, D are spatial neighbouring blocks of a current block E. The "availability" of motion information of F, G, C, A, B, D can be determined. For example, if F exists and the inter prediction mode is adopted, then the motion information of F is available motion information; otherwise, the motion information of F is unavailable motion information. If G exists and the inter prediction mode is adopted, then the motion information of G is available motion information; otherwise, the motion information of G is unavailable motion information. If C exists and the inter prediction mode is adopted, then the motion information of C is available motion information; otherwise, the motion information of C is unavailable motion information. If A exists and the inter prediction mode is adopted, then the motion information of A is available motion information; otherwise, the motion information of A is unavailable motion information. If B exists and the inter prediction mode is adopted, then the motion information of B is available motion information; otherwise, the motion information of B is unavailable motion information. If D exists and the inter prediction mode is adopted, then the motion information of D is available motion information; otherwise, the motion information of D is unavailable motion information.

In manner 12, F, G, C, A, B, D are spatial neighbouring blocks of a current block E. The "availability" of motion information of F, G, C, A, B, D can be determined. If F exists and the inter prediction mode is adopted, then the motion information of F is available motion information; otherwise, the motion information of F is unavailable motion information. If G exists and the inter prediction mode is adopted, and the motion information of G is different from that of F, then the motion information of G is available; otherwise, the motion information of G is unavailable motion information. If C exists and the inter prediction mode is adopted, and the motion information of C is different from that of G, then the motion information of C is available motion information; otherwise, the motion information of C is unavailable motion information. If A exists and the inter prediction mode is adopted, and the motion information of A is different from that of F, then the motion information of A is available motion information; otherwise, the motion information of A is unavailable motion information. If B exists and the inter prediction mode is adopted, the motion information of B is different from that of G, then the motion information of B is available motion information; otherwise, the motion information of B is unavailable motion information. If D exists and the inter prediction mode is adopted, the motion information of D is different from that of A, and the motion information of D is different from that of G, then the motion information of D is available motion information; otherwise, the motion information of D is unavailable motion information.

In manner 13, F, G, C, A, B, D are spatial neighbouring blocks of a current block E. The "availability" of motion information of F, G, C, A, B, D can be determined. For example, if F exists and the inter prediction mode is adopted, then the motion information of F is available motion information; otherwise, the motion information of F is unavailable motion information. If G exists and the inter prediction mode is adopted, and the motion information of G is different from that of F, then the motion information of G is available motion information; otherwise, the motion information of G is unavailable motion information. If C exists and the inter prediction mode is adopted, and the motion information of C is different from that of G, then the motion information of C is available motion information; otherwise, the motion information of C is unavailable motion information. If A exists and the inter prediction mode is adopted, and the motion information of A is different from that of F, then the motion information of A is available motion information; otherwise, the motion information of A is unavailable motion information. If B exists and the inter prediction mode is adopted, then the motion information of B is available motion information; otherwise, the motion information of B is unavailable motion information. If D exists and the inter prediction mode is adopted, the motion information of D is different from that of A, and the motion information of D is different from that of G, then the motion information of D is available motion information; otherwise, the motion information of D is unavailable motion information.

In an example, in manners 12 and 13, when determining whether the motion information of a spatial neighbouring block is available motion information, it may be required to compare whether the motion information of two spatial neighbouring blocks (for example, the spatial neighbouring block and another spatial neighbouring block) is the same. For example, whether the motion information of G is the same as that of F need to be compared. The process of comparing whether the motion information is the same is actually the duplicate checking operation of motion information. If a duplicate checking result is duplicate, the comparison result of motion information is the same. If the duplicate checking result is not duplicate, the comparison result of motion information is different. For the duplicate checking operation of motion information, please refer to subsequent examples, and which will not be repeated herein.

For the temporal motion information, the available motion information to be added to the motion information candidate list can be obtained in the following manners.

In manner 21, based on a preset position of the current block, a temporal neighbouring block corresponding to the preset position is selected from a reference picture of the current block, and motion information of the temporal neighbouring block is determined as the available motion information. For example, if a current picture (slice) where the current block is located is a B picture (slice), unidirectional motion information or bidirectional motion information is derived based on a co-located block of a co-located reference picture, and the unidirectional motion information or the bidirectional motion information is used as the available motion information. If the current picture (slice) is a P picture (slice), unidirectional motion information is derived based on a co-located block of a co-located reference picture, and the unidirectional motion information is used as the available motion information.

In an example, the co-located block is a temporal neighbouring block corresponding to the preset position of the current block in the co-located reference picture. The preset position of the current block can be set based on experience and is not limited herein, such as a pixel position in an upper left corner of the current block, a pixel position in an upper right corner of the current block, a pixel position in a lower left corner of the current block, a pixel position in a lower right corner of the current block, and a pixel position in a center of the current block. The co-located reference picture can be a preset reference picture, for example, a first reference picture in reference picture List0 of the current block is taken as the co-located reference picture. The co-located reference picture can also be a derived reference picture, for example, a reference picture closest to the current picture in reference picture List0 of the current block is taken as the co-located reference picture. The co-located reference picture can also be a reference picture parsed from a bit stream. For example, for the decoding side, information on the co-located reference picture can be parsed from the bit stream, and the co-located reference picture can be determined.

If the current picture (slice) where the current block is located is a B picture (slice), unidirectional motion information or bidirectional motion information is derived based on motion information of the co-located block. If the current picture (slice) is a P picture (slice), unidirectional motion information is derived based on motion information of the co-located block.

In manner 22, a target position of the current block is determined based on the weight prediction angle and weight prediction position of the current block; a temporal neighbouring block corresponding to the target position selected from a reference picture of the current block, and motion information of the temporal neighbouring block is determined as the available motion information. In an example, based on the weight prediction angle and weight prediction position of the current block, the target position of the current block can be determined. For example, based on an index value of the weight prediction angle and the weight prediction position of the current block, the target position of the current block can be determined. Then, a co-located block of a co-located reference picture can be determined based on the target position of the current block. If a current picture (slice) where the current block is located is a B picture (slice), unidirectional motion information or bidirectional motion information is derived based on the co-located block of the co-located reference picture, and the unidirectional motion information or the bidirectional motion information is used as the available motion information. If the current picture (slice) is a P picture (slice), unidirectional motion information is derived based on the co-located block of the co-located reference picture, and the unidirectional motion information is used as the available motion information.

The co-located block is a temporal neighbouring block corresponding to the target position of the current block in the co-located reference picture. The target position can be a pixel position in an upper left corner of the current block, a pixel position in an upper right corner of the current block, a pixel position in a lower left corner of the current block, a pixel position in a lower right corner of the current block, etc.

Figure 9B:
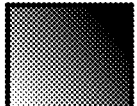
FIGS. 9B to 9D are schematic diagrams of a target position of a current block according to an example of the present disclosure.

For example, based on the weight prediction angle of the current block and the weight prediction position of the current block, a weight matrix of the current block can be obtained. As shown in FIG. 9B, a weight portion on an upper right side (a black portion) accounts for a relatively small proportion, so the correlation between spatial motion information and the black portion is more likely to be lower than the other portion (a white portion). Under such assumption, the positon of temporal motion information in candidates list should be adjusted for the weight portion on the upper right side to provide more appropriate candidate motion information. On this basis, the co-located block can be a temporal neighbouring block corresponding to a pixel position in up upper right corner of the current block (that is, the weight portion accounting for a relatively small proportion), that is, the target position of the current block is the pixel position in the upper right corner of the current block.

Figure 9C:
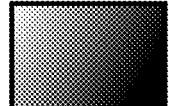
Figure 9D:
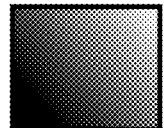

Similarly, as shown in FIG. 9C, based on the weight prediction angle of the current block and the weight prediction position of the current block, it can be determined that the target position of the current block is a pixel position in a lower right corner of the current block. As shown in FIG. 9D, based on the weight prediction angle of the current block and the weight prediction position of the current block, it can be determined that the target position of the current block is a pixel position in a lower left corner of the current block.

After obtaining the available motion information, for each piece of available motion information (such as spatial motion information, temporal motion information, etc.), the available motion information can be added to the motion information candidate list in one or a combination of the following ways.

In manner 31, duplicate checking is not performed. For example, if the available motion information is unidirectional motion information, the unidirectional motion information is added to the motion information candidate list. If the available motion information is bidirectional motion information, the bidirectional motion information is clipped into first unidirectional motion information and second unidirectional motion information, and some unidirectional motion information after being clipped is added to the motion information candidate list. For example, the first unidirectional motion information can be added to the motion information candidate list.

In manner 32, half duplicate checking is performed, that is, the other half of bidirectional motion information is not checked. For example, if the available motion information is unidirectional motion information, and the unidirectional motion information does not duplicate with candidate motion information existing in the motion information candidate list, the unidirectional motion information is added to the motion information candidate list. If the available motion information is bidirectional motion information, the bidirectional motion information is clipped into first unidirectional motion information and second unidirectional motion information, and some unidirectional motion information is added to the motion information candidate list. For example, if the first unidirectional motion information in the bidirectional motion information does not duplicate with the candidate motion information existing in the motion information candidate list, the first unidirectional motion information is added to the motion information candidate list.

In manner 33, full duplicate checking is performed. For example, if the available motion information is unidirectional motion information, and the unidirectional motion information does not duplicate with candidate motion information existing in the motion information candidate list, the unidirectional motion information is added to the motion information candidate list. If the available motion information is bidirectional motion information, the bidirectional motion information is clipped into first unidirectional motion information and second unidirectional motion information, and some unidirectional motion information is added to the motion information candidate list. For example, if the first unidirectional motion information in the bidirectional motion information does not duplicate with the candidate motion information existing in the motion information candidate list, the first unidirectional motion information is added to the motion information candidate list; if the first unidirectional motion information duplicates with the candidate motion information existing in the motion information candidate list, and the second unidirectional motion information in the bidirectional motion information does not duplicate with the candidate motion information existing in the motion information candidate list, the second unidirectional motion information is added to the motion information candidate list.

In manners 31, 32 and 33, the first unidirectional motion information may be unidirectional motion information pointing to a reference picture in a first reference picture list; the second unidirectional motion information may be unidirectional motion information pointing to a reference picture in a second reference picture list.

In an example, if a total pieces of candidate motion information existing in the motion information candidate list (that is, the total pieces of candidate motion information currently existing in the motion information candidate list when available motion information is added to the motion information candidate list) is even, the first reference picture list is reference picture List0, and the second reference picture list is reference picture List1; if the total pieces of the candidate motion information existing in the motion information candidate list is odd, the first reference picture list is reference picture List1, and the second reference picture list is reference picture List0. Or, if the total pieces of the candidate motion information existing in the motion information candidate list is odd, the first reference picture list is reference picture List0, and the second reference picture list is reference picture List1; if the total pieces of the candidate motion information existing in the motion information candidate list is even, the first reference picture list is reference picture List1, and the second reference picture list is reference picture List0. Or, the first reference picture list is reference picture List0, and the second reference picture list is reference picture List1. Or, the first reference picture list is reference picture List1, and the second reference picture list is reference picture List0.

In the above example, the duplicate checking operation of the unidirectional motion information (such as the unidirectional motion information, the first unidirectional motion information, the second unidirectional motion information) and the candidate motion information existing in the motion information candidate list is involved. The result of the duplicate checking operation can be duplicate or not. The duplicate checking operation of motion information of two spatial neighbouring blocks is also involved. The result of the duplicate checking operation can be duplicate or not. In the subsequent example 19, the duplicate checking operation of the bidirectional motion information and the candidate motion information existing in the motion information candidate list is also involved. The result of the duplicate checking operation can be duplicate or not.

For the convenience of description, two pieces of motion information for duplicate checking operation are referred to as motion information 1 and motion information 2. When the motion information 1 is unidirectional motion information to be duplicate checked, motion information 2 is candidate motion information existing in the motion information candidate list. When the motion information 1 is bidirectional motion information to be checked, the motion information 2 is candidate motion information existing in the motion information candidate list. When the motion information 1 is motion information of a spatial neighbouring block that needs to determine the availability, the motion information 2 is motion information of a neighbouring block that has determined the availability. Referring to manner 12, for example, if motion information of F is available, when it needs to determine whether motion information of G is available, the motion information 1 is the motion information of G, and the motion information 2 is the motion information of F.

The duplicate checking operation can be implemented in the following manners.

In manner 41, the duplicate checking operation is performed based on List+refIdx+MV_x+MV_y. For example, whether one or more reference picture lists to which the motion information 1 points and one or more reference picture lists to which the motion information 2 points are the same (that is, whether the motion information 1/the motion information 2 points to reference picture List0, reference picture List1, or both reference picture List0 and reference picture List1) is first checked, whether a refIdx of the motion information 1 and that of the motion information 2 are the same is checked, and then whether a MV of the motion information 1 and that of the motion information 2 are the same (that is, whether horizontal components are the same, and whether vertical components are the same) is checked.

For example, it is first checked whether one or more reference picture lists to which the motion information 1 points are the same as one or more reference picture lists to which the motion information 2 points. If not, the motion information 1 does not duplicate with the motion information 2. If yes, it is checked whether a refIdx of the motion information 1 is the same as a refIdx of the motion information 2. If not, the motion information 1 does not duplicate with the motion information 2. If yes, it is checked whether a motion vector of the motion information 1 is the same as a motion vector of the motion information 2. If not, the motion information 1 does not duplicate with the motion information 2. If yes, it is determined that the motion information 1 duplicates with the motion information 2.

In an example, if the reference picture list to which the motion information 1 points and the reference picture list to which the motion information 2 points are both reference picture List0, the motion information 1 and the motion information 2 are the same. Or, the reference picture list to which the motion information 1 points and the reference picture list to which the motion information 2 points are both reference picture List1, the motion information 1 and the motion information 2 are the same. Or, if the reference picture list to which the motion information 1 points is reference picture List0, and the reference picture list to which the motion information 2 points is reference picture List1, the motion information 1 and the motion information 2 are different. Or, if the reference picture list to which the motion information 1 points is reference picture List1, and the reference picture list to which the motion information 2 points is reference picture List0, the motion information 1 and the motion information 2 are different. Or, if the reference picture list to which the motion information 1 points is reference picture List0, and the reference picture lists to which the motion information 2 points are reference picture List0 and reference picture List1, the motion information 1 and the motion information 2 are different. Or, if the reference picture list to which the motion information 1 points is reference picture List1, and the reference picture lists to which the motion information 2 points are reference picture List0 and reference picture List1, the motion information 1 and the motion information 2 are different. Or, if the motion information 1 points to a reference picture with a reference picture index refIdx0 in reference picture List0, and points to a reference picture with a reference picture index refIdx1 in reference picture List1, motion information 2 points to a reference picture with a reference picture index refIdx2 in reference picture List0, and points to a reference picture with a reference picture index refIdx3 in reference picture List1, and refIdx0 is not equal to refIdx2, or refIdx1 is not equal to refIdx3, then the motion information 1 and the motion information 2 are different. The above is only examples of comparing reference picture lists, which is not limited herein.

In an example, if the horizontal component of the motion vector of the motion information 1 is the same as the horizontal component of the motion vector of the motion information 2, and the vertical component of the motion vector of the motion information 1 is the same as the vertical component of the motion vector of the motion information 2, it means that the motion vector of the motion information 1 is the same as the motion vector of the motion information 2.

In manner 42, the duplicate checking operation is performed based on POC+MV_x+MV_y.

For example, whether POCs of one or more reference pictures to which the motion information 1 point is the same as POCs of one or more reference pictures to which the motion information 2 points is first checked (for example, even if the POC of a reference picture with a reference picture index refIdx0 in reference picture List0 to which the motion information 1 points is equal to the POC of a reference picture with a reference picture index refIdx1 in reference picture List1 to which the motion information 2 points, it is determined that the motion information 1 and the motion information 2 are the same, which is applicable for duplicate checking for unidirectional motion information and unidirectional motion information, as well as duplicate checking for bidirectional motion information and bidirectional motion information); and then whether a MV of the motion information 1 and that of the motion information 2 are the same (that is, whether horizontal components are the same, and whether vertical components are the same) is checked.

For example, it is first checked whether the POC of a reference picture to which the motion information 1 points is the same as that of a reference picture to which the motion information 2 points. If not, the motion information 1 does not duplicate with the motion information 2. If yes, whether motion vectors of the motion information 1 and the motion information 2 are the same continues to be checked. If not, the motion information 1 does not duplicate with the motion information 2. If yes, it is determined that the motion information 1 duplicates with the motion information 2.

In an example, the POC of the reference picture to which the motion information 1 points being the same as the POC of the reference picture to which the motion information 2 points can include: the motion information 1 points to a reference picture with a reference picture index refIdx0 in reference picture List0, the motion information 2 points to a reference picture with the reference picture index refIdx0 in reference picture List0, and the POC of the reference picture to which the motion information 1 points is the same as that of the reference picture to which the motion information 2 points. Or, the motion information 1 points to a reference picture with a reference picture index refIdx1 in reference picture List1, the motion information 2 points to a reference picture with the reference picture index refIdx1 in reference picture List1, and the POC of the reference picture to which the motion information 1 points is the same as that of the reference picture to which the motion information 2 points. Or, the motion information 1 points to a reference picture with a reference picture index refIdx0 in reference picture List0, the motion information 2 points to a reference picture with a reference picture index refIdx1 in reference picture List1, and the POC of the reference picture to which the motion information 1 points is the same as that of the reference picture to which the motion information 2 points. Or, the motion information 1 points to a reference picture with a reference picture index refIdx1 in reference picture List1, the motion information 2 points to a reference picture with a reference picture index refIdx0 in reference picture List0, and the POC of the reference picture to which the motion information 1 points is the same as that of the reference picture to which the motion information 2 points. Or, the motion information 1 points to a reference picture with a reference picture index refIdx0 in reference picture List0 and points to a reference picture with a reference picture index refIdx1 in reference picture List1, the motion information 2 points to a reference picture with a reference picture index refIdx2 in reference picture List0 and points to a reference picture with a reference picture index refIdx3 in reference picture List1, the POC of the reference picture with the reference picture index refIdx0 in reference picture List0 to which the motion information 1 points is the same as that of the reference picture with the reference picture index refIdx3 in reference picture List1 to which the motion information 2 points, and the POC of the reference picture with the reference picture index refIdx1 in reference picture List1 to which the motion information 1 points is the same as that of the reference picture with the reference picture index refIdx2 in reference picture List0 to which the motion information 2 points. The above is only examples of the same POC of reference pictures, which is not limited herein.

In an example, the above process is to check whether the POCs of the reference pictures are duplicate. It should be noted that the POC of the reference picture is only an example of the duplicate checking operation. In addition to the POC, other attributes that can determine whether reference pictures are the same, such as the DOC of the reference picture, can be adopted, which is not limited. To sum up, the above POC can be replaced by DOC.

To sum up, the motion information candidate list can be obtained, which can also be referred to as AwpUniArray. The following describes the process of obtaining the above motion information candidate list in combination with several specific application scenarios. In subsequent application scenarios, it is assumed that a length of the motion information candidate list (list length) is X, that is, X pieces of available motion information needs to be added. After the available motion information is added to the motion information candidate list, the added motion information is referred to as candidate motion information.

Application scenario 1: the spatial motion information is added to the motion information candidate list. If the list length is equal to X, the adding process is ended. If the list length is less than X, preset motion information is added to the motion information candidate list until the list length is X.

In an example, the available motion information (i.e., spatial motion information) to be added to the motion information candidate list is first determined. For example, the available motion information is determined in the manner 11, or the available motion information is determined in the manner 12, or the available motion information is determined in the manner 13. When the available motion information is determined in the manner 12 or 13, the duplicate checking operation involving the motion information of two spatial neighbouring blocks can be performed in the manner 41 or 42.

In an example, as shown in FIG. 9A, the available motion information is added to the motion information candidate list in the order of the available motion information of F, G, C, A, B, D (the order is variable). For each piece of available motion information, the available motion information can be added to the motion information candidate list in the manner 31, 32 or 33.

In an example, when the available motion information is added to the motion information candidate list in the manner 32 or 33, the duplicate checking operation can also be performed on the unidirectional motion information and the candidate motion information existing in the motion information candidate list. For example, the duplicate checking operation can be performed in the manner 41 or 42.

Application scenario 2: temporal motion information is added to the motion information candidate list. If the list length is equal to X, the adding process is ended. If the list length is less than X, preset motion information is added to the motion information candidate list until the list length is X.

In an example, the available motion information (i.e., temporal motion information) to be added to the motion information candidate list is first determined. For example, the available motion information is determined in the manner 21 or 22.

In an example, for each piece of available motion information, the available motion information can be added to the motion information candidate list in the manner 31, 32 or 33.

In an example, when the available motion information is added to the motion information candidate list in the manner 32 or 33, the duplicate checking operation can also be performed on the unidirectional motion information and the candidate motion information existing in the motion information candidate list. For example, the duplicate checking operation can be performed in the manner 41 or 42.

Application scenario 3: the spatial motion information and the temporal motion information are added to the motion information candidate list (the spatial motion information can be added before the temporal motion information, or the temporal motion information can also be added before the spatial motion information. For the convenience of description, the spatial motion information being added before the temporal motion information is taken as an example later). If the list length is equal to X, the adding process is ended. If the list length is less than X, preset motion information is added to the motion information candidate list until the list length is X.

In an example, the available motion information (i.e., the spatial motion information and the temporal motion information) to be added to the motion information candidate list is determined. For example, the available motion information is determined in the manners 11 and 21, or the available motion information is determined in the manners 11 and 22, or the available motion information is determined in the manners 12 and 21, or the available motion information is determined in the manners 12 and 22, or the available motion information is determined in the manners 13 and 21, or the available motion information is determined in the manners 13 and 22. The above is only examples, which do not constitute a limitation herein.

When the available motion information is determined in the manner 12 or 13, the duplicate checking operation involving motion information of two spatial neighbouring blocks can be performed in the manner 41 or 42.

In an example, as shown in FIG. 9A, the available motion information is added to the motion information candidate list in the order of the available motion information of F, G, C, A, B, D and in the order of temporal motion information (i.e., available motion information). For each piece of available motion information, the available motion information can be added to the motion information candidate list in the manner 31, 32 or 33.

In an example, when the available motion information is added to the motion information candidate list in the manner 32 or 33, the duplicate checking operation can also be performed on the unidirectional motion information and the candidate motion information existing in the motion information candidate list. For example, the duplicate checking operation can be performed in the manner 41 or 42.

To sum up, based on the order of the spatial motion information and the temporal motion information, the spatial motion information and the temporal motion information can be added to the motion information candidate list together until the list length is equal to X. Or, at the end of traversal, if the list length is less than X, preset motion information can be added to the motion information candidate list until the list length is X.

Application scenario 4: after the spatial motion information is added to the motion information candidate list, at least Y positions are reserved for the temporal motion information, which is bidirectional motion information or unidirectional motion information. In an example, spatial motion information is added to the motion information candidate list. If the list length is equal to X-Y, the process of adding spatial motion information is ended, or until the traversal of the spatial motion information is completed, if the list length is less than X-Y, the process of adding spatial motion information is ended. Then, the temporal motion information is added to the motion information candidate list. If the list length is equal to X, the process of adding temporal motion information is ended, or until the traversal of the temporal motion information is completed, if the list length is less than X, the process of adding temporal motion information is ended, and preset motion information is added to the motion information candidate list until the list length is X.

In an example, the available motion information (i.e., the spatial motion information and the temporal motion information) to be added to the motion information candidate list is determined. For example, the available motion information is determined in the manners 11 and 21, or the available motion information is determined in the manners 11 and 22, or the available motion information is determined in the manners 12 and 21, or the available motion information is determined in the manners 12 and 22, or the available motion information is determined in the manners 13 and 21, or the available motion information is determined in the manners 13 and 22. The above is only examples, which do not constitute a limitation herein.

When the available motion information is determined in the manner 12 or 13, the duplicate checking operation involving motion information of two spatial neighbouring blocks can be performed in the manner 41 or 42.

In an example, the available motion information is added to the motion information candidate list in the order of the available motion information (i.e., spatial motion information) of F, G, C, A, B, D until the list length is equal to X-Y or the traversal of the spatial motion information is completed. Then, the temporal motion information (i.e., available motion information) is added to the motion information candidate list until the list length is equal to X or the traversal of the temporal motion information is completed. In the process of adding available motion information, for each piece of available motion information, the available motion information can be added to the motion information candidate list in the manner 31, 32 or 33.

In an example, when the available motion information is added to the motion information candidate list in the manner 32 or 33, the duplicate checking operation can also be performed on the unidirectional motion information and the candidate motion information existing in the motion information candidate list. For example, the duplicate checking operation can be performed in the manner 41 or 42.

In the above application scenarios, X can be any positive integer, for example, X can be 4, 5, etc.

In each of the above application scenarios, preset motion information (also referred to as default motion information) can be added to the motion information candidate list. The implementation of the preset motion information may include, but is not limited to, the following manners.

In manner 51, the preset motion information is zero motion information, such as zero motion vector pointing to reference picture ListX and with a refIdx less than a number of reference pictures in reference picture ListX. For example, 0-padding operation can be performed, that is, the motion information can be (0, 0, ref_idx3, ListZ).

In manner 52: default motion information derived based on candidate motion information existing in the motion information candidate list.

For example, it is denoted that an absolute value of a motion vector in an x-axis direction or a y-axis direction to be zoomed in or out is temp_val, the result includes the following cases.

Case 1: if temp_val<8, result=8, or result=−8.

In an example, if the temp_val of the candidate motion information in the x-axis direction is less than 8, the motion vector of the default motion information in the x-axis direction is 8, or the motion vector of the default motion information in the x-axis direction is −8.

If the temp_val of the candidate motion information in the y-axis direction is less than 8, the motion vector of the default motion information in the y-axis direction is 8, or the motion vector of the default motion information in the y-axis direction is −8.

Case 2. Assuming that case 1 is not satisfied, if temp_val<=64, then result=(temp_val*5+2)>>2 or result=(temp_val*3+2)>>2, with a same sign as the motion vector of the candidate motion information.

In an example, if the motion vector of the candidate motion information in the x-axis direction is positive, and an absolute value of the motion vector in the x-axis direction (i.e., temp_val) is less than or equal to 64, then the motion vector of the default motion information in the x-axis direction is (temp_val*5+2)>>2. If the motion vector of the candidate motion information in the x-axis direction is negative, and the absolute value of the motion vector in the x-axis direction (i.e., temp_val) is less than or equal to 64, then the motion vector of the default motion information in the x-axis direction is (temp_val*3+2)>>2.

The motion vector of the default motion information in the y-axis direction is similar to the motion vector of the default motion information in the x-axis direction.

Case 3. Assuming that cases 1 and 2 are not satisfied, if temp_val<=128, then result=(temp_val*9+4)>>3 or result=(temp_val*7+4)>>3, with a same sign as the motion vector of the candidate motion information.

Case 4. Assuming that cases 1, 2 and 3 are not satisfied, then result=(temp_val*33+16)>>5 or result=(temp_val*31+16)>>5, with a same sign as the motion vector of the candidate motion information.

In manner 53: default motion information derived based on candidate motion information existing in the motion information candidate list.

For example, based on any valid candidate motion information (x, y, ref_idx, ListX) in the motion information candidate list, where ref_idx and ListX are a reference picture index and a reference picture list, respectively, and both are collectively referred to as reference picture information. At least one piece of the following motion information can be added: (x+a, y+b, ref_idx, ListX), where a, b can be any integer; (k1*x, k1*y, ref_idx_new1, ListX), where k1 is any non-zero positive integer, that is, the motion vector is scaled; (k2*x, k2*y, ref_idx_new2, ListY), where k2 is any non-zero positive integer, that is, the motion vector is scaled.

In manner 54: the preset the motion information is candidate motion information existing in the motion information candidate list, that is, when a padding operation is performed, the candidate motion information existing in the motion information candidate list can be used for repeated padding. For example, the last unidirectional motion information existing in the motion information candidate list can be used for repeated padding.

To sum up, when the list length is less than X and the preset motion information needs to be added to the motion information candidate list, the preset motion information in manner 51 can be added to the motion information candidate list until the list length is X. Or, the preset motion information in manner 52 may be added to the motion information candidate list until the list length is X. Or, the preset motion information in manner 53 may be added to the motion information candidate list until the list length is X. Or, the preset motion information in manners 51 and 52 may be added to the motion information candidate list until the list length is X. Or, the preset motion information in manners 51 and 53 may be added to the motion information candidate list until the list length is X. Or, the preset motion information in manners 52 and 53 may be added to the motion information candidate list until the list length is X. Or, the preset motion information in manners 51, 52 and 53 can be added to the motion information candidate list until the list length is X.

In an example, after the preset motion information is added to the motion information candidate list in the above manners, if the list length is still less than X, the preset motion information in manner 54 can be added to the motion information candidate list, that is, the candidate motion information existing in the motion information candidate list is used for repeated padding until the list length is X.

In another possible implementation, when the list length is less than X and the preset motion information needs to be added to the motion information candidate list, the preset motion information in manner 54 can be directly added to the motion information candidate list, that is, the candidate motion information existing in the motion information candidate list is used for repeated padding until the list length is X.

In the above examples, the preset motion information can be unidirectional motion information or bidirectional motion information. If the preset motion information is unidirectional motion information, when the preset motion information is added to the motion information candidate list, the duplicate checking operation can be performed or not. If the duplicate checking operation is not performed, the preset motion information is directly added to the motion information candidate list. If the duplicate checking operation is performed, the duplicate checking operation can be performed in manner 41 or 42. If the result of the duplicate checking operation is not duplicate, the preset motion information is added to the motion information candidate list. If the result of the duplicate checking operation is duplicate, the preset motion information is not added to the motion information candidate list.

Example 15: in examples 1 to 3, after obtaining the motion information candidate list (see examples 13 and 14), the encoding side/the decoding side can obtain first target motion information and second target motion information of the current block based on the motion information candidate list. The obtaining of the first target motion information and the second target motion information can be implemented in the following manners.

In manner 1, one piece of candidate motion information is selected from the motion information candidate list as the first target motion information of the current block, and another piece of candidate motion information is selected from the motion information candidate list as the second target motion information of the current block.

In an example, for both the encoding side and the decoding side, the motion information candidate list can be obtained, and the motion information candidate list at the encoding side is the same as that at the decoding side. There is no limitation on the motion information candidate list herein.

For the encoding side, based on the RDO principle, one piece of candidate motion information can be selected from the motion information candidate list as the first target motion information of the current block, and another piece of candidate motion information can be selected from the motion information candidate list as the second target motion information of the current block. The first target motion information is different from the second target motion information, and there is no limitation on the first target motion information and the second target motion information.

In a possible implementation, when the encoding side sends a coded bit stream to the decoding side, the coded bit stream can carry indication information a and indication information b. The indication information a is used to indicate an index value 1 of the first target motion information of the current block. The index value 1 indicates which candidate motion information in the motion information candidate list the first target motion information is. The indication information b is used to indicate an index value 2 of the second target motion information of the current block. The index value 2 indicates which candidate motion information in the motion information candidate list the second target motion information is. In an example, the index value 1 and the index value 2 can be different.

After receiving the coded bit stream, the decoding side parses the indication information a and indication information b from the coded bit stream. Based on the indication information a, the decoding side selects the candidate motion information corresponding to the index value 1 from the motion information candidate list as the first target motion information of the current block. Based on the indication information b, the decoding side selects the candidate motion information corresponding to the index value 2 from the motion information candidate list as the second target motion information of the current block.

In another possible implementation, when the encoding side sends a coded bit stream to the decoding side, the coded bit stream can carry indication information a and indication information c. The indication information a can be used to indicate an index value 1 of the first target motion information of the current block. The index value 1 indicates which candidate motion information in the motion information candidate list the first target motion information is. The indication information c can be used to indicate a difference between an index value 2 and the index value 1, where the index value 2 indicates which candidate motion information in the motion information candidate list the second target motion information is. In an example, the index value 1 and the index value 2 can be different.

After receiving the coded bit stream, the decoding side can parse the indication information a and indication information c from the coded bit stream. Based on the indication information a, the decoding side can select the candidate motion information corresponding to the index value 1 from the motion information candidate list as the first target motion information of the current block. Based on the indication information c, the decoding side first determines the index value 2 based on the index value 1 and the difference between the index value 2 and the index value 1. Then, the decoding side can select the candidate motion information corresponding to the index value 2 from the motion information candidate list as the second target motion information of the current block.

In an example, the indication information of the first target motion information and the indication information of the second target motion information can be exchanged, as long as the encoding side is consistent with the decoding side. Here, the indication information is exchanged, which does not affect the parsing process, that is, there is no parsing dependency. The indication information of the first target motion information and the indication information of the second target motion information cannot be equal. Assuming that two index values are encoded, the value of an index value a is 1, and the value of an index value b is 3, when the index value a is encoded first, the index value b can be encoded by 2 (i.e., 3–1); when the index value b is encoded first, the index value b needs to be encoded by 3. To sum up, encoding the indication information with a small index value first can reduce the encoding cost of a large index value. For example, the indication information of the first target motion information, such as the index value a, is encoded first, and then the indication information of the second target motion information, such as the index value b, is encoded. Or, the indication information of the second target motion information, such as the index value b, is encoded first, and then the indication information of the first target motion information, such as the index value a, is encoded. For example, assuming that the value of the index value a is 1 and the value of the index value b is 3, the index value a is encoded first and then the index value b is encoded. For another example, assuming that the value of the index value b is 1 and the value of the index value a is 3, the index value b is encoded first and then the index value a is encoded.

In manner 2: candidate motion information is selected from the motion information candidate list as first original motion information of the current block, and candidate motion information is selected from the motion information candidate list as second original motion information of the current block, In an example, the first original motion information and second original motion information can be different, that is, two pieces of different candidate motion information are selected from the motion information candidate list as the first original motion information and the second original motion information. Or, the first original motion information and the second original motion information can also be the same, that is, the same candidate motion information is selected from the motion information candidate list as the first original motion information and the second original motion information. Then, the first target motion information of the current block is determined based on the first original motion information, and the second target motion information of the current block is determined based on the second original motion information. In an example, the first target motion information may be different from the second target motion information.

As to how to determine target motion information based on the original motion information, a solution of Angular Weighted Prediction with Motion Vector Refinement (AWP_MVR) is given in an example. For example, the first original motion information includes a first original motion vector, the first target motion information includes a first target motion vector, the second original motion information includes a second original motion vector, and the second target motion information includes a second target motion vector. On this basis, a first motion vector difference (MVD) corresponding to the first original motion vector can be obtained; and the first target motion vector can be determined based on the first motion vector difference and the first original motion vector (that is, a sum of the first motion vector difference and the first original motion vector is taken as the first target motion vector). A second motion vector difference corresponding to the second original motion vector can be obtained; and the second target motion vector can be determined based on the second motion vector difference and the second original motion vector (that is, a sum of the second motion vector difference and the second original motion vector is taken as the second target motion vector).

In an example, when determining the first target motion vector, the first original motion vector can be determined as the first target motion vector without superimposing the first motion vector difference. However, when determining the second target motion vector, the second motion vector difference can be superimposed, that is, the second target motion vector is determined based on the second motion vector difference and the second original motion vector.

Or, when determining the second target motion vector, the second original motion vector can be determined as the second target motion vector without superimposing the second motion vector difference. However, when determining the first target motion vector, the first motion vector difference can be superimposed, that is, the first target motion vector is determined based on the first motion vector difference and the first original motion vector.

Or, when determining the first target motion vector, the first motion vector difference can be superimposed, that is, the first target motion vector is determined based on the first motion vector difference and the first original motion vector. When determining the second target motion vector, the second motion vector difference can be superimposed, that is, the second target motion vector can be determined based on the second motion vector difference and the second original motion vector.

In an example, direction information and amplitude information of the first motion vector difference can be obtained, and the first motion vector difference can be determined based on the direction information and the amplitude information of the first motion vector difference. And, direction information and amplitude information of the second motion vector difference can be obtained, and the second motion vector difference can be determined based on the direction information and the amplitude information of the second motion vector difference.

In an example, for the decoding side, the direction information of the first motion vector difference can be obtained in the following way: the decoding side parses the direction information of the first motion vector difference from the coded bit stream of the current block; or, the decoding side derives the direction information of the first motion vector difference based on the weight prediction angle of the current block. For the decoding side, the direction information of the second motion vector difference can be obtained in the following way: the decoding side parses the direction information of the second motion vector difference from the coded bit stream of the current block; or, the decoding side derives the direction information of the second motion vector difference based on the weight prediction angle of the current block.

In an example, for the decoding side, the amplitude information of the first motion vector difference can be obtained in the following way: the amplitude information of the first motion vector difference is parsed from the coded bit stream of the current block. The amplitude information of the second motion vector difference can be obtained in the following way: the amplitude information of the second motion vector difference is parsed from the coded bit stream of the current block.

In a possible implementation, the encoding side and the decoding side can agree on the direction information and the amplitude information of the motion vector difference. If the direction information indicates a rightward direction, and the amplitude information indicates an amplitude of A, then the motion vector difference is (A, 0). If the direction information indicates a downward direction, and the amplitude information indicates an amplitude of A, then the motion vector difference is (0, −A). If the direction information indicates a leftward direction, and the amplitude information indicates an amplitude of A, then the motion vector difference is (−A, 0). If the direction information indicates an upward direction, and the amplitude information indicates an amplitude of A, then the motion vector difference is (0, A). If the direction information indicates a right-upward direction, and the amplitude information indicates an amplitude of A, then the motion vector difference is (A, A). If the direction information indicates a left-upward direction, and the amplitude information indicates an amplitude of A, then the motion vector difference is (−A, A). If the direction information indicates a left-downward direction, and the amplitude information indicates an amplitude of A, then the motion vector difference is (−A, −A). If the direction information indicates a right-downward direction, and the amplitude information indicates an amplitude of A, then the motion vector difference is (A, −A). The above is only examples, and the direction information and amplitude information are not limited herein.

In an example, the motion vector difference can support part or all of the above direction information, and the range of the amplitude A supported by the motion vector difference is configured based on experience, with at least one value, which is not limited herein. For example, motion vector difference supports directions such as upward, downward, leftward, rightward, and motion vector difference supports the following five step configurations: ¼-pel, ½-pel, 1-pel, 2-pel, 4-pel, that is, the value of amplitude A is 1, 2, 4, 8, 16. To sum up, when the direction is upward, the motion vector difference can be (0, 1), (0, 2), (0, 4), (0, 8), (0, 16). When the direction is downward, the motion vector difference can be (0, −1), (0, −2), (0, −4), (0, −8), (0, −16). When the direction is leftward, the motion vector difference can be (−1, 0), (−2, 0), (−4, 0), (−8, 0), (−16, 0). When the direction is rightward, the motion vector difference can be (1, 0), (2, 0), (4, 0), (8, 0), (16, 0).

In another example, motion vector difference supports directions such as upward, downward, leftward, rightward, and motion vector difference supports the following six step configurations: ¼-pel, ½-pel, 1-pel, 2-pel, 3-pel, 4-pel, that is, the value of amplitude A can be 1, 2, 4, 8, 12, 16.

In another example, the motion vector difference supports eight directions including upward, downward, leftward, rightward, left-upward, left-downward, right-upward and right-downward, and the motion vector difference supports the following three step configurations: ¼-pel, ½-pel, 1-pel, that is, the value of amplitude A can be 1, 2, 4.

For example, the motion vector difference supports four directions including upward, downward, leftward, and rightward, and the motion vector difference supports the following four step configurations: ¼-pel, ½-pel, 1-pel, 2-pel, that is, the value of amplitude A can be 1, 2, 4, 8.

The above is only examples, which do not constitute a limitation herein. For example, the direction supported by the motion vector difference can be arbitrarily selected. For example, the motion vector difference can support six directions including upward, downward, leftward, rightward, left-upward and left-downward, or the motion vector difference can support two directions including up and down. For another example, the step configuration supported by motion vector difference can be set flexibly. For another example, the step configuration can be adaptively configured based on coding parameters such as a quantization parameter QP, such as 1-pel, 2-pel, 4-pel and 8-pel for a large QP, and ¼-pel, ½-Pel, 1-pel, 2-pel for a small QP. For another example, appropriate step configuration can be set at the sequence level, picture level, frame level, Slice level, Tile level, Patch level, CTU level, etc., so that the decoding side can perform decoding operation based on the step configuration parsed at the sequence level, picture level, frame level, Slice level, Tile level, Patch level and CTU level.

For the convenience of description, in subsequent examples, it is assumed that the motion vector difference supports directions including up and down, and supports step configurations including 1-pel, 2-pel, according to ¼-pel precision, the motion vector difference can be (0, 4), (0, 8), (0, −4), (0, −8), that is, (0, 1<<2), (0, 1<<3), (0, −1<<2), (0, −1<<3).

For the encoding side, after obtaining the motion information candidate list, each candidate motion information combination in the motion information candidate list is traversed in turn. The candidate motion information combination includes two pieces of candidate motion information, one of which is taken as the first original motion information, and the other of which is taken as the second original motion information. It should be noted that the first original motion information and the second original motion information can be the same (that is, the two pieces of candidate motion information selected from the motion information candidate list are the same) or different. If the first original motion information is the same as the second original motion information, it can be ensured that the first target motion information and the second target motion information are different by superimposing different motion vector differences. For each candidate motion information combination, the motion vector difference combination is traversed in turn. The motion vector difference combination includes the first motion vector difference and the second motion vector difference. The first motion vector difference and the second motion vector difference can be the same or different. For example, there are two motion vector differences, namely, motion vector difference 1 and motion vector difference 2. Motion vector difference combination 1 includes the motion vector difference 1 and the motion vector difference 1. Motion vector difference combination 2 includes the motion vector difference 1 (i.e., the first motion vector difference) and the motion vector difference 2. Motion vector difference combination 3 includes the motion vector difference 2 (i.e., the first motion vector difference) and the motion vector difference 1. Motion vector difference combination 4 includes the motion vector difference 2 and the motion vector difference 2.

In an example, for the candidate motion information combination and motion vector difference combination currently traversed, if the first original motion information is different from the second original motion information, the first motion vector difference and the second motion vector difference can be the same or different. If the first original motion information is the same as the second original motion information, the first motion vector difference and the second motion vector difference can be different.

For the candidate motion information combination and the motion vector difference combination currently traversed, the sum of the motion vector of the first original motion information and the first motion vector difference is taken as the first target motion vector, the sum of the motion vector of the second original motion information and the second motion vector difference is taken as the second target motion vector, and the RDO cost value is determined based on the first target motion vector and the second target motion vector. There is no limitation on the determination method. The above processing is performed for each candidate motion information combination and each motion vector difference combination, and the RDO cost value is obtained. Then, a minimum RDO cost value is selected from all RDO cost values, and information of the candidate motion information combination (the first original motion information and the second original motion information) and information of the motion vector difference combination (the first motion vector difference and the second motion vector difference) corresponding to the minimum RDO cost value are encoded in a coded bit stream of the current block.

For example, an index value of the first original motion information corresponding to the minimum RDO value in the motion information candidate list, an index value of the second original motion information corresponding to the minimum RDO value in the motion information candidate list, direction information and amplitude information of the first motion vector difference corresponding to the minimum RDO value, and direction information and amplitude information of the second motion vector difference corresponding to the minimum RDO value are encoded in the coded bit stream of the current block. For example, for the direction information of the first motion vector difference or the direction information of the second motion vector difference, indication information of the direction information may be 0, which is used indicate a first direction in a direction list. For the amplitude information of the first motion vector difference or the amplitude information of the second motion vector difference, indication information of the amplitude information can be 0, indicating a first step configuration in a step configuration list.

In an example, if motion vector difference supports four directions including upward, downward, leftward and rightward, and motion vector difference supports five steps configurations including ¼-pel, ½-pel, 1-pel, 2-pel and 4-pel, direction information of the motion vector difference can be encoded by using 2 bins fixed-length code (four values in total). The four values of the 2 bins fixed-length code respectively indicate directions: upward, downward, leftward and rightward. The amplitude information of motion vector difference can be encoded by using truncated unary code, that is, five step configurations are indicated by the truncated unary code.

For another example, if the motion vector difference supports four directions including upward, downward, leftward and rightward, and the motion vector difference supports six step configurations including ¼-pel, ½-pel, 1-pel, 2-pel, 3-pel and 4-pel, the direction information of the motion vector difference can be encoded by using 2 bins fixed-length code (four values in total), and the amplitude information of the motion vector difference can be encoded by using truncated unary code.

For another example, if the motion vector difference supports eight directions including upward, downward, leftward, rightward, left-upward, left-downward, right-upward and right-downward, and the motion vector difference supports three step configurations including ¼-pel, ½-pel, 1-pel, the direction information of the motion vector difference can be encoded by using 3 bins fixed-length code (eight values in total), and the amplitude information of the motion vector difference can be encoded by using truncated unary code.

For another example, if the motion vector difference supports four directions including upward, downward, leftward and rightward, and the motion vector difference supports four step configurations including ¼-pel, ½-pel, 1-pel and 2-pel, based on this, the direction information of the motion vector difference can be encoded by using truncated unary code, and the amplitude information of motion vector difference can be encoded by using 2 bins fixed-length code (four values in total).

The above is only examples of encoding methods, and there is no limitation on the encoding method.

To sum up, the encoding side may search an optimal motion vector (i.e., the target motion vector) within a certain area and then take a difference between the optimal motion vector and an original motion vector as a Motion Vector Difference (MVD), and encode the amplitude information and the direction information of the motion vector difference into a bit stream. When the encoding side searches for the optimal motion vector within a certain area, the direction and the amplitude of the motion vector difference need to be agreed on, that is, the optimal motion vector is searched within limited ranges of the motion vector difference, such as (A, 0), (0, −A), (−A, 0), (0, A), (A, A), (−A, A), (−A, −A), (A, −A).

After receiving the coded bit stream of the current block, the decoding side can parse the index value of the first original motion information in the motion information candidate list from the coded bit stream, select the candidate motion information corresponding to the index value from the motion information candidate list, and take the candidate motion information as the first original motion information of the current block. The decoding side can parse the index value of the second original motion information in the motion information candidate list from the coded bit stream, select the candidate motion information corresponding to the index value from the motion information candidate list, and take the candidate motion information as the second original motion information of the current block.

The decoding side can also parse the direction information and the amplitude information of the first motion vector difference from the coded bit stream, and determine the first motion vector difference based on the direction information and the amplitude information. And, the decoding side can parse the direction information and the amplitude information of the second motion vector difference from the coded bit stream, and determine the second motion vector difference based on the direction information and the amplitude information.

Then, the decoding side can determine the first target motion information of the current block based on the first motion vector difference and the first original motion information, and determine the second target motion information of the current block based on the second motion vector difference and the second original motion information.

In an example, when determining the first motion vector difference based on the direction information of the first motion vector difference and the amplitude information of the first motion vector difference, if the direction information of the first motion vector difference indicates a rightward direction, and the amplitude information of the first motion vector difference indicates an amplitude of A, then the first motion vector difference is (A, 0); if the direction information of the first motion vector difference indicates a downward direction, and the amplitude information of the first motion vector difference indicates an amplitude of A, then the first motion vector difference is (0, −A); if the direction information of the first motion vector difference indicates a leftward direction, and the amplitude information of the first motion vector difference indicates an amplitude of A, then the first motion vector difference is (−A, 0); if the direction information of the first motion vector difference indicates an upward direction, and the amplitude information of the first motion vector difference indicates an amplitude of A, then the first motion vector difference is (0, A). When determining the second motion vector difference based on the direction information of the second motion vector difference and the amplitude information of the second motion vector difference, if the direction information of the second motion vector difference indicates a rightward direction, and the amplitude information of the second motion vector difference indicates an amplitude of A, then the second motion vector difference is (A, 0); if the direction information of the second motion vector difference indicates a downward direction, and the amplitude information of the second motion vector difference indicates an amplitude of A, then the second motion vector difference is (0, −A); if the direction information of the second motion vector difference indicates a leftward direction, and the amplitude information of the second motion vector difference indicates an amplitude of A, then the second motion vector difference is (−A, 0); if the direction information of the second motion vector difference indicates an upward direction, and the amplitude information of the second motion vector difference indicates an amplitude of A, then the second motion vector difference is (0, A).

Referring to the above examples, when encoding the direction information of the motion vector difference, the encoding side can adopt fixed-length code, truncated unary code, etc. Therefore, the decoding side can use the fixed-length code, the truncated unary code, etc. to decode the direction information of the motion vector difference, so as to obtain the direction information of the motion vector difference, such as upward, downward, leftward, rightward, left-upward, left-downward, right-upward, right-downward, etc.

Referring to the above examples, when encoding the amplitude information of motion vector difference, the encoding side can adopt fixed-length code, truncated unary code, etc. Therefore, the decoding side can use the fixed-length code, the truncated unary code, etc. to decode the amplitude information of motion vector difference, so as to obtain the amplitude information of motion vector difference, such as ¼-pel, ½-pel, 1-pel, 2-pel and other step configurations, and the value of amplitude A of motion vector difference is determined based on step configurations such as ¼-pel, ½-pel, 1-pel, 2-pel.

In a possible implementation, the encoding side can also encode a first sub-mode flag and a second sub-mode flag of an enhanced angular weighted prediction mode in the coded bit stream. The first sub-mode flag indicates that the first original motion information is superimposed with a motion vector difference, or that the first original motion information is not superimposed with a motion vector difference. The second sub-mode flag indicates that the second original motion information is superimposed with a motion vector difference, or that the second original motion information is not superimposed with a motion vector difference.

After receiving the coded bit stream of the current block, the decoding side can first parse the first sub-mode flag and the second sub-mode flag of the enhanced angular weighted prediction mode from the coded bit stream of the current block. If the first sub-mode flag indicates that the first original motion information is superimposed with a motion vector difference, the direction information and the amplitude information of the first motion vector difference are parsed from the coded bit stream of the current block, the first motion vector difference is determined based on the direction information and the amplitude information of the first motion vector difference, and then the first target motion information of the current block is determined based on the first original motion information and the first motion vector difference. If the first sub-mode flag indicates that the first original motion information is not superimposed with a motion vector difference, the direction information and the amplitude information of the first motion vector difference will not be parsed, and the first original motion information can be directly used as the first target motion information of the current block. If the second sub-mode flag indicates that the second original motion information is superimposed with a motion vector difference, the direction information and the amplitude information of the second motion vector difference are parsed from the coded bit stream of the current block, and the second motion vector difference is determined based on the direction information and the amplitude information of the second motion vector difference, and then the second target motion information of the current block is determined based on the second original motion information and the second motion vector difference. If the second sub-mode flag indicates that the second original motion information is not superimposed with a motion vector difference, the direction information and the amplitude information of the second motion vector difference will not be parsed, and the second original motion information can be directly used as the second target motion information of the current block.

In an example, when the first sub-mode flag of the enhanced angular weighted prediction mode is a first value, it indicates that the first original motion information is superimposed with a motion vector difference. When the first sub-mode flag of the enhanced angular weighted prediction mode is a second value, it indicates that the first original motion information is not superimposed with a motion vector difference. When the second sub-mode flag of the enhanced angular weighted prediction mode is a first value, it indicates that the second original motion information is superimposed with a motion vector difference. When the second sub-mode flag of the enhanced angular weighted prediction mode is a second value, it indicates that the second original motion information is not superimposed with a motion vector difference. The first value and the second value can be set based on experience, for example, the first value is 1 and the second value is 0, or the first value is 0 and the second value is 1.

In the above examples, the decoding side parses the direction information of the first motion vector difference and the direction information of the second motion vector difference from the coded bit stream of the current block. In practical applications, the direction information of the first motion vector difference can also be derived based on the weight prediction angle of the current block, and the direction information of the second motion vector difference can also be derived based on the weight prediction angle of the current block.

For example, the weight prediction angle of the current block represents an angular direction, and eight angular directions shown in FIG. 6 can be referred. The weight prediction angle of the current block represents one of the eight angular directions. The decoding side can select direction information matching the angular direction from all direction information (such as upward, downward, leftward, rightward, left-upward, left-downward, right-upward, right-downward), and directly take the direction information as the direction information of the first motion vector difference and the direction information of the second motion vector difference.

The direction information matching the angular direction can be such: an angle difference between the direction information and the angular direction is a preset angle or close to the preset angle; or, a difference between an angle difference and a present angle is the smallest among all direction information, where the angle difference is a difference between the direction information and the angular direction. The preset angle can be set according to experience, for example, the preset angle can be 90 degrees.

In an example, the encoding side can also derive the direction information of the first motion vector difference based on the weight prediction angle of the current block, and can derive the direction information of the second motion vector difference based on the weight prediction angle of the current block, without determining the direction information of the first motion vector difference and the direction information of the second motion vector difference by using the RDO value. When sending the coded bit stream of the current block to the decoding side, the encoding side may not encode the direction information of the first motion vector difference and the direction information of the second motion vector difference, and the decoding side may derive the direction information of the first motion vector difference and the direction information of the second motion vector difference.

Example 16: in example 15, the decoding side can parse the amplitude information of the first motion vector difference and the amplitude information of the second motion vector difference from the coded bit stream. In a possible implementation, the encoding side and the decoding side can establish a same motion vector difference amplitude list. The encoding side determines an amplitude index of the amplitude information of the first motion vector difference in the motion vector difference amplitude list, and the coded bit stream includes the amplitude index of the first motion vector difference. The decoding side parses the amplitude index of the first motion vector difference from the coded bit stream of the current block, and selects amplitude information corresponding to the amplitude index from the motion vector difference amplitude list. The amplitude information is amplitude information of the first motion vector difference. The encoding side determines an amplitude index of the amplitude information of the second motion vector difference in the motion vector difference amplitude list, and the coded bit stream includes the amplitude index of the second motion vector difference. The decoding side parses the amplitude index of the second motion vector difference from the coded bit stream of the current block, and selects amplitude information corresponding to the amplitude index from the motion vector difference amplitude list. The amplitude information is amplitude information of the second motion vector difference.

In another possible implementation, the encoding side and the decoding side can establish same at least two motion vector difference amplitude lists. For example, the encoding side and the decoding side establish a same motion vector difference amplitude list 1, and establish a same motion vector difference amplitude list 2. Based on indication information of the motion vector difference amplitude list, the encoding side selects a target motion vector difference amplitude list from all motion vector difference amplitude lists. The encoding side determines an amplitude index of the amplitude information of the first motion vector difference in the target motion vector difference amplitude list, and the coded bit stream includes the amplitude index of the first motion vector difference.

The encoding side can also determine an amplitude index of the amplitude information of the second motion vector difference in the target motion vector difference amplitude list, and the coded bit stream can include the amplitude index of the second motion vector difference. The decoding side can parse the amplitude index of the second motion vector difference from the coded bit stream of the current block, and select amplitude information corresponding to the amplitude index from the target motion vector difference amplitude list. The amplitude information is amplitude information of the second motion vector difference.

In an example, the indication information of the motion vector difference amplitude list can be any level indication information, such as sequence level indication information of the motion vector difference amplitude list, picture level indication information of the motion vector difference amplitude list, Slice level indication information of the motion vector difference amplitude list, Tile level indication information of the motion vector difference amplitude list, Patch level indication information of the motion vector difference amplitude list, CTU level indication information of the motion vector difference amplitude list, LCU level indication information of the motion vector difference amplitude list, block level indication information of the motion vector difference amplitude list, CU level indication information of the motion vector difference amplitude list, PU level indication information of the motion vector difference amplitude list, which is not limited herein. For convenience of description, the picture level indication information of the motion vector difference amplitude list is taken as an example, the picture level indication information of the motion vector difference amplitude list can be awp_umve_offset_list_flag, and the switching of the motion vector difference amplitude list is controlled by awp_umve_offset_list_flag.

For example, the encoding side and the decoding side can establish a motion vector difference amplitude list 1 and a motion vector difference amplitude list 2, as shown in Table 3 and Table 4. Binarization processing can be performed on the motion vector difference amplitude list 1, and binarization processing can be performed on the motion vector difference amplitude list 2. There is no limit to this processing method. For example, truncated unary code is used for the motion vector difference amplitude list 1, and truncated unary code is used for the motion vector difference amplitude list 2; or truncated unary code is used for the motion vector difference amplitude list 1, and fixed-length code is used for the motion vector difference amplitude list 2; or fixed-length code is used for the motion vector difference amplitude list 1, and truncated unary code is used for the motion vector difference amplitude list 2, which is not limited, as shown in Table 5 and Table 6.

TABLE 3

| Amplitude of MVD (pixel) | ¼ | ½ | 1 | 2 | 4 |
|---|---|---|---|---|---|

TABLE 4

| Amplitude of MVD (pixel) | ¼ | ½ | 1 | 2 | 4 | 8 | 16 | 32 |
|---|---|---|---|---|---|---|---|---|

77

TABLE 5

| Amplitude of MVD (pixel) | ¼ | ½ | 1 | 2 | 4 |
|---|---|---|---|---|---|
| Binarization | 1 | 01 | 001 | 0001 | 0000 |

TABLE 6

| | Amplitude of MVD (pixel) | | | | | | |
|---|---|---|---|---|---|---|---|
| ¼ | ½ | 1 | 2 | 4 | 8 | 16 | 32 |
| Binarization | | | | | | | |
| 000 | 001 | 011 | 010 | 10 | 110 | 1110 | 1111 |

In the above application scenario, the switching of the motion vector difference amplitude list is controlled by awp_umve_offset_list_flag, that is, it is controlled to adopt the motion vector difference amplitude list shown in Table 3 or the motion vector difference amplitude list shown in Table 4. For example, if awp_umve_offset_list_flag is a first value, then the motion vector difference amplitude list shown in Table 3 is the target motion vector difference amplitude list; if awp_umve_offset_list_flag is a second value, then the motion vector difference amplitude list shown in Table 4 is the target motion vector difference amplitude list. Or, if awp_umve_offset_list_flag is the second value, then the motion vector difference amplitude list shown in Table 3 is the target motion vector difference amplitude list; if awp_umve_offset_list_flag is the first value, then the motion vector difference amplitude list shown in Table 4 is the target motion vector difference amplitude list.

When the target motion vector difference amplitude list is shown in Table 3, the encoding side uses the binarization manner shown in Table 5 for encoding, and the decoding side uses the binarization manner shown in Table 5 for decoding. When the target motion vector difference amplitude list is shown in Table 4, the encoding side uses the binarization manner shown in Table 6 for encoding, and the decoding side uses the binarization manner shown in Table 6 for decoding.

Example 17: on the basis of example 15 or 16, for the first motion vector difference and the second motion vector difference, relevant syntax for Angular Weighted Prediction with Motion Vector Refinement (AWP_MVR) will be described as below in combination with specific application scenarios.

Application Scenario 1: Table 7 shows an example of relevant syntax, where SkipFlag represents whether a current block is in a Skip mode, DirectFlag represents whether the current block is in a Direct mode, and AwpFlag represents whether the current block is in an AWP mode.

awp_idx (an index of an angular weighted prediction mode) is an index value of the angular weighted prediction mode in the skip mode or the direct mode, and a value of AwpIdx may be equal to a value of awp_idx. If there is no awp_idx in a bit stream, the value of AwpIdx is equal to 0.

awp_cand_idx0 (an index of first motion information of the angular weighted prediction mode) is an index value of the first motion information of the angular weighted prediction mode in the skip mode or the direct mode. A value of AwpCandIdx0 is equal to a value of awp_cand_idx0. If there is no awp_cand_idx0 in the bit stream, the value of AwpCandIdx0 is equal to 0.

awp_cand_idx1 (an index of second motion information of the angular weighted prediction mode) is an index value of the second motion information of the angular weighted prediction mode in the skip mode or the direct mode. A value of AwpCandIdx1 is equal to a value of awp_cand_idx1. If there is no awp_cand_idx1 in the bit stream, the value of AwpCandIdx1 is equal to 0.

awp_mvd_flag (a flag of an enhanced angular weighted prediction mode) can be a binary variable. When awp_mvd_flag is a first value (e.g., 1), it indicates that the current block is in the enhanced angular weighted prediction mode; when awp_mvd_flag is a second value (e.g., 0), it indicates that the current block is in a non-enhanced angular weighted prediction mode. In an example, a value of AwpMvdFlag may be equal to the value of awp_mvd_flag. If there is no awp_mvd_flag in the bit stream, the value of AwpMvdFlag is equal to 0.

awp_mvd_sub_flag0 (a first sub-mode flag of the enhanced angular weighted prediction mode) can be a binary variable. When awp_mvd_sub_flag0 is a first value, it indicates that the first motion information of the enhanced angular weighted prediction mode is to be superimposed with a motion information difference; when awp_mvd_sub_flag0 is a second value, it indicates that the first motion information of the enhanced angular weighted prediction mode is not to be superimposed with the motion information difference. In an example, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) can be a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. In an example, a value of AwpMvdSubFlag1 may be equal to the value of awp_mvd_sub_flag1. If there is no awp_mvd_sub_flag1 in the bit stream, there may be the following case: if AwpMvdFlag is equal to 1, the value of AwpMvdSubFlag1 is equal to 1, and otherwise, the value of AwpMvdSubFlag1 may be 0.

awp_mvd_dir0 (a direction index value of the motion vector difference of the first motion information) is a direction index value of the motion vector difference of the first motion information of the enhanced angular weighted prediction mode. In an example, a value of AwpMvdDir0 may be equal to a value of awp_mvd_dir0. If there is no awp_mvd_dir0 in the bit stream, the value of AwpMvdDir0 may be equal to 0.

awp_mvd_step0 (a step index value of the motion vector difference of the first motion information) is a step index value of the motion vector difference of the first motion information of the enhanced angular weighted prediction mode. In an example, a value of AwpMvdStep0 may be equal to a value of awp_mvd_step0. If there is no awp_mvd_step0 in the bit stream, the value of AwpMvdStep0 may be equal to 0.

awp_mvd_dir1 (a direction index value of the motion vector difference of the second motion information) is a direction index value of the motion vector difference of the second motion information of the enhanced angular weighted prediction mode. In an example, a value of AwpMvdDir1 may be equal to a value of awp_mvd_dir1. If there is no awp_mvd_dir1 in the bit stream, the value of AwpMvdDir1 may be equal to 0.

awp_mvd_step1 (a step index value of the motion vector difference of the second motion information) is a step index value of the motion vector difference of the second motion information of the enhanced angular weighted prediction mode. In an example, a value of AwpMvdStep1 may be equal to a value of awp_mvd_step1. If there is no awp_mvd_step1 in the bit stream, the value of AwpMvdStep1 may be equal to 0.

TABLE 7

| | Descriptor |
|---|---|
| Definition of a coding unit | |
| ... | |
| if ((SkipFlag \|\| DirectFlag) &&AwpFlag) { | |
| awp_idx | ae(v) |
| awp_cand idx0 | ae(v) |
| awp_cand_idx1 | ae(v) |
| awp_mvd_flag | ae(v) |
| if (AwpMvdFlag) { | |
| awp_mvd_sub_flag0 | ae(v) |
| if (AwpMvdSubFlag0) { | |
| awp-mvd_dir0 | ae(v) |
| awp_mvd_step0 | ae(v) |
| awp_mvd_sub_flag1 | ae(v) |
| } | |
| if (AwpMvdSubFlag1) { | |
| awp_mvd_dir1 | ae(v) |
| awp_mvd_step1 | ae(v) |
| } | |
| } | |
| } | |
| ... | |

Application Scenario 2: Table 8 shows an example of relevant syntax, where SkipFlag represents whether the current block is in a Skip mode, DirectFlag represents whether the current block is in a Direct mode, and AwpFlag represents whether the current block is in an AWP mode.

For awp_idx, awp_cand_idx0 and awp_cand_idx1, reference may be made to the application scenario 1, and no redundant descriptions are made herein.

awp_mvd_sub_flag0 (a first sub-mode flag of an enhanced angular weighted prediction mode) can be a binary variable. When awp_mvd_sub_flag0 is a first value, it indicates that first motion information of the enhanced angular weighted prediction mode is to be superimposed with a motion information difference; when awp_mvd_sub_flag0 is a second value, it indicates that the first motion information of the enhanced angular weighted prediction mode is not to be superimposed with the motion information difference. In an example, a value of AwpMvdSubFlag0 may be equal to the value of awp_mvd_sub_flag0. If there is no awp_mvd_sub_flag0 in the bit stream, the value of AwpMvdSubFlag0 is equal to 0.

awp_mvd_sub_flag1 (a second sub-mode flag of the enhanced angular weighted prediction mode) can be a binary variable. When awp_mvd_sub_flag1 is a first value, it indicates that the second motion information of the enhanced angular weighted prediction mode is to be superimposed with the motion information difference; when awp_mvd_sub_flag1 is a second value, it indicates that the second motion information of the enhanced angular weighted prediction mode is not to be superimposed with the motion information difference. In an example, a value of AwpMvdSubFlag1 may be equal to the value of awp_mvd_sub_flag1. If there is no awp_mvd_sub_flag1 in the bit stream, the value of AwpMvdSubFlag1 may be equal to 0.

For awp_mvd_dir0, awp_mvd_step0, awp_mvd_dir1 and awp_mvd_step1, reference may be made to the application scenario 1.

TABLE 8

| | Descriptor |
|---|---|
| Definition of a coding unit | |
| ... | |
| if ((SkipFlag \|\| DirectFlag) &&AwpFlag) { | |
| awp_idx | ae(v) |
| awp cand idx0 | ae(v) |
| awp_cand_idx1 | ae(v) |
| awp_mvd_sub_flag0 | ae(v) |
| if (AwpMvdSubFlag0) { | |
| awp_mvd_dir0 | ae(v) |
| awp_mvd_step0 | ae(v) |
| } | |
| awp_mvd_sub_flag1 | ae(v) |
| if (AwpMvdSubFlag1) { | |
| awp_mvd_dir1 | ae(v) |
| awp_mvd_step1 | ae(v) |
| } | |
| } | |
| ... | |

In an example, the difference between the application scenario 1 and the application scenario 2 includes: in the application scenario 1, syntax awp_mvd_flag is present, but in the application scenario 2, syntax awp_mvd_flag is not present. In the application scenario 1, the enhanced angular weighted prediction mode can be controlled through awp_mvd_flag, that is, the enhanced angular weighted prediction mode is controlled by a master switch.

Application scenario 3: derivation can be made for the application scenarios 1 and 2 to merge the AWP mode and the AWP_MVR mode, that is, 0 span is added to the span without encoding a flag bit to be enabled or not. For example, the motion vector difference supports directions including upward, downward, leftward and rightward, and the motion vector difference supports the following step configurations: 0-pel, ¼-pel, ½-pel, 1-pel, 2-pel, 4-pel, that is, one step configuration 0-pel is added. On this basis, Table 7 or 8 may be updated to Table 9, and reference may be made to Table 7 for the relevant syntax.

TABLE 9

| | Descriptor |
|---|---|
| Definition of a coding unit | |
| ... | |
| if ((SkipFlag \|\| DirectFlag) &&AwpFlag) { | |
| awp_idx | ae(v) |
| awp_cand_idx0 | ae(v) |
| awp_cand idx1 | ae(v) |
| awp_mvd_step0 | ae(v) |
| if (AwpMvdStep0 != 0) | |
| awp_mvd_dir0 | ae(v) |
| awp_mvd_step1 | ae(v) |
| if (AwpMvdStep1 != 0) | |
| awp_mvd_dir1 | ae(v) |
| } | |
| ... | |

In an example, for each application scenario, the order of syntax elements in the relevant syntax can be adjusted accordingly. For example, for the relevant syntax shown in Table 8, the order of syntax elements can be adjusted accordingly to obtain the relevant syntax shown in Table 10.

TABLE 10

| | Descriptor |
|---|---|
| Definition of a coding unit | |
| ... | |
| if ((SkipFlag \|\| DirectFlag) &&AwpFlag) { | |

TABLE 10-continued

|  | Descriptor |
| --- | --- |
| awp_idx | ae(v) |
| awp_mvd_sub_flag0 | ae(v) |
| if (AwpMvdSubFlag0) { |  |
|    awp_mvd_dir0 | ae(v) |
|    awp_mvd_step0 | ae(v) |
| } |  |
| awp_mvd_sub_flag1 | ae(v) |
| if (AwpMvdSubFlag1) { |  |
| awp_mvd dir1 | ae(v) |
| awp_mvd_step1 | ae(v) |
| } |  |
| awp_cand_idx0 | ae(v) |
| awp_cand_idx1 | ae(v) |
| } |  |
| ... |  |

From Table 8 and Table 10, it can be seen that the order of awp_cand_idx0 and awp_cand_idx1 can be adjusted. For example, in Table 10, parsing manners of awp_cand_idx0 and awp_cand_idx1 can be adjusted based on values of one or more of AwpMvdSubFlag0, AwpMvdSubFlag1, AwpMvdDir0, AwpMvdStep0, AwpMvdDir1 and AwpMvd-Step1. For example, when at least one of AwpMvdSubFlag0 and AwpMvdSubFlag1 is 1, the parsing methods of awp_ cand_idx0 awp_cand_idx1 are completely consistent, otherwise, the parsing methods are inconsistent.

In an example, AwpMvdSubFlag0 indicates whether the first original motion information is superimposed with a MVD. If yes, a MVD value corresponding to the first original motion information is determined based on AwpMvdDir0 and AwpMvdStep0. AwpMvdSubFlag1 indicates whether the second original motion information is superimposed with a MVD. If yes, a MVD corresponding to the second original motion information is determined based on AwpMvdDir1 and AwpMvdStep1. Obviously, if one of the first original motion information and the second original motion information is superimposed with a MVD, and the other is not superimposed with a MVD, or MVD values superimposed by the first original motion information and the second original motion information are different, the first original motion information and the second original motion information are allowed to be the same. Awp_cand_idx0 represents an index value of the first original motion information, and awp_cand_idx1 represents an index value of the second original motion information, so the parsing manners of awp_cand_idx0 and awp_cand_idx1 are completely consistent. That is, the first original motion information corresponding to awp_cand_idx0 is parsed from a complete motion information candidate list, and the second original motion information corresponding to awp_cand_idx1 is parsed from the complete motion information candidate list.

If neither of the first original motion information and the second original motion information is superimposed with a MVD, or the first original motion information and the second original motion information are superimposed with a same MVD, the first original motion information and the second original motion information are different. Based on this, the parsing manners of awp_cand_idx0 and awp_can-d_idx1 are inconsistent. The first original motion information corresponding to awp_cand_idx0 is parsed from the complete motion information candidate list. Since the second original motion information is different from the first original motion information, instead of parsing the second original motion information corresponding to awp_can-d_idx1 from the complete motion information candidate list, but on the basis of excluding the first original motion information, the second original motion information corresponding to awp_cand_idx1 is parsed from an incomplete motion information candidate list.

Based on a motion information candidate list AwpUniArray, two pieces of candidate motion information are selected from AwpUniArray, and first target motion information and second target motion information of the current block are determined based on the two pieces of candidate motion information. For example, the decoding side parses Awp-CandIdx0 and AwpCandIdx1 from a coded bit stream, and assigns the (AwpCandIdx0+1)-th piece of motion information in AwpUniArray to mvAwp0L0, mvAwp0L1, RefIdxAwp0L0 and RefIdxAwp0L1. The (AwpCandIdx1+1)-th piece of motion information in AwpUniArray is assigned to mvAwp1L0, mvAwp1L1, RefIdxAwp1L0 and RefIdxAwp1L1. The (AwpCandIdx0+1)-th piece of motion information in AwpUniArray can also be assigned to mvAwp1L0, mvAwp1L1, RefIdxAwp1L0 and RefIdxAwp1L1, and the (AwpCandIdx1+1)-th piece of motion information in AwpUniArray can be assigned to mvAwp0L0, mvAwp0L1, RefIdxAwp0L0 and RefIdxAwp0L1.

AwpCandIdx0 represents an index value of the first target motion information. Therefore, the (AwpCandIdx0+1)-th piece of motion information in AwpUniArray can be assigned to the first target motion information. For example, if AwpCandIdx0 is 0, a first piece of motion information in AwpUniArray is assigned to the first target motion information, and so on.

mvAwp0L0, mvAwp0L1, RefIdxAwp0L0, RefIdxAwp0L1 are combined as the first target motion information, that is, the first target motion information includes unidirectional motion information pointing to reference picture List0 and unidirectional motion information pointing to reference picture List1.

If the (AwpCandIdx0+1)-th piece of motion information in AwpUniArray is the unidirectional motion information pointing to reference picture List0, the first target motion information includes unidirectional motion information pointing to reference picture List0, and the unidirectional motion information pointing to reference picture List1 is null.

If the (AwpCandIdx0+1)-th piece of motion information in AwpUniArray is the unidirectional motion information pointing to reference picture List1, the first target motion information includes the unidirectional motion information pointing to reference picture List1, and the unidirectional motion information pointing to reference picture List0 is null.

For example, mvAwp0L0 and RefIdxAwp0L0 represent unidirectional motion information pointing to reference picture List0 in the first target motion information, and mvAwp0L1 and RefIdxAwp0L1 represent unidirectional motion information pointing to reference picture List1 in the first target motion information.

If RefIdxAwp0L0 is valid, it indicates that the unidirectional motion information pointing to reference picture List0 is valid. Therefore, a prediction mode of the first target motion information is PRED_List0. If RefIdxAwp0L1 is valid, it indicates that the unidirectional motion information pointing to reference picture List1 is valid. Therefore, the prediction mode of the first target motion information is PRED_List1.

In an example, AwpCandIdx1 represents an index value of the second target motion information. Therefore, the (Awp-CandIdx1+1)-th piece of motion information in AwpUniArray can be assigned to the second target motion information.

For example, if AwpCandIdx1 is 0, a first piece of motion information in AwpUniArray is assigned to the second target motion information, and so on.

mvAwp1L0, mvAwp1L1, RefIdxAwp1L0, RefIdxAwp1L1 are combined as the second target motion information, that is, the second target motion information includes unidirectional motion information pointing to reference picture List0 and unidirectional motion information pointing to reference picture List1.

If the (AwpCandIdx1+1)-th piece of motion information in AwpUniArray is the unidirectional motion information pointing to reference picture List0, the second target motion information includes the unidirectional motion information pointing to reference picture List0, and the unidirectional motion information pointing to reference picture List1 is null.

If the (AwpCandIdx1+1)-th piece of motion information in AwpUniArray is the unidirectional motion information pointing to reference picture List1, the second target motion information includes the unidirectional motion information pointing to reference picture List1, and the unidirectional motion information pointing to reference picture List0 is null.

In an example, mvAwp1L0 and RefIdxAwp1L0 represent unidirectional motion information pointing to reference picture List0 in the second target motion information, and mvAwp1L1 and RefIdxAwp1L1 represent unidirectional motion information pointing to reference picture List1 in the second target motion information.

If RefIdxAwp1L0 is valid, it indicates that the unidirectional motion information pointing to reference picture List0 is valid. Therefore, a prediction mode of the second target motion information is PRED_List0. If RefIdxAwp1L1 is valid, it indicates that the unidirectional motion information pointing to reference picture List1 is valid. Therefore, the prediction mode of the second target motion information is PRED_List1.

In some applications, since the storage space for reference pictures is limited, if the current picture (slice) is a B picture (slice), and POCs of reference pictures in reference picture List0 and reference picture List1 are the same, i.e., a same picture, in order to maximize the performance of the AWP mode, syntax elements of two pieces of motion information (the first target motion information and the second target motion information) transmitted can be redesigned. That is, the motion information can be transmitted in the manner of this example. On the other hand, for a P picture (slice), if two motion vectors pointing to a same picture are limited within a certain range without increasing the bandwidth limit of the P picture (slice), the AWP mode can be applied to the P picture (slice).

In view of the above findings, in this example, when the reference picture pointed by the first target motion information and the reference picture pointed by the second target motion information are the same picture, that is, two motion vectors of the AWP mode point to the same picture, then the motion vector of the second target motion information can be derived from the motion vector of the first target motion information. That is, one (such as the first target motion information) of the two pieces of motion information transfers an index value, and the other (such as the second target motion information) of the two pieces of motion information is further superimposed with a MVD on the basis of the first target motion information. Reference can be made to example 15 or 16 for the coding manner of the MVD.

Table 11 shows an example of syntax elements, where awp_mvd_dir0 represents a direction index value of a motion vector difference of first motion information of a restricted angular weighted prediction mode. A value of AwpMvdDir0 is equal to a value of awp_mvd_dir0. If there is no awp_mvd_dir0 in a bit stream, the value of AwpMvdDir0 is equal to 0. Awp_mvd_step0 represents a step index value of the motion vector difference of the first motion information of the restricted angular weighted prediction mode. A value of AwpMvdStep0 is equal to a value of awp_mvd_step0. If there is no awp_mvd_step0 in the bit stream, the value of AwpMvdStep0 is equal to 0. Awp_mvd_dir1 represents a direction index value of a motion vector difference of second motion information of the restricted angular weighted prediction mode. A value of AwpMvdIdx1 is equal to a value of awp_mvd_dir1. If there is no awp_mvd_dir1 in the bit stream, the value of AwpMvdDir1 is equal to 0. Awp_mvd_step1 represents a step index value of the motion vector difference of the second motion information of the restricted angular weighted prediction mode. A value of AwpMvdStep1 is equal to a value of awp_mvd_step1. If there is no awp_mvd_step1 in the bit stream, the value of AwpMvdStep1 is equal to 0.

TABLE 11

|  | Descriptor |
|---|---|
| Definition of a coding unit | |
| ... | |
| if ((SkipFlag \|\| DirectFlag) &&AwpFlag&& Limited) { | |
| awp_idx | ae(v) |
| awp_cand idx | ac(v) |
| awp_mvd dir0 | ae(v) |
| awp_mvd_step0 | ae(v) |
| awp_mvd dir1 | ae(v) |
| awp_mvd_step1 | ae(v) |
| } | |
| ... | |

To sum up, original motion information (the original motion information includes an original motion vector) can be determined based on awp_cand_idx. A first motion vector difference MVD0 and a second motion vector difference MVD1 can be determined based on awp_mvd_dir0 and awp_mvd_step0. On this basis, the first target motion vector is determined based on the original motion vector and the first motion vector difference MVD0, such as the original motion vector+MVD0. The second target motion vector is determined based on the first target motion vector and the second motion vector difference MVD1, such as the first target motion vector+MVD1. After the first target motion vector is obtained, first target motion information is obtained based on the first target motion vector. The first target motion information includes the first target motion vector. After the second target motion vector is obtained, second target motion information is obtained based on the second target motion vector. The second target motion information includes the second target motion vector.

For another example, the first target motion vector is determined based on the original motion vector and the first motion vector difference MVD0, such as the original motion vector+MVD0. The second target motion vector is determined based on the original motion vector and the second motion vector difference MVD1, such as the original motion vector+MVD1. After the first target motion vector is obtained, first target motion information is obtained based on the first target motion vector, and the first target motion information includes the first target motion vector. After the second target motion vector is obtained, second target motion information is obtained based on the second target motion vector, and the second target motion information includes the second target motion vector.

Table 12 shows another example of syntax elements, where awp_mvd_dir and awp_mvd_step form a syntax expression of MVD of the second motion information (i.e., the second target motion information) on the first motion information (i.e., the first target motion information). Awp_mvd_dir represents a direction index value of a motion vector difference of the restricted angular weighted prediction mode. A value of AwpMvdDir is equal to a value of awp_mvd_dir. If there is no awp_mvd_dir in a bit stream, the value of AwpMvdDir is equal to 0. Awp_mvd_step represents a step index value of the motion vector difference of the restricted angular weighted prediction mode. A value of AwpMvdStep is equal to a value of awp_mvd_step. If there is no awp_mvd_step in the bit stream, the value of AwpMvdStep is equal to 0.

TABLE 12

|  | Descriptor |
| --- | --- |
| Definition of a coding unit |  |
| ... |  |
| if ((SkipFlag \|\| DirectFlag) &&AwpFlag&& Limited) { |  |
| awp_idx | ae(v) |
| awp_cand_idx | ae(v) |
| awp_mvd_dir | ae(v) |
| awp_mvd_step | ae(v) |
| } |  |
| ... |  |

To sum up, original motion information (the original motion information includes an original motion vector) can be determined based on awp_cand_idx, and a MVD can be determined based on awp_mvd_dir and awp_mvd_step.

On this basis, a first target motion vector is determined based on the original motion vector. For example, the first target motion vector is the original motion vector. A second target motion vector is determined based on the first target motion vector and the MVD, such as the first target motion vector+MVD. After the first target motion vector is obtained, first target motion information is obtained based on the first target motion vector, and the first target motion information includes the first target motion vector. After the second target motion vector is obtained, second target motion information is obtained based on the second target motion vector, and the second target motion information includes the second target motion vector.

For another example, the first target motion vector is determined based on the original motion vector and the MVD, such as the original motion vector+MVD. The second target motion vector is determined based on the original motion vector and the MVD, such as the original motion vector−MVD. Or, the first target motion vector is determined based on the original motion vector and the MVD, such as the original motion vector−MVD. The second target motion vector is determined based on the original motion vector and the MVD, such as the original motion vector+MVD. After the first target motion vector is obtained, the first target motion information is obtained based on the first target motion vector, and the first target motion information includes the first target motion vector. After the second target motion vector is obtained, the second target motion information is obtained based on the second target motion vector, and the second target motion information includes the second target motion vector. To sum up, when the MVD acts in two opposite directions at the same time, two target motion information can be derived based on the original motion information.

In a possible implementation, the syntax expression of MVD can also be a separate expression of horizontal component and vertical component. Table 13 shows an example of the separate expression. Awp_mv_diff_x_abs is an absolute value of a horizontal component difference of a motion vector of the restricted angular weighted prediction mode, and awp_mv_diff_y_abs represents an absolute value of a vertical component difference of the motion vector of the restricted angular weighted prediction mode. Awp_mv_diff_x_sign represents a sign value of the horizontal component difference of the motion vector of the restricted angular weighted prediction mode, and awp_mv_diff_y_sign represents a sign value of the vertical component difference of the motion vector of the restricted angular weighted prediction mode.

In an example, as an absolute value of a motion vector difference (an absolute value of a horizontal component difference of a motion vector or an absolute value of a vertical component difference of the motion vector) of the restricted angular weighted prediction mode, a value of AwpMvDiffXAbs is equal to a value of awp_mv_diff_x_abs, and a value of AwpMvDiffYAbs is equal to a value of awp_mv_diff_y_abs.

In an example, as a sign bit of the motion vector difference (a sign bit of a horizontal component difference of a motion vector or a sign bit of a vertical component difference of the motion vector) of the restricted angular weighted prediction mode, a value of AwpMvDiffXSign is equal to a value of awp_mv_diff_x_sign, and a value of AwpMvDiffYSign is equal to a value of awp_mv_diff_y_sign. If there is no awp_mv_diff_x_sign or awp_mv_diff_y_sign in a bit stream, the value of AwpMvDiffXSign or AwpMvDiffYSign is 0. If the value of AwpMvDiffXSign is 0, AwpMvDiffX is equal to AwpMvDiffXAbs; if the value of AwpMvDiffXSign is 1, AwpMvDiffX is equal to −AwpMvDiffXAbs. If the value of AwpMvDiffYSign is 0, AwpMvDiffY is equal to AwpMvDiffYAbs; if the value of AwpMvDiffYSign is 1, AwpMvDiffY is equal to −AwpMvDiffYAbs. The value range of AwpMvDiffX and AwpMvDiffY range from −32768 to 32767.

TABLE 13

|  | Descriptor |
| --- | --- |
| Definition of a coding unit |  |
| awp_mv_diff_x_abs | ae(v) |
| if (AwpMvDiffXAbs) |  |
| awp_mv_diff_x_sign | ae(v) |
| awp_mv_diff_y_abs | ae(v) |
| if (AwpMvDiffY Abs) |  |
| awp_mv_diff_y_sign | ae(v) |

In another possible implementation, Table 14 shows another example of the separate expression. Based on Table 14, it can be determined whether MVD_X is greater than 0, where | . . . | is an absolute value sign, and MVD_X represents a horizontal component of a MVD; it can be determined whether MVD_Y is greater than 0, where | . . . | is the absolute value sign, MVD_Y represents a vertical component of the MVD. If |MVD_X| is greater than 0, it can be determined whether MVD_X is greater than 1. If |MVD_Y| is greater than 0, it can be determined whether |MVD_Y| is greater than 1. If |MVD_X| is greater than 1, |MVD_X|−2 is encoded. If |MVD_X| is greater than 0, a sign bit of MVD_X is encoded. If |MVD_Y| is greater than 1, |MVD_Y|−2 is encoded. If |MVD_Y| is greater than 0, a sign bit of MVD_Y is encoded.

TABLE 14

|  | Descriptor |
| --- | --- |
| mvd_coding(x0,y0,refList,cpIdx) { | |
| abs_mvd_greater0_flag[0] | ae(v) |
| abs_mvd_greater0_flag[1] | ae(v) |
| if( abs_mvd_greater0_flag[0] ) | |
| abs_mvd_greater1_flag[0] | ae(v) |
| if( abs_mvd_greater0_flag[1] ) | |

Example 19: in examples 1 to 3, the encoding side/the decoding side needs to obtain a motion information candidate list, for example, the motion information candidate list is obtained in the following manner: at least one piece of available motion information to be added to the motion information candidate list is obtained; the motion information candidate list is obtained based on the at least one piece of available motion information. In an example, the at least one piece of available motion information includes, but is not limited to, at least one of the following motion information: spatial motion information; temporal motion information; preset motion information. Reference may be made to example 13 for the method of obtaining the available motion information, and no redundant descriptions are made herein.

In an example, obtaining the motion information candidate list based on the at least one piece of available motion information may include: for available motion information currently to be added to the motion information candidate list, adding the available motion information to the motion information candidate list. For example, for the available motion information, whether the available motion information is unidirectional or bidirectional, the available motion information is added to the motion information candidate list. Different from examples 13 and 14, when the available motion information is bidirectional motion information, the bidirectional motion information is not required to be clipped into first unidirectional motion information and second unidirectional motion information, but the bidirectional motion information is directly added to the motion information candidate list. That is, the motion information candidate list can include the bidirectional motion information.

In an example, when the available motion information is added to the motion information candidate list, the duplicate checking operation may be performed on the available motion information, or the duplicate checking operation may not be performed on the available motion information, which is not limited. If the duplicate checking operation may be performed on the available motion information, duplicate checking can be performed based on List+refIdx+MV_x+ MV_y, or based on POC+MV_x+MV_y. Reference may be referred to example 14 for the method of duplicate checking, which not be described in detail.

Example 20: in example 1 to 3, after obtaining the motion information candidate list, the encoding side/the decoding side can obtain first target motion information and second target motion information of the current block based on the motion information candidate list. When it is determined that a reference picture to which the first target motion information points is the same as a reference picture to which the second target motion information points, candidate motion information in the motion information candidate list can all be bidirectional motion information.

In an example, if it is defined that the reference picture to which the first target motion information points is the same as the reference picture to which the second target motion information points, that is, two motion vectors of the AWP mode point to the same picture, then the available motion information added to the motion information candidate list when establishing the motion information candidate list is bidirectional motion information. Based on this, for the encoding side, one piece of candidate motion information can be selected from the motion information candidate list by using the RDO cost value. When the encoding side sends a coded bit stream of the current block to the decoding side, the coded bit stream can carry an index value of such candidate motion information in the motion information candidate list. The decoding side can select one piece of candidate motion information from the motion information candidate list based on the index value.

Example 21: in example 4, the encoding side/the decoding side needs to obtain a motion vector candidate list, for example, the encoding side/the decoding obtains reference picture information (i.e., reference picture information of the current block) and a motion vector candidate list corresponding to the reference picture information (that is, a motion vector candidate list of the current block), that is, the motion vector candidate list is established for the reference picture information. In an example, the reference picture information can include first reference picture information and second reference picture information. Therefore, the motion vector candidate list can include a motion vector candidate list corresponding to the first reference picture information (such as a reference picture index and a reference picture direction) and a motion vector candidate list corresponding to the second reference picture information (such as a reference picture index and a reference picture direction). The first reference picture information is reference picture information corresponding to a first target motion vector, and the second reference picture information is reference picture information corresponding to the second target motion vector.

In an example, the encoding side can obtain the first reference picture information and the second reference picture information. For example, based on the RDO cost value, the first reference picture information and the second reference picture information can be selected from one reference picture list, or the first reference picture information and the second reference picture information can be selected from two reference picture lists. For example, the two reference picture lists are reference picture List0 and reference picture List1, respectively, and the first reference picture information is selected from reference picture List0 and the second reference picture information is selected from reference picture List1.

In an example, the decoding side can obtain the first reference picture information and the second reference picture information. For example, based on the index information in a coded bit stream of the current block, the first reference picture information and the second reference picture information can be selected from one reference picture list, or the first reference picture information and the second reference picture information can be selected from two reference picture lists. For example, the two reference picture lists are reference picture List0 and reference picture List1, respectively. Based on the index information of the first reference picture information, the first reference picture information is selected from reference picture List0, and based on the index information of the second reference picture information, the second reference picture information is selected from reference picture List1.

The above is only an example of obtaining the first reference picture information and the second reference picture information, which is not limited herein.

In a possible implementation, the first reference picture information and the second reference picture information can be the same. In this case, the reference picture pointed by the first target motion vector and the reference picture pointed by the second target motion vector are the same picture, and the motion vector candidate list corresponding to the first reference picture information and the motion vector candidate list corresponding to the second reference picture information are the same motion vector candidate list. That is, the encoding side/the decoding side obtains one motion vector candidate list.

In another possible implementation, the first reference picture information and the second reference picture information can be different. In this case, the reference picture pointed by the first target motion vector and the reference picture pointed by the second target motion vector are different pictures, and the motion vector candidate list corresponding to the first reference picture information and the motion vector candidate list corresponding to the second reference picture information are different motion vector candidate lists. That is, the encoding side/decoding side obtains two different motion vector candidate lists.

For the convenience of description, either one motion vector candidate list or two different motion vector candidate lists are denoted as a motion vector candidate list corresponding to the first reference picture information and a motion vector candidate list corresponding to the second reference picture information.

Based on this, the first target motion vector and the second target motion vector of the current block can be obtained in following manners.

In manner 1, a candidate motion vector is selected from the motion vector candidate list corresponding to the first reference picture information as the first target motion vector of the current block, and a candidate motion vector is selected from the motion vector candidate list corresponding to the second reference picture information as the second target motion vector of the current block. The second target motion vector may be different from the first target motion vector.

Based on the RDO principle, the encoding side can select a candidate motion vector from the motion vector candidate list corresponding to the first reference picture information as the first target motion vector of the current block, and select a candidate motion vector from the motion vector candidate list corresponding to the second reference picture information as the second target motion vector of the current block, which is not limited herein.

In a possible implementation, when the encoding side sends a coded bit stream to the decoding side, the coded bit stream can carry indication information a and indication information b. The indication information a is used to indicate an index value 1 of the first target motion vector of the current block. The index value 1 indicates which candidate motion vector in the motion vector candidate list corresponding to the first reference picture information the first target motion vector is. The indication information b is used to indicate an index value 2 of the second target motion vector of the current block. The index value 2 indicates which candidate motion vector in the motion vector candidate list corresponding to the second reference picture information the second target motion vector is.

After receiving the coded bit stream, the decoding side parses the indication information a and the indication information b from the coded bit stream. Based on the indication information a, the decoding side selects a candidate motion vector corresponding to the index value 1 from the motion vector candidate list corresponding to the first reference picture information, and the candidate motion vector is used as the first target motion vector of the current block. Based on the indication information b, the decoding side selects a candidate motion vector corresponding to the index value 2 from the motion vector candidate list corresponding to the second reference picture information, and the candidate motion vector is used as the second target motion vector of the current block.

In manner 2, a candidate motion vector is selected from the motion vector candidate list corresponding to the first reference picture information as a first original motion vector of the current block, and a candidate motion vector is selected from the motion vector candidate list corresponding to the second reference picture information as a second original motion vector of the current block. For example, the first original motion vector can be different from the second original motion vector, or, the first original motion vector and the second original motion vector can also be the same. Then, a first target motion vector of the current block is determined based on the first original motion vector, and a second target motion vector of the current block is determined based on the second original motion vector. In an example, the first target motion vector may be different from the second target motion vector.

As to how to determine a target motion vector based on the original motion vector, a solution of Angular Weighted Prediction with Motion Vector Refinement (AWP_MVR) is given in an example. For example, a first motion vector difference (MVD) corresponding to the first original motion vector can be obtained, and the first target motion vector is determined based on the first motion vector difference and the first original motion vector (that is, a sum of the first motion vector difference and the first original motion vector is taken as the first target motion vector); or, the first original motion vector may be determined as the first target motion vector. And, a second motion vector difference corresponding to the second original motion vector can be obtained, and the second target motion vector can be determined based on the second motion vector difference and the second original motion vector (that is, a sum of the second motion vector difference and the second original motion vector is used as the second target motion vector); or, the second original motion vector is determined as the second target motion vector.

In an example, direction information and amplitude information of the first motion vector difference can be obtained, and the first motion vector difference can be determined based on the direction information and the amplitude information of the first motion vector difference. And, direction information and amplitude information of the second motion vector difference can be obtained, and the second motion vector difference can be determined based on the direction information and the amplitude information of the second motion vector difference.

In an example, for the decoding side, the direction information of the first motion vector difference can be obtained in the following manner: the decoding side parses the direction information of the first motion vector difference from the coded bit stream of the current block; or, the decoding side derives the direction information of the first motion vector difference based on the weight prediction angle of the current block. For the decoding side, the direction information of the second motion vector difference can be obtained in the following manner: the decoding side parses the direction information of the second motion vector difference from the coded bit stream of the current block; or, the decoding side derives the direction information of the second motion vector difference based on the weight prediction angle of the current block.

In an example, for the decoding side, the amplitude information of the first motion vector difference can be obtained by parsing the amplitude information of the first motion vector difference from the coded bit stream of the current block, and the amplitude information of the second motion vector difference can be obtained by parsing the amplitude information of the second motion vector difference from the coded bit stream of the current block.

In a possible implementation, the encoding side and the decoding side can agree on the direction information and the amplitude information of the motion vector difference. If the direction information indicates a rightward direction, and the amplitude information indicates an amplitude of A, then the motion vector difference is (A, 0). If the direction information indicates a downward direction, and the amplitude information indicates an amplitude of A, then the motion vector difference is (0, −A). If the direction information indicates a leftward direction, and the amplitude information indicates an amplitude of A, then the motion vector difference is (−A, 0). If the direction information indicates an upward direction, and the amplitude information indicates an amplitude of A, then the motion vector difference is (0, A). If the direction information indicates is a right-upward direction, and the amplitude information indicates an amplitude of A, then the motion vector difference is (A, A). If the direction information indicates is a left-upward direction, and the amplitude information indicates an amplitude of A, then the motion vector difference is (−A, A). If the direction information indicates a left-downward direction, and the amplitude information indicates an amplitude of A, then the motion vector difference is (−A, −A). If the direction information indicates a right-downward direction, and the amplitude information indicates an amplitude of A, then the motion vector difference is (A, −A). The above is only examples, and the direction information and amplitude information are not limited herein.

In an example, for the relevant introduction of the motion vector difference, reference may be made to example 15, and no redundant descriptions are made herein.

Based on the RDO cost value, the encoding side can select the first original motion vector from the motion vector candidate list corresponding to the first reference picture information, and select the second original motion vector from the motion vector candidate list corresponding to the second reference picture information. Based on the RDO cost value, the encoding side can determine the direction information and the amplitude information of the first motion vector difference corresponding to the first original motion vector, and determine the direction information and the amplitude information of the second motion vector difference corresponding to the second original motion vector. When sending the coded bit stream to the decoding side, the encoding side encodes the index value of the first original motion vector in the motion vector candidate list corresponding to the first reference picture information, and encodes the index value of the second original motion vector in the motion vector candidate list corresponding to the second reference picture information, the direction information and the amplitude information of the first motion vector difference, and the direction information and the amplitude information of the second motion vector difference in the coded bit stream.

After receiving the coded bit stream of the current block, based on the index value of the first original motion vector in the motion vector candidate list corresponding to the first reference picture information, the decoding side selects the first original motion vector from the motion vector candidate list corresponding to the first reference picture information, and based on the index value of the second original motion vector in the motion vector candidate list corresponding to the second reference picture information, the decoding side selects the second original motion vector from the motion vector candidate list corresponding to the second reference picture information.

The decoding side can also parse the direction information and the amplitude information of the first motion vector difference from the coded bit stream, and determine the first motion vector difference based on the direction information and the amplitude information, and parse the direction information and the amplitude information of the second motion vector difference from the coded bit stream, and determine the second motion vector difference based on the direction information and the amplitude information.

In an example, the coded bit stream may further include the first reference picture information corresponding to the first original motion vector, and the decoding side may determine the first original motion information based on the first original motion vector and the first reference picture information corresponding to the first original motion vector. The coded bit stream may further include the second reference picture information corresponding to the second original motion vector, and the decoding side may determine the second original motion information based on the second original motion vector and the second reference picture information corresponding to the second original motion vector.

Then, the decoding side can determine the first target motion information of the current block based on the first motion vector difference and the first original motion information, and determine the second target motion information of the current block based on the second motion vector difference and the second original motion information.

In an example, the encoding side can further encode a first sub-mode flag and a second sub-mode flag of an enhanced angular weighted prediction mode in the coded bit stream. The first sub-mode flag indicates that the first original motion information is superimposed with a motion vector difference, or that the first original motion information is not superimposed with a motion vector difference. The second sub-mode flag indicates that the second original motion information is superimposed with a motion vector difference, or that the second original motion information is not superimposed with a motion vector difference. Reference may be made to example 15 for relevant processing, and no redundant descriptions are made herein.

In the above example, the decoding side parses the direction information of the first motion vector difference and the direction information of the second motion vector difference from the coded bit stream of the current block. In practical applications, the direction information of the first motion vector difference can also be derived based on the weight prediction angle of the current block, and the direction information of the second motion vector difference can be derived based on the weight prediction angle of the current block.

The encoding side can also derive the direction information of the first motion vector difference based on the weight prediction angle of the current block, and derive the direction information of the second motion vector difference based on the weight prediction angle of the current block.

In an example, the decoding side can parse the amplitude information of the first motion vector difference and the amplitude information of the amplitude information of the second motion vector difference from the coded bit stream. In a possible implementation, the encoding side and the decoding side can establish a same motion vector difference amplitude list. The encoding side determines an amplitude index of the amplitude information of the first motion vector difference in the motion vector difference amplitude list, and the coded bit stream includes the amplitude index of the first motion vector difference. The decoding side parses the amplitude index of the first motion vector difference from the coded bit stream of the current block, and selects amplitude information corresponding to the amplitude index from the motion vector difference amplitude list. The amplitude information is amplitude information of the first motion vector difference. The encoding side determines an amplitude index of the amplitude information of the second motion vector difference in the motion vector difference amplitude list, and the coded bit stream includes the amplitude index of the second motion vector difference. The decoding side parses the amplitude index of the second motion vector difference from the coded bit stream of the current block, and selects amplitude information corresponding to the amplitude index from the motion vector difference amplitude list. The amplitude information is amplitude information of the second motion vector difference.

In another possible implementation, the encoding side and the decoding side can establish same at least two motion vector difference amplitude lists. For example, the encoding side and the decoding side establish a same motion vector difference amplitude list 1, and establish a same motion vector difference amplitude list 2. Based on indication information of the motion vector difference amplitude list, the encoding side selects a target motion vector difference amplitude list from all motion vector difference amplitude lists. The encoding side determines an amplitude index of the amplitude information of the first motion vector difference in the target motion vector difference amplitude list, and the coded bit stream includes the amplitude index of the first motion vector difference.

The encoding side can also determine an amplitude index of the amplitude information of the second motion vector difference in the target motion vector difference amplitude list, and the coded bit stream can include the amplitude index of the second motion vector difference. The decoding side can parse the amplitude index of the second motion vector difference from the coded bit stream of the current block, and select amplitude information corresponding to the amplitude index from the target motion vector difference amplitude list. The amplitude information is amplitude information of the second motion vector difference.

In an example, for the relevant contents of the motion vector difference amplitude list, reference may be made to example 16, and no redundant descriptions are made herein.

Example 22: in example 4, based on the motion vector candidate list corresponding to the first reference picture information and the motion vector candidate list corresponding to the second reference picture information, the encoding side/the decoding side can obtain the first target motion vector and the second target motion vector of the current block. When the reference picture pointed by the first target motion vector and the reference picture pointed by the second target motion vector are the same picture, the first reference picture information is the same as the second reference picture information. That is, the motion vector candidate list corresponding to the first reference picture information and the motion vector candidate list corresponding to the second reference picture information are the same. Based on this, the first target motion vector and the second target motion vector are obtained in the following manner: a candidate motion vector is selected from the motion vector candidate list as the original motion vector of the current block; the first target motion vector of the current block is determined based on the original motion vector. The second target motion vector of the current block is determined based on the first target motion vector, or the second target motion vector of the current block is determined based on the original motion vector.

In an example, a motion vector difference corresponding to the original motion vector is obtained, the first target motion vector of the current block is determined based on the original motion vector, and the second target motion vector of the current block is determined based on the first target motion vector and the motion vector difference. Or, a motion vector difference corresponding to the original motion vector is obtained, the first target motion vector of the current block is determined based on the original motion vector and the motion vector difference, and the second target motion vector of the current block is determined based on the original motion vector and the motion vector difference. Or, a first motion vector difference and a second motion vector difference corresponding to the original motion vector are obtained; the first target motion vector of the current block is determined based on the original motion vector and the first motion vector difference, and the second target motion vector of the current block is determined based on the first target motion vector and the second motion vector difference. Or, a first motion vector difference and a second motion vector difference corresponding to the original motion vector are obtained; the first target motion vector of the current block is determined based on the original motion vector and the first motion vector difference, and the second target motion vector of the current block is determined based on the original motion vector and the second motion vector difference.

In the above example, the first target motion vector and the second target motion vector may be different.

In example 21 or 22, a motion vector candidate list corresponding to the first reference picture information and a motion vector candidate list corresponding to the second reference picture information are established, instead of establishing a motion information candidate list. For example, a motion vector candidate list is established by using a (refIdx)-th picture for reference picture list ListX, and the establishing can be performed by a method for establishing a motion vector candidate list in an inter common mode, or a restriction pointing to the reference picture can be added on the basis of embodiment 13 or 14. When the restriction pointing to the reference picture is added, the motion information candidate list can be a motion vector candidate list. In an example, when establishing the motion vector candidate list, the determination on the reference picture is added when determining the availability, or when adding a unidirectional motion vector, scaling and other means can be adopted.

In examples 1 to 4, the encoding side/the decoding side can determine a first prediction value of a pixel position based on the first target motion information, and determine a second prediction value of the pixel position based on the second target motion information. Reference may be made to the inter prediction process for this process, which is not limited herein. In an example, when determining the first prediction value of the pixel position based on the first target motion information, the first prediction value of the pixel position can be obtained by using an inter weighted prediction mode. For example, an initial prediction value of the pixel position is first determined by using the first target motion information, and then the initial prediction value is multiplied by a preset factor to obtain an adjusted prediction value. If the adjusted prediction value is greater than a maximum prediction value, the maximum prediction value is taken as the first prediction value of the current block. If the adjusted prediction value is less than the minimum prediction value, the minimum prediction value is taken as the first prediction value of the current block. If the adjusted prediction value is not less than the minimum prediction value and not greater than the maximum prediction value, the adjusted prediction value is taken as the first prediction value of the current block. The above method is only an example, which is not limited herein. Similarly, when determining the second prediction value of the pixel position based on the second target motion information, the second prediction value of the pixel position can also be obtained by using the inter weighted prediction mode. For the specific implementation method, please refer to the above example, which will not be repeated herein.

In an example, examples 1 to 3, examples 5 to 12, and examples 13 to 20 can be implemented separately or in combination. For example, example 1 and example 2 are implemented in combination; example 1 and example 3 are implemented in combination; example 1 and at least one of examples 5 to 12 are implemented in combination; example 1 and at least one of examples 13 to 20 are implemented in combination; example 2 and at least one of examples 5 to 12 are implemented in combination; example 2 and at least one of examples 13 to 20 are implemented in combination; example 3 and at least one of examples 5 to 12 are implemented in combination; example 3 and at least one of examples 13 to 20 are implemented in combination. The combination mode between examples is not limited herein.

In an example, example 4, examples 5 to 12, and examples 21 to 22 can be implemented separately or in combination. For example, Example 4 and at least one of examples 5 to 12 are implemented in combination; example 4 and example 21 are implemented in combination; example 4 and example 22 are implemented in combination; example 4, example 21 and example 22 are implemented in combination. The combination mode between examples is not limited herein.

Figure 10A:
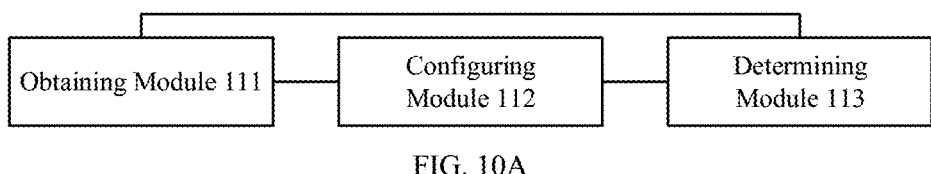
FIG. 10A is a schematic block diagram of an encoding and decoding apparatus according to an example of the present disclosure.

Example 23: based on the same application concept as the above methods, the examples of the present disclosure also provide an encoding and decoding apparatus, which is applied to an encoding side or a decoding side. FIG. 10A shows a structural diagram of the apparatus, including:

an obtaining module 111, configured to obtain, when it is determined that a weighted prediction is enabled for a current block, a weight prediction angle and one or more weight configuration parameters of the current block; a configuring module 112, configured to configure reference weight values for surrounding positions outside the current block based on the one or more weight configuration parameters; and a determining module 113, configured to, for each pixel position of the current block, determine a surrounding matching position to which the pixel position points from the surrounding positions outside the current block based on the weight prediction angle; determine a target weight value of the pixel position based on a reference weight value associated with the surrounding matching position, and determine an associated weight value of the pixel position based on the target weight value of the pixel position; the obtaining module 111 is further configured to, obtain a motion information candidate list which comprises at least one piece of candidate motion information, and obtain first target motion information and second target motion information of the current block based on the motion information candidate list; the determining module 113 is further configured to, for each pixel position of the current block, determine a first prediction value of the pixel position based on the first target motion information of the current block, determine a second prediction value of the pixel position based on the second target motion information of the current block, and determine a weighted prediction value of the pixel position based on the first prediction value, the target weight value, the second prediction value and the associated weight value; and determine weighted prediction values of the current block based on the weighted prediction value of each pixel position of the current block.

In an example, when obtaining the motion information candidate list, the obtaining module 111 is specifically configured to:

obtain at least one piece of available motion information to be added to a motion information candidate list; and obtain the motion information candidate list based on the at least one piece of available motion information; where the available motion information comprises at least one of the following motion information: spatial motion information; temporal motion information; preset motion information.

In an example, when obtaining the motion information candidate list based on the at least one piece of available motion information, the obtaining module 111 is specifically configured to: for the available motion information currently to be added to the motion information candidate list, if the available motion information is unidirectional motion information, add the unidirectional motion information to the motion information candidate list;

if the available motion information is bidirectional motion information, clip the bidirectional motion information into first unidirectional motion information and second unidirectional motion information, and add the first unidirectional motion information to the motion information candidate list;

or, for the available motion information currently to be added to the motion information candidate list, if the available motion information is unidirectional motion information, and the unidirectional motion information does not duplicate with candidate motion information existing in the motion information candidate list, add the unidirectional motion information to the motion information candidate list;

if the available motion information is bidirectional motion information, clip the bidirectional motion information into first unidirectional motion information and second unidirectional motion information; if the first unidirectional motion information does not duplicate with candidate motion information existing in the motion information candidate list, add the first unidirectional motion information to the motion information candidate list;

or, for the available motion information currently to be added to the motion information candidate list, if the available motion information is unidirectional motion information, and the unidirectional motion information does not duplicate with candidate motion information existing in the motion information candidate list, add the unidirectional motion information to the motion information candidate list;

if the available motion information is bidirectional motion information, clip the bidirectional motion information into first unidirectional motion information and second unidirectional motion information; if the first unidirectional motion information does not duplicate with candidate motion information existing in the motion information candidate list, add the first unidirectional motion information to the motion information candidate list; if the first unidirectional motion information duplicates with the candidate motion information existing in the motion information candidate list, and the second unidirectional motion information does not duplicate with the candidate motion information existing in the motion information candidate list, add the second unidirectional motion information to the motion information candidate list.

In an example, when obtaining the first target motion information and the second target motion information of the current block based on the motion information candidate list, the obtaining module 111 is specifically configured to: select candidate motion information from the motion information candidate list as first original motion information of the current block, and select candidate motion information from the motion information candidate list as second original motion information of the current block; determine the first target motion information of the current block based on the first original motion information; and determine the second target motion information of the current block based on the second original motion information.

In an example, the first original motion information includes a first original motion vector, the first target motion information includes a first target motion vector, and when determining the first target motion information of the current block based on the first original motion information, the obtaining module 111 is specifically configured to: obtain a first motion vector difference corresponding to the first original motion vector, and determine the first target motion vector based on the first motion vector difference and the first original motion vector; or, determine the first original motion vector as the first target motion vector; the second original motion information includes a second original motion vector, the second target motion information includes a second target motion vector, and when determining the second target motion information of the current block based on the second original motion information, the obtaining module 111 is specifically configured to: obtain a second motion vector difference corresponding to the second original motion vector, and determine the second target motion vector based on the second motion vector difference and the second original motion vector; or, determine the second original motion vector as the second target motion vector.

In an example, if a reference picture pointed by the first target motion information and a reference picture pointed by the second target motion information are a same picture, when obtaining the first target motion information and the second target motion information of the current block based on the motion information candidate list, the obtaining module 111 is specifically configured to: select a piece of candidate motion information from the motion information candidate list as the original motion information of the current block; determine the first target motion information of the current block based on the original motion information; determine the second target motion information of the current block based on the first target motion information, or determine the second target motion information of the current block based on the original motion information.

In an example, the original motion information includes an original motion vector, the first target motion information includes a first target motion vector, and the second target motion information includes a second target motion vector. The obtaining module 111 is specifically configured to: obtain a motion vector difference corresponding to the original motion vector; determine the first target motion vector of the current block based on the original motion vector; determine the second target motion vector of the current block based on the first target motion vector and the motion vector difference; or, obtain a motion vector difference corresponding to the original motion vector; determine the first target motion vector of the current block based on the original motion vector and the motion vector difference; determine the second target motion vector of the current block based on the original motion vector and the motion vector difference; or, obtain a first motion vector difference and a second motion vector difference corresponding to the original motion vector; determine the first target motion vector of the current block based on the original motion vector and the first motion vector difference; determine the second target motion vector of the current block based on the first target motion vector and the second motion vector difference; or, obtain a first motion vector difference and a second motion vector difference corresponding to the original motion vector; determine the first target motion vector of the current block based on the original motion vector and the first motion vector difference; determine the second target motion vector of the current block based on the original motion vector and the second motion vector difference.

In the above examples, the first target motion vector and the second target motion vector may be different.

Figure 10B:
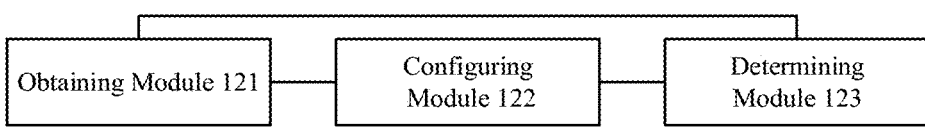
FIG. 10B is a schematic block diagram of an encoding and decoding apparatus according to an example of the present disclosure.

Based on the same application concept as the above methods, the examples of the present disclosure also provide an encoding and decoding apparatus, which is applied to an encoding side or a decoding side. FIG. 10B shows a structural diagram of the apparatus, including:

an obtaining module 121, configured to obtain, when it is determined that a weighted prediction is enabled for a current block, a weight prediction angle and one or more weight configuration parameters of the current block; a configuring module 122, configured to configure reference weight values for surrounding positions outside the current block based on the one or more weight configuration parameters; and a determining module 123, configured to, for each pixel position of the current block, determine a surrounding matching position to which the pixel position points from the surrounding positions outside the current block based on the weight prediction angle; determine a target weight value of the pixel position based on a reference weight value associated with the surrounding matching position, and determine an associated weight value of the pixel position based on the target weight value of the pixel position; the obtaining module 121 is further configured to, obtain reference picture information and obtain a motion vector candidate list corresponding to the reference picture information, where the motion vector candidate list includes at least one candidate motion vector, and the reference picture information includes first reference picture information and second reference picture information; obtain a first target motion vector and a second target motion vector of the current block based on the motion vector candidate list; the determining module 123 is further configured, for each pixel position of the current block, determine a first prediction value of the pixel position based on the first target motion information of the current block, determine a second prediction value of the pixel position based on the second target motion information of the current block, and determine a weighted prediction value of the pixel position based on the first prediction value, the target weight value, the second prediction value and the associated weight value; where the first target motion information includes a first target motion vector and the first reference picture information corresponding to the first target motion vector, and the second target motion information includes a second target motion vector and the second reference picture information corresponding to the second target motion vector; and determine weighted prediction values of the current block based on the weighted prediction value of each pixel position of the current block.

In an example, the one or more weight configuration parameters include a weight transform rate. If the current block supports a weight transform rate switching mode, the obtaining module 121 obtains the weight transform rate of the current block in the following way: obtaining weight transform rate indication information of the current block; determining the weight transform rate of the current block based on the weight transform rate indication information; where, if the weight transform rate indication information is first indication information, the weight transform rate of the current block is a first weight transform rate; if the weight transform rate indication information is second indication information, the weight transform rate of the current block is a second weight transform rate.

In an example, the weight transform rate indication information of the current block is a weight transform rate refining flag corresponding to the current block, the first indication information is used to indicate that the weight transform rate of the current block does not need to be switched, and the second indication information is used to indicate that the weight transform rate of the current block needs to be switched.

The one or more weight configuration parameters include a weight transform rate and a starting position of the weight transform. When configuring reference weight values for surrounding positions outside the current block based on the one or more weight configuration parameters, the configuring module 122 is specifically configured to:

for each surrounding position outside the current block, configuring the reference weight value of the surrounding position based on a coordinate value of the surrounding position, a coordinate value of the starting position of the weight transform, and the weight transform rate.

In an example, the motion vector candidate list includes a motion vector candidate list corresponding to the first reference picture information and a motion vector candidate list corresponding to the second reference picture information. When obtaining the first target motion vector and the second target motion vector of the current block based on the motion vector candidate list, the obtaining module 121 is specifically configured to:

select a candidate motion vector from the motion vector candidate list corresponding to the first reference picture information as a first original motion vector of the current block, and select a candidate motion vector from the motion vector candidate list corresponding to the second reference picture information as a second original motion vector of the current block; determine the first target motion vector of the current block based on the first original motion vector; and determine the second target motion vector of the current bloc based on the second original motion vector.

In an example, when determining the first target motion vector of the current block based on the first original motion vector, the obtaining module 121 is specifically configured to: obtain a first motion vector difference corresponding to the first original motion vector; determine the first target motion vector based on the first motion vector difference and the first original motion vector; or, determine the first original motion vector as the first target motion vector.

In an example, when determining the second target motion vector of the current block based on the second original motion vector, the obtaining module 121 is specifically configured to: obtain a second motion vector difference corresponding to the second original motion vector; determine the second target motion vector based on the second motion vector difference and the second original motion vector; or, determine the second original motion vector as the second target motion vector.

In an example, if a reference picture pointed by the first target motion vector and a reference picture pointed by the second target motion vector are a same picture, the first reference picture information is the same as the second reference picture information, and the motion vector candidate list corresponding to the first reference picture information and the motion vector candidate list corresponding to the second reference picture information are a same motion vector candidate list, when obtaining the first target motion vector and the second target motion vector of the current block based on the motion vector candidate list, the obtaining module 121 is specifically configured to: select a candidate motion vector from the motion vector candidate list as an original motion vector of the current block; determine the first target motion vector of the current block based on the original motion vector; determine the second target motion vector of the current block based on the first target motion vector, or determine the second target motion vector of the current block based on the original motion vector.

In an example, the obtaining module 121 is specifically configured to:

obtain a motion vector difference corresponding to the original motion vector, determine the first target motion vector of the current block based on the original motion vector, and determine the second target motion vector of the current block based on the first target motion vector and the motion vector difference; or, obtain a motion vector difference corresponding to the original motion vector, determine the first target motion vector of the current block based on the original motion vector and the motion vector difference, and determine the second target motion vector of the current block based on the original motion vector and the motion vector difference; or, obtain a first motion vector difference and a second motion vector difference corresponding to the original motion vector, determine the first target motion vector of the current block based on the original motion vector and the first motion vector difference, and determine the second target motion vector of the current block based on the first target motion vector and the second motion vector difference; or, obtain a first motion vector difference and a second motion vector difference corresponding to the original motion vector, determine the first target motion vector of the current block based on the original motion vector and the first motion vector difference, and determine the second target motion vector of the current block based on the original motion vector and the second motion vector difference.

In the above examples, the first target motion vector and the second target motion vector may be different.

Figure 10C:
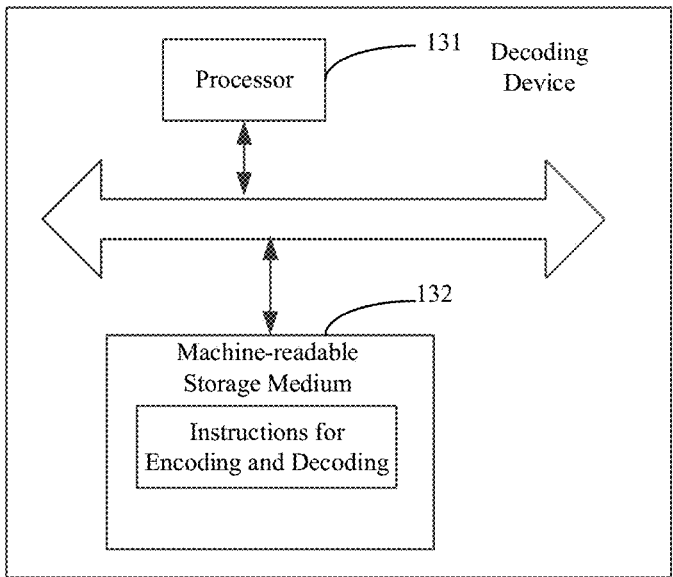
FIG. 10C is a hardware structure diagram of a decoding device according to an example of the present disclosure.

Based on the same application concept as the above methods, a hardware architecture of a decoding device (also referred to as a video decoder) provided by the examples of the present disclosure can be seen in FIG. 10C. The decoding device includes a processor 131 and a machine-readable storage medium 132. The machine-readable storage medium 132 stores machine executable instructions that can be executed by the processor 131. The processor 131 is configured to execute the machine executable instructions to implement the methods disclosed in the above examples of the present disclosure. For example, the processor 131 is configured to execute the machine executable instructions to perform the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which comprises at least one piece of candidate motion information, and based on the motion information candidate list, obtaining first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value;

determining weighted prediction values of the current block based on the weighted prediction value of each pixel position of the current block. Or, the processor 131 is configured to execute the machine executable instructions to perform the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining reference picture information and obtaining a motion vector candidate list corresponding to the reference picture information, where the motion vector candidate list includes at least one candidate motion vector, and the reference picture information includes first reference picture information and second reference picture information; obtaining a first target motion vector and a second target motion vector of the current block based on the motion vector candidate list;

for each pixel position of the current block, determining a first prediction value of the pixel position based on the first target motion information of the current block, determining a second prediction value of the pixel position based on the second target motion information of the current block, and determining a weighted prediction value of the pixel position based on the first prediction value, the target weight value, the second prediction value and the associated weight value; where the first target motion information includes a first target motion vector and the first reference picture information corresponding to the first target motion vector, and the second target motion information includes a second target motion vector and the second reference picture information corresponding to the second target motion vector;

determining weighted prediction values of the current block based on the weighted prediction value of each pixel position of the current block.

Figure 10D:
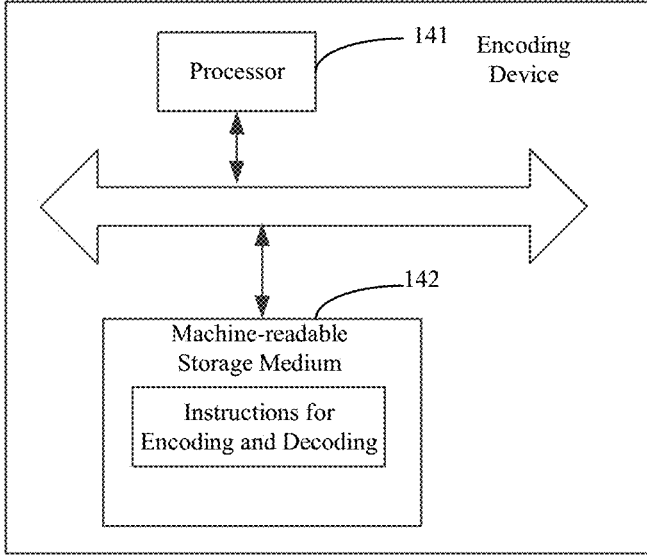
FIG. 10D is a hardware structure diagram of an encoding device according to an example of the present disclosure.

Based on the same application concept as the above methods, a hardware architecture of an encoding device (also referred to as video encoder) provided by the examples of the present disclosure can be seen in FIG. 10D. The encoding device includes a processor 141 and a machine-readable storage medium 142. The machine-readable storage medium 142 stores machine executable instructions that can be executed by the processor 141. The processor 141 is configured to execute the machine executable instructions to implement the methods disclosed in the above examples of the present disclosure. For example, the processor 141 is configured to execute the machine executable instructions to perform the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which comprises at least one piece of candidate motion information, and based on the motion information candidate list, obtaining first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value;

determining weighted prediction values of the current block based on the weighted prediction value of each pixel position of the current block. Or, the processor 141 is configured to execute the machine executable instructions to perform the following steps:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining reference picture information and obtaining a motion vector candidate list corresponding to the reference picture information, where the motion vector candidate list includes at least one candidate motion vector, and the reference picture information includes first reference picture information and second reference picture information; obtaining a first target motion vector and a second target motion vector of the current block based on the motion vector candidate list;

for each pixel position of the current block, determining a first prediction value of the pixel position based on the first target motion information of the current block, determining a second prediction value of the pixel position based on the second target motion information of the current block, and determining a weighted prediction value of the pixel position based on the first prediction value, the target weight value, the second prediction value and the associated weight value; where the first target motion information includes a first target motion vector and the first reference picture information corresponding to the first target motion vector, and the second target motion information includes a second target motion vector and the second reference picture information corresponding to the second target motion vector;

determining weighted prediction values of the current block based on the weighted prediction value of each pixel position of the current block.

Based on the same application concept as the above methods, the examples of the present disclosure also provide a machine-readable storage medium on which computer instructions are stored. When the computer instructions are executed by a processor, the methods disclosed in the above examples of the present disclosure can be realized, such as the encoding and decoding methods in the above examples.

The systems, devices, modules or units described in the above examples can be specifically implemented by a computer chip or entity, or by a product with a certain function. A typical implementation device is a computer. The specific form of a computer can be a personal computer, a laptop computer, a cellular phone, a camera phone, a smart phone, a personal digital assistant, a media player, a navigation device, an e-mail receiving and sending device, a game console, a tablet computer, a wearable device or any combination of these devices. For the convenience of description, the above devices are divided into various units in terms of their functions and described separately. Of course, in the implementation of the present disclosure, the functions of each unit can be implemented in one or more software and/or hardware.

Those skilled in the art should understand that examples of the present disclosure can be provided as methods, systems, or computer program products. The present disclosure may take the form of a complete hardware example, a complete software example, or an example combining software and hardware aspects. The examples of the present disclosure can take the form of a computer program product implemented on one or more computer usable storage media (including but not limited to disk storage, CD-ROM, optical memory, etc.) containing computer usable program codes therein.

The above is only examples of the present disclosure, and is not intended to limit the present disclosure. For those skilled in the art, the present disclosure may have various changes and variations. Any modification, equivalent substitution, improvement, etc. made within the spirit and principle of the present disclosure shall be included in the scope of claims of the present disclosure.

The invention claimed is:

1. An encoding and decoding method, comprising:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which comprises at least one piece of candidate motion information, and obtaining, based on the motion information candidate list, first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and

determining weighted prediction values of the current block based on the weighted prediction value of each pixel position of the current block;

wherein obtaining the motion information candidate list comprises:

obtaining at least one piece of available motion information to be added to a motion information candidate list; and obtaining the motion information candidate list based on the at least one piece of available motion information;

wherein the available motion information comprises at least one of the following motion information: spatial motion information; temporal motion information; preset motion information;

wherein obtaining the motion information candidate list based on the at least one piece of available motion information comprises:

for the available motion information currently to be added to the motion information candidate list, if the available motion information is unidirectional motion information, and the unidirectional motion information does not duplicate with candidate motion information existing in the motion information candidate list, adding the unidirectional motion information to the motion information candidate list;

if the available motion information is bidirectional motion information, clipping the bidirectional motion information into first unidirectional motion information and second unidirectional motion information; if the first unidirectional motion information does not duplicate with candidate motion information existing in the motion information candidate list, adding the first unidirectional motion information to the motion information candidate list;

wherein whether the unidirectional motion information duplicates with the candidate motion information existing in the motion information candidate list is checked by the follow way:

if a Picture Order Count (POC) of a reference picture to which the unidirectional motion information points is the same as that of a reference picture to which the candidate motion information points, and a motion vector of the unidirectional motion information is the same as that of the candidate motion information, determining that the unidirectional motion information duplicates with the candidate motion information; otherwise, determining that the unidirectional motion information does not duplicate with the candidate motion information.

2. The encoding and decoding method according to claim 1, wherein obtaining the at least one piece of available motion information to be added to the motion information candidate list comprises:

for a spatial neighbouring block of the current block, if the spatial neighbouring block exists and an inter prediction mode is adopted for the spatial neighbouring block, determining motion information of the spatial neighbouring block as the available motion information.

3. The encoding and decoding method according to claim 1, wherein obtaining the at least one piece of available motion information to be added to the motion information candidate list comprises:

based on a preset position of the current block, selecting a temporal neighbouring block corresponding to the preset position from a reference picture of the current block, and determining motion information of the temporal neighbouring block as the available motion information.

4. The encoding and decoding method according to claim 1, wherein obtaining the at least one piece of available motion information to be added to the motion information candidate list comprises:

determining the preset motion information as the available motion information, wherein the preset motion information comprises:

default motion information derived based on candidate motion information existing in the motion information candidate list.

5. The encoding and decoding method according to claim 1, wherein obtaining the motion information candidate list based on the at least one piece of available motion information comprises:

for the available motion information currently to be added to the motion information candidate list, if the available motion information is the preset motion information, adding the available motion information to the motion information candidate list.

6. The encoding and decoding method according to claim 1, wherein, the first unidirectional motion information is unidirectional motion information pointing to a reference picture in a first reference picture list;

the second unidirectional motion information is unidirectional motion information pointing to a reference picture in a second reference picture list;

wherein the first reference picture list is List0, and the second reference picture list is List1; or, the first reference picture list is List1, and the second reference picture list is List0.

7. The encoding and decoding method according to claim 1, wherein obtaining, based on the motion information candidate list, the first target motion information and the second target motion information of the current block, comprises:

selecting candidate motion information from the motion information candidate list as first original motion information of the current block, and selecting candidate motion information from the motion information candidate list as second original motion information of the current block;

determining the first target motion information of the current block based on the first original motion information; and determining the second target motion information of the current block based on the second original motion information.

8. The encoding and decoding method according to claim 7, wherein, the first original motion information comprises a first original motion vector, the first target motion information comprises a first target motion vector, and determining the first target motion information of the current block based on the first original motion information comprises:

obtaining a first motion vector difference corresponding to the first original motion vector, and determining the first target motion vector based on the first motion vector difference and the first original motion vector; or, determining the first original motion vector as the first target motion vector;

the second original motion information comprises a second original motion vector, the second target motion information comprises a second target motion vector, and determining the second target motion information of the current block based on the second original motion information comprises:

obtaining a second motion vector difference corresponding to the second original motion vector, and determining the second target motion vector based on the second motion vector difference and the second original motion vector; or, determining the second original motion vector as the second target motion vector;

wherein, obtaining the first motion vector difference corresponding to the first original motion vector comprises:

obtaining direction information and amplitude information of the first motion vector difference; and determining the first motion vector difference based on the direction information and the amplitude information of the first motion vector difference;

obtaining the second motion vector difference corresponding to the second original motion vector comprises:

obtaining direction information and amplitude information of the second motion vector difference; and determining the second motion vector difference based on the direction information and the amplitude information of the second motion vector difference.

9. The encoding and decoding method according to claim 1, wherein the weight configuration parameters include a weight transform rate and a starting position of a weight transform; the starting position of the weight transform is determined by at least one of the following parameters: the weight prediction angle of the current block, a weight prediction position of the current block, and a size of the current block;

wherein the weight prediction angle is a horizontal angle; or, the weight prediction angle is a vertical angle; or, an absolute value of a slope of the weight prediction angle is a n-th power of 2, wherein n is an integer;

wherein if the current block supports a weight transform rate switching mode, the weight transform rate of the current block is obtained in the following way: obtaining weight transform rate indication information of the current block; determining the weight transform rate of the current block based on the weight transform rate indication information; if the weight transform rate indication information is first indication information, the weight transform rate of the current block is a first weight transform rate; if the weight transform rate indication information is second indication information, the weight transform rate of the current block is a second weight transform rate;

wherein the weight transform rate indication information of the current block is a weight transform rate refining flag corresponding to the current block, wherein the first indication information is used to indicate that the weight transform rate of the current block does not need to be switched, and the second indication information is used to indicate that the weight transform rate of the current block needs to be switched.

10. The encoding and decoding method according to claim 9, wherein a number of the surrounding positions outside the current block is determined based on at least one of the size of the current block or the weight prediction angle of the current block; the surrounding positions outside the current block include surrounding positions in an upper row outside the current block, or surrounding positions in a left column outside the current block;

the reference weight values of the surrounding positions outside the current block monotonically increase or monotonically decrease;

the reference weight values of the surrounding positions outside the current block include one or more reference weight values of a target area, one or more reference weight values of a first neighbouring area of the target area, and one or more reference weight values of a second neighbouring area of the target area; wherein, the reference weight values of the first neighbouring area are all a second reference weight value, the reference weight values of the second neighbouring area are all a third reference weight value, and the second reference weight value is different from the third reference weight value;

the target area includes one reference weight value or at least two reference weight values; if the target area includes at least two reference weight values, the at least two reference weight values of the target area monotonically increase or monotonically decrease;

wherein the surrounding positions outside the current block include one or more integer pixel positions, or one or more sub-pixel positions, or one or more integer pixel positions and one or more sub-pixel positions; determining the target weight value of the pixel position based on the reference weight value associated with the surrounding matching position includes:

if the surrounding matching position is an integer pixel position and the integer pixel position has been set with a reference weight value, determining the target weight value of the pixel position based on the reference weight value of the integer pixel position; or if the surrounding matching position is a sub-pixel position and the sub-pixel position is set with a reference weight value, determining the target weight value of the pixel position based on the reference weight value of the sub-pixel position.

11. A decoding device, comprising a processor and a machine-readable storage medium, wherein the machine-readable storage medium stores machine executable instructions that can be executed by the processor, and the processor is configured to execute the machine executable instructions to perform:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which comprises at least one piece of candidate motion information, and obtaining, based on the motion information candidate list, first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and determining weighted prediction values of the current block based on the weighted prediction value of each pixel position of the current block;

wherein in obtaining the motion information candidate list, the processor is further configured to execute the machine executable instructions to perform: obtaining at least one piece of available motion information to be added to a motion information candidate list; and obtaining the motion information candidate list based on the at least one piece of available motion information; wherein the available motion information comprises at least one of the following motion information: spatial motion information; temporal motion information; preset motion information;

wherein in obtaining the motion information candidate list based on the at least one piece of available motion information, the processor is further configured to execute the machine executable instructions to perform: for the available motion information currently to be added to the motion information candidate list, if the available motion information is unidirectional motion information, and the unidirectional motion information does not duplicate with candidate motion information existing in the motion information candidate list, adding the unidirectional motion information to the motion information candidate list; if the available motion information is bidirectional motion information, clipping the bidirectional motion information into first unidirectional motion information and second unidirectional motion information; if the first unidirectional motion information does not duplicate with candidate motion information existing in the motion information candidate list, adding the first unidirectional motion information to the motion information candidate list;

wherein whether the unidirectional motion information duplicates with the candidate motion information existing in the motion information candidate list is checked by the follow way: if a Picture Order Count (POC) of a reference picture to which the unidirectional motion information points is the same as that of a reference picture to which the candidate motion information points, and a motion vector of the unidirectional motion information is the same as that of the candidate motion information, determining that the unidirectional motion information duplicates with the candidate motion information; otherwise, determining that the unidirectional motion information does not duplicate with the candidate motion information.

12. The decoding device according to claim 11, wherein in obtaining the at least one piece of available motion information to be added to the motion information candidate list, the processor is further configured to execute the machine executable instructions to perform:

for a spatial neighbouring block of the current block, if the spatial neighbouring block exists and an inter prediction mode is adopted for the spatial neighbouring block, determining motion information of the spatial neighbouring block as the available motion information.

13. The decoding device according to claim 11, wherein in obtaining the at least one piece of available motion information to be added to the motion information candidate list, the processor is further configured to execute the machine executable instructions to perform:

based on a preset position of the current block, selecting a temporal neighbouring block corresponding to the preset position from a reference picture of the current block, and determining motion information of the temporal neighbouring block as the available motion information.

14. The decoding device according to claim 11, wherein in obtaining the at least one piece of available motion information to be added to the motion information candidate list, the processor is further configured to execute the machine executable instructions to perform:

determining the preset motion information as the available motion information, wherein the preset motion information comprises: default motion information derived based on candidate motion information existing in the motion information candidate list.

15. The decoding device according to claim 11, wherein in obtaining the motion information candidate list based on the at least one piece of available motion information, the processor is further configured to execute the machine executable instructions to perform:

for the available motion information currently to be added to the motion information candidate list, if the available motion information is the preset motion information, adding the available motion information to the motion information candidate list.

16. The decoding device according to claim 11, wherein, the first unidirectional motion information is unidirectional motion information pointing to a reference picture in a first reference picture list;

the second unidirectional motion information is unidirectional motion information pointing to a reference picture in a second reference picture list;

wherein the first reference picture list is List0, and the second reference picture list is List1; or, the first reference picture list is List1, and the second reference picture list is List0.

17. The decoding device according to claim 11, wherein in obtaining, based on the motion information candidate list, the first target motion information and the second target motion information of the current block, the processor is further configured to execute the machine executable instructions to perform:

selecting candidate motion information from the motion information candidate list as first original motion information of the current block, and selecting candidate motion information from the motion information candidate list as second original motion information of the current block;

determining the first target motion information of the current block based on the first original motion information; and determining the second target motion information of the current block based on the second original motion information.

18. The decoding device according to claim 17, wherein, the first original motion information comprises a first original motion vector, the first target motion information comprises a first target motion vector, and in determining the first target motion information of the current block based on the first original motion information, the processor is further configured to execute the machine executable instructions to perform:

obtaining a first motion vector difference corresponding to the first original motion vector, and determining the first target motion vector based on the first motion vector difference and the first original motion vector; or, determining the first original motion vector as the first target motion vector;

the second original motion information comprises a second original motion vector, the second target motion information comprises a second target motion vector, and in determining the second target motion information of the current block based on the second original motion information, the processor is further configured to execute the machine executable instructions to perform:

obtaining a second motion vector difference corresponding to the second original motion vector, and determining the second target motion vector based on the second motion vector difference and the second original motion vector; or, determining the second original motion vector as the second target motion vector;

wherein, in obtaining the first motion vector difference corresponding to the first original motion vector, the processor is further configured to execute the machine executable instructions to perform: obtaining direction information and amplitude information of the first motion vector difference; and determining the first motion vector difference based on the direction information and the amplitude information of the first motion vector difference;

in obtaining the second motion vector difference corresponding to the second original motion vector, the processor is further configured to execute the machine executable instructions to perform: obtaining direction information and amplitude information of the second motion vector difference; and determining the second motion vector difference based on the direction information and the amplitude information of the second motion vector difference.

19. An encoding device, comprising a processor and a machine-readable storage medium, wherein the machine-readable storage medium stores machine executable instructions that can be executed by the processor, and the processor is configured to execute the machine executable instructions to perform:

when it is determined that a weighted prediction is enabled for a current block, obtaining a weight prediction angle and one or more weight configuration parameters of the current block;

configuring reference weight values for surrounding positions outside the current block based on the one or more weight configuration parameters;

for each pixel position of the current block, determining, based on the weight prediction angle, a surrounding matching position to which the pixel position points from the surrounding positions outside the current block; determining a target weight value of the pixel position based on a reference weight value associated with the surrounding matching position, and determining an associated weight value of the pixel position based on the target weight value of the pixel position;

obtaining a motion information candidate list which comprises at least one piece of candidate motion information, and obtaining, based on the motion information candidate list, first target motion information and second target motion information of the current block;

for each pixel position of the current block, determining a first prediction value of the pixel position based on the first target motion information of the current block, and determining a second prediction value of the pixel position based on the second target motion information of the current block; determining a weighted prediction value of the pixel position based on the first prediction value, the target weight value, the second prediction value and the associated weight value; and determining weighted prediction values of the current block based on the weighted prediction value of each pixel position of the current block;

wherein in obtaining the motion information candidate list, the processor is further configured to execute the machine executable instructions to perform: obtaining at least one piece of available motion information to be added to a motion information candidate list; and obtaining the motion information candidate list based on the at least one piece of available motion information; wherein the available motion information comprises at least one of the following motion information: spatial motion information; temporal motion information; preset motion information;

wherein in obtaining the motion information candidate list based on the at least one piece of available motion information, the processor is further configured to execute the machine executable instructions to perform: for the available motion information currently to be added to the motion information candidate list, if the available motion information is unidirectional motion information, and the unidirectional motion information does not duplicate with candidate motion information existing in the motion information candidate list, adding the unidirectional motion information to the motion information candidate list; if the available motion information is bidirectional motion information, clipping the bidirectional motion information into first unidirectional motion information and second unidirectional motion information; if the first unidirectional motion information does not duplicate with candidate motion information existing in the motion information candidate list, adding the first unidirectional motion information to the motion information candidate list;

wherein whether the unidirectional motion information duplicates with the candidate motion information existing in the motion information candidate list is checked by the follow way: if a Picture Order Count (POC) of a reference picture to which the unidirectional motion information points is the same as that of a reference picture to which the candidate motion information points, and a motion vector of the unidirectional motion information is the same as that of the candidate motion information, determining that the unidirectional motion information duplicates with the candidate motion information; otherwise, determining that the unidirectional motion information does not duplicate with the candidate motion information.

20. A non-transitory machine-readable storage medium having stored thereon computer instructions that, when executed by a processor, implement the encoding and decoding method according to claim 1.

* * * * *